United States Patent
Wallerstorfer et al.

(10) Patent No.: US 8,202,419 B2
(45) Date of Patent: Jun. 19, 2012

(54) TANK

(75) Inventors: Kurt Wallerstorfer, Strasswalchen (AT); Andreas Wawrla, Widnau (CH); Roland Scholz, Haan (DE); Bernd Heitele, Marbach (CH)

(73) Assignee: Aquis Wasser-Luft-Systeme GmbH, Lindau, Zweigniederlassung Rebstein, Rebstein (CH)

( * ) Notice: Subject to any disclaimer, the term of this patent is extended or adjusted under 35 U.S.C. 154(b) by 298 days.

(21) Appl. No.: 12/310,072

(22) PCT Filed: Aug. 10, 2007

(86) PCT No.: PCT/EP2007/007113
§ 371 (c)(1),
(2), (4) Date: May 7, 2009

(87) PCT Pub. No.: WO2008/017510
PCT Pub. Date: Feb. 14, 2008

(65) Prior Publication Data
US 2009/0283467 A1 Nov. 19, 2009

(30) Foreign Application Priority Data

Aug. 10, 2006 (DE) .......................... 10 2006 037 636

(51) Int. Cl.
*B01D 35/30* (2006.01)
*B01D 24/00* (2006.01)
(52) U.S. Cl. ........ 210/232; 210/807; 210/265; 210/268; 210/282; 210/287; 210/503
(58) Field of Classification Search .................. 210/130, 210/135
See application file for complete search history.

(56) References Cited

U.S. PATENT DOCUMENTS

| | | | |
|---|---|---|---|
| 3,206,033 A | 9/1965 | Kern, Jr. | |
| 4,969,996 A * | 11/1990 | Hankammer | 210/282 |
| 5,342,518 A | 8/1994 | Posner et al. | |
| 5,860,354 A | 1/1999 | Jouatel et al. | |
| 5,897,770 A * | 4/1999 | Hatch et al. | 210/101 |
| 6,524,477 B1 * | 2/2003 | Hughes | 210/282 |
| 6,576,129 B1 | 6/2003 | Reid | |
| 2002/0144937 A1 | 10/2002 | Wilberscheid | |
| 2002/0170279 A1 | 11/2002 | Gustafson | |
| 2004/0129627 A1 | 7/2004 | McGibbon | |
| 2004/0182777 A1 | 9/2004 | Stankowski | |
| 2004/0211931 A1 | 10/2004 | Olson | |

(Continued)

FOREIGN PATENT DOCUMENTS

CH 432 395 9/1967
(Continued)

*Primary Examiner* — Krishnan S Menon
*Assistant Examiner* — Allison M Gionta
(74) *Attorney, Agent, or Firm* — Breneman & Georges

(57) ABSTRACT

A tank is proposed for appliances which use water, in particular domestic appliances or appliances for preparation of foodstuffs and/or drinks, such as automatic drinks machines, in particular automatic coffee machines, drinking water dispensers, cooking and baking appliances, steam appliances, in particular steam irons, steam cleaners, high-pressure cleaners, air cleaners and conditioners or the like, with a connection being provided on the tank for supplying water from the tank to the appliance and with a filter connection being provided for connection of a filter cartridge in the interior and/or outside the tank, while providing assurance that only the permitted filter type can be used. A tank according to the invention is distinguished by mechanical coding structures on the filter connecting element, in order to preclude the use of a filter cartridge which does not correspond to the tank.

23 Claims, 51 Drawing Sheets

U.S. PATENT DOCUMENTS

2007/0289913 A1    12/2007    Namur

FOREIGN PATENT DOCUMENTS

| | | |
|---|---|---|
| DE | 30 14 493 A1 | 10/1981 |
| DE | 203 80 258 U1 | 4/1991 |
| DE | 691 05 539 T2 | 8/1991 |
| DE | 196 48 405 A1 | 10/1998 |
| DE | 197 17 054 C2 | 11/1998 |
| DE | 198 27 623 A1 | 1/1999 |
| DE | 198 27 297 A1 | 12/1999 |
| DE | 10 2004 026188 A1 | 12/2005 |
| DE | 10 2004 049877 A1 | 4/2006 |
| GB | 2 346 568 A | 8/2000 |
| RU | 2 313 695 C1 | 6/1999 |
| WO | WO 01/80967 A1 | 11/2001 |
| WO | WO 02/13944 A2 | 2/2002 |
| WO | WO 2004/014519 A2 | 2/2004 |
| WO | WO 2004014519 A2 * | 2/2004 |
| WO | WO 2006/040120 | 4/2006 |
| WO | WO 2006/050114 A1 | 5/2006 |
| WO | WO 2008/049547 A2 | 5/2008 |

* cited by examiner

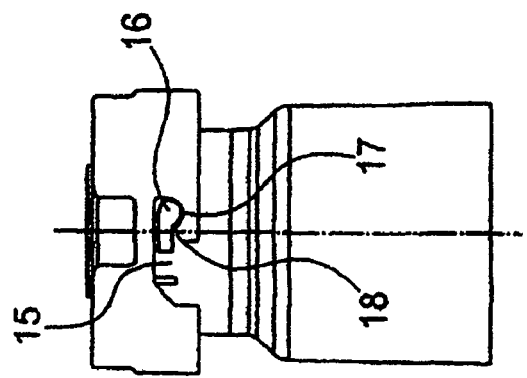
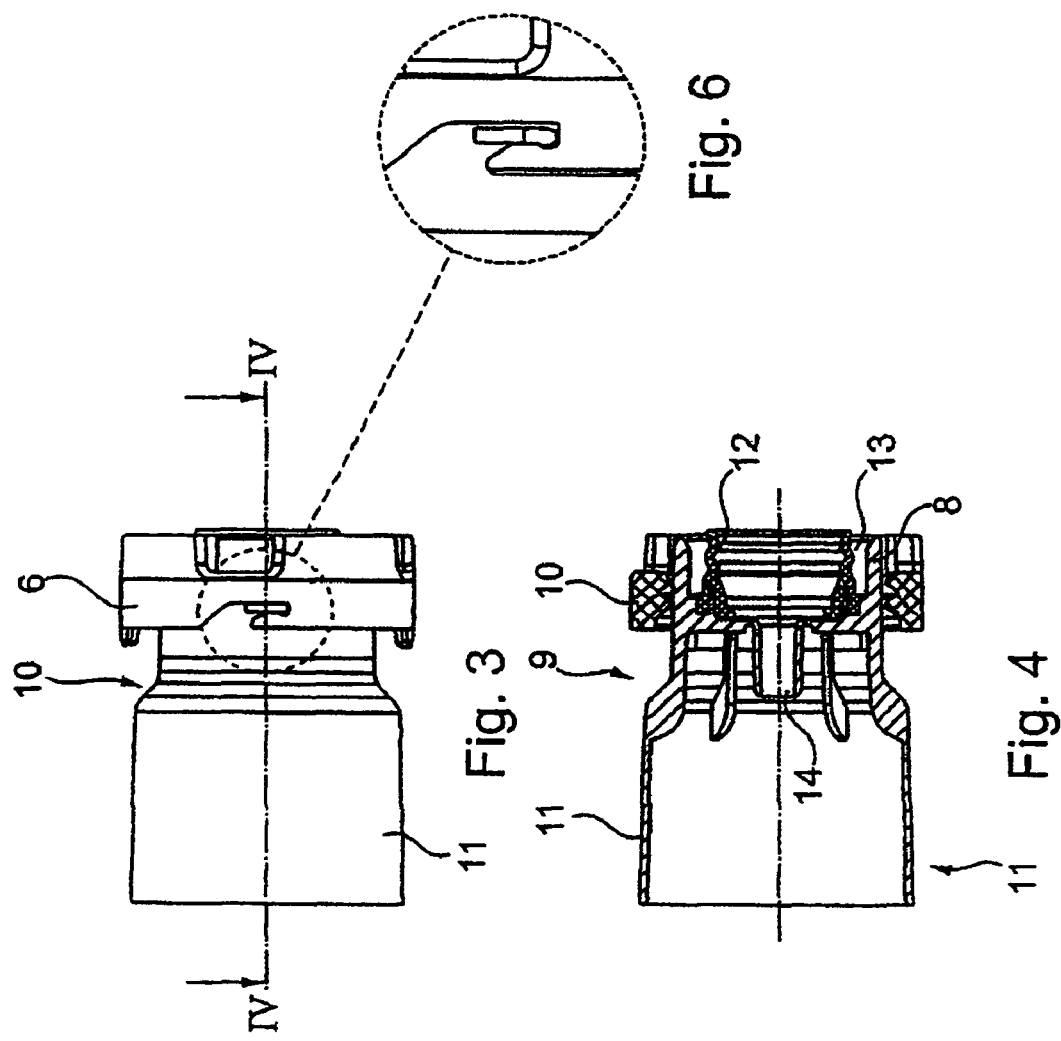

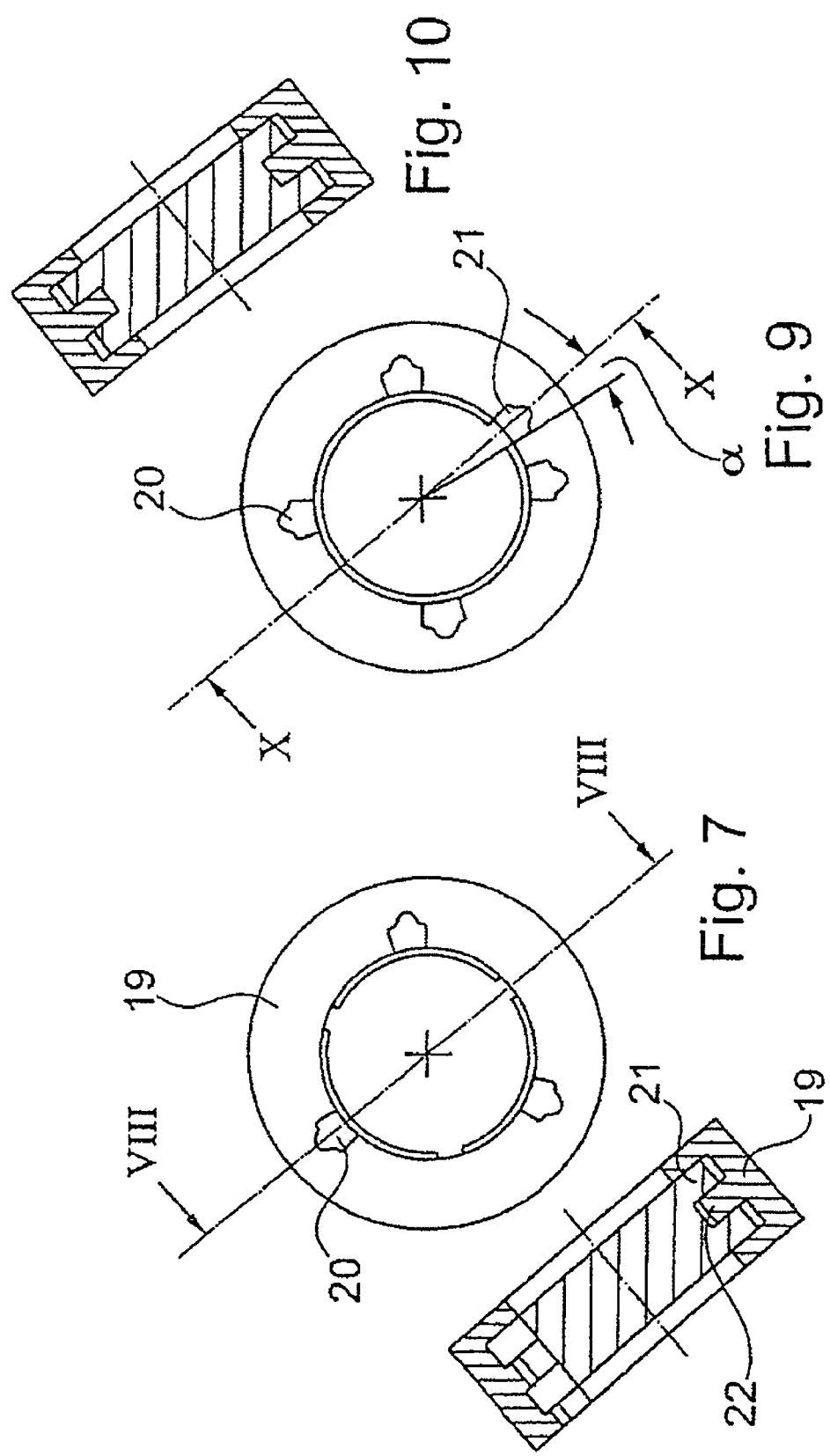

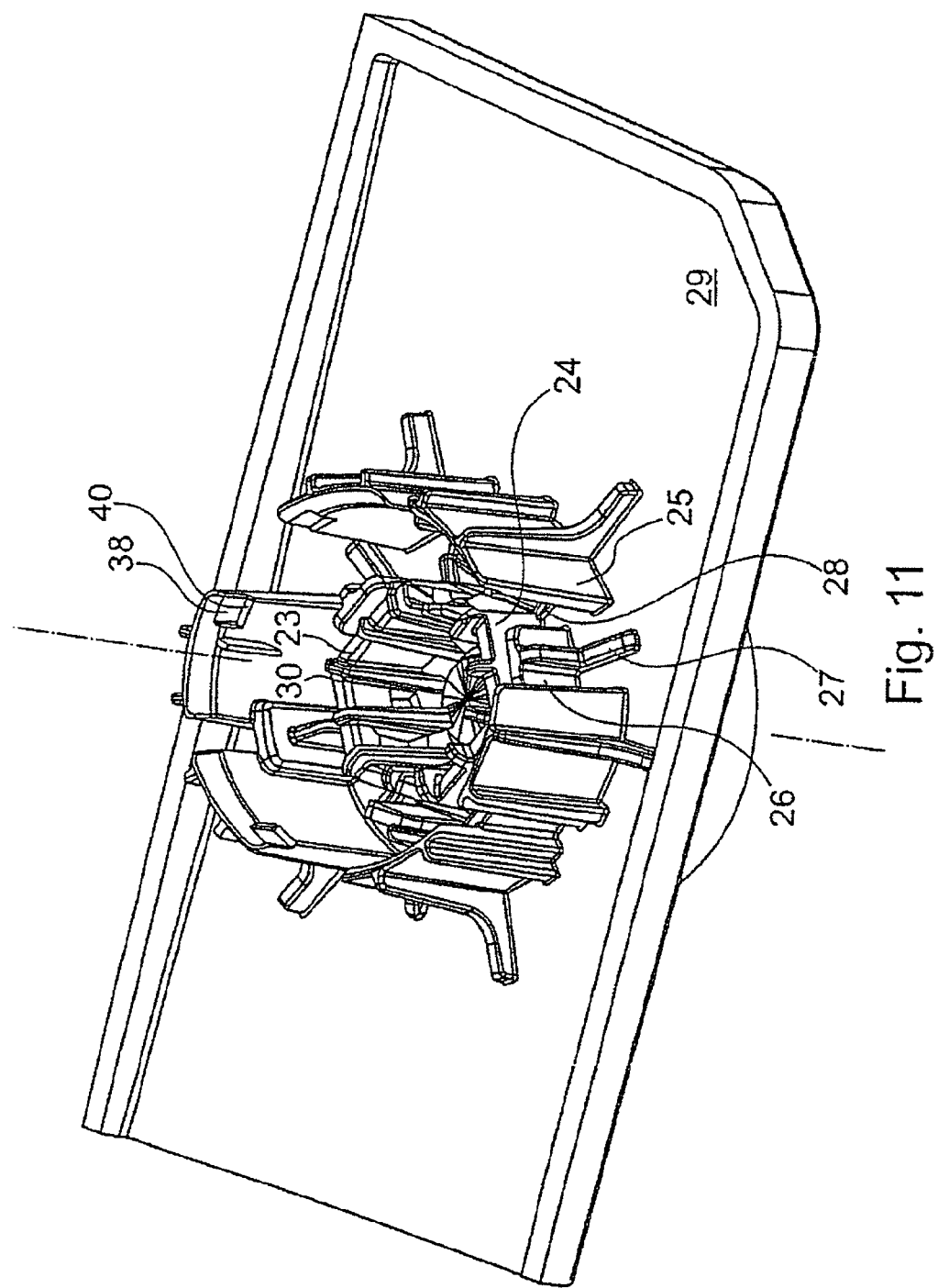

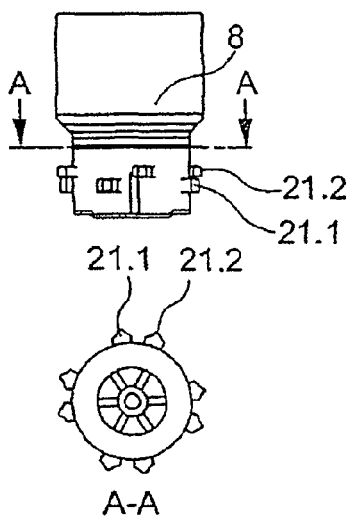
Fig. 52
Fig. 53
A-A
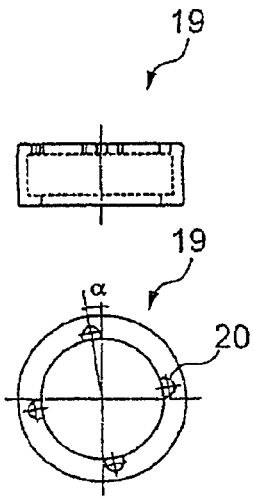
Fig. 54
Fig. 55
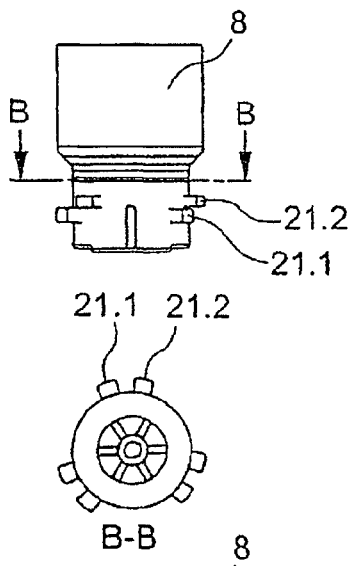
Fig. 56
Fig. 57
B-B
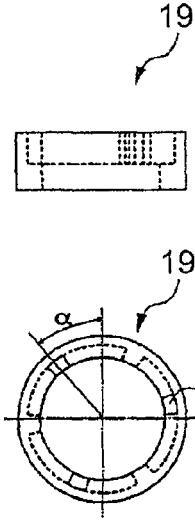
Fig. 58
Fig. 59
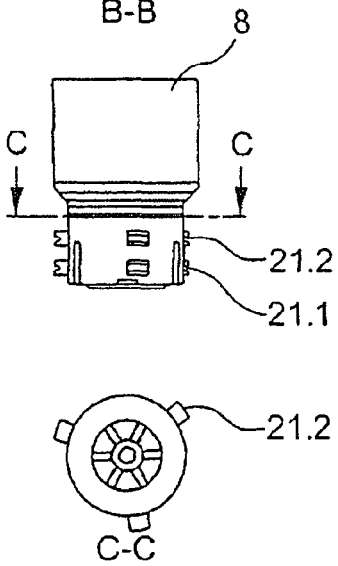
Fig. 60
Fig. 61
C-C
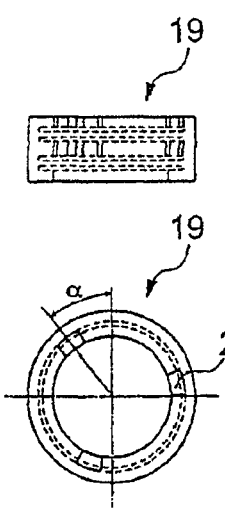
Fig. 62
Fig. 63

A-A

TANK

CROSS REFERENCE TO RELATED APPLICATIONS

The subject matter of this application is related to the subject matter of U.S. application Ser. No. 12/310,061 filed Feb. 10, 2009; U.S. application Ser. No. 12/310,062 filed Feb. 10, 2009; U.S. application Ser. No. 12/310,071 filed Feb. 10, 2009 and U.S. application Ser. No. 12/310,037 filed Apr. 23, 2009.

BACKGROUND OF THE INVENTION (1) Field of the Invention

The invention relates to a tank having a filter cartridge which use water and in particular domestic appliances such as water filter jugs, water boilers, refrigerators, automatic drink machines such as coffee machines, drinking water dispensers, cooking and baking appliances, steam appliances such as steam irons, steam cleaners, high pressure cleaners, air cleaners and conditioners and the like having a connection on the tank for supplying water from the water tank to a reservoir and/or storage vessel and/or an appliance with a filter connection for connection to a filter cartridge for a gravimetrically operated filter cartridge.

(2) Description Of Related Art Including Information Disclosed Under 37 CFR 1.97 and 1.98

A water tank for holding a liquid, in the case of kitchen appliances, coffee machines or espresso machines for holding water, is provided in various kitchen appliances and machines, for example in water filter jugs, water boilers, coffee machines or espresso machines, in which case a filter cartridge can be inserted into the tank in order to prepare the water before processing in the machine or before consumption. Known filter cartridges have an outlet in the lower area, through which the water is supplied to the associated machine or to a reservoir or storage vessel. In this case, the water is passed via a preferably gravimetrically operated filter bed and is passed via a connection of the filter cartridge to a corresponding connection of the water tank into the machine or into some other reservoir or storage vessel.

For reliable operation of the kitchen appliances and machine, it is of major importance to use a filter cartridge whose filter parameters are defined. A defective filter cartridge will produce inadequately or incorrectly prepared water, which can lead to negative effects, for example to inadequate taste and/or smell optimization, calcium reduction or the like, or even to machine defects. By way of example, the machine control system is not able to initiate the intended maintenance intervals in good time if it assumes that a filter cartridge of the correct type is being used, but this is not actually being used. The use of inadequate filter cartridges leads to problems not only in the operational reliability of the machine but also in questions relating to the guarantee etc. It is therefore of major importance to ensure that only permissible filter cartridges are ever used.

BRIEF SUMMARY OF THE INVENTION

The invention is therefore based on the object of providing a tank and a filter cartridge which ensure that only the permissible filter type is used.

A tank according to the invention with a filter connection for connection of a gravimetrically operated filter cartridge in the interior and/or outside the tank is accordingly distinguished in that mechanical coding structures are provided on the filter connecting element in order to preclude the use of a filter cartridge which does not correspond to the tank. According to the invention, the expression "a tank" means not only a vessel which is suitable for water storage but also any other apparatus which produces a hydrostatic pressure that is sufficient for operation of the filter cartridge, for example an open and/or closed flow path.

The expression "a tank-side filter connecting element" such as this should be understood according to the invention as meaning elements which are arranged and/or formed directly and/or indirectly on the tank, such as projecting and/or recessed holding and/or fixing and/or coding and/or sealing elements. By way of example, these may be in the form of connecting stubs which are designed such that they are or can be connected firmly to the tank, as hooks, eyes, adapters or the like.

The tank-side filter connection is in this case preferably formed in the bottom area of the tank. However, it may also in any case be arranged internally and/or externally at least partially or else completely in a corner and/or on a side wall of the tank, depending on the point at which the connection is provided between the water tank and an appliance-side outlet-flow line. For example, it is also feasible to use a tank-side filter connecting element which is passed out of the tank upwards at a distance from the bottom of the tank, in its installation position for use.

Embodiments such as these may be possible, for example, to provide a tank which is in the form of a jug and/or drawer in which, in turn, only a filter cartridge which is provided with a corresponding, coded filter-side tank connecting element can be used. The appliance-side connection of the tank connection may be connected as a plug connection to a correspondingly complementary appliance-side tank connecting element, both in this embodiment and in the embodiments described above. The tank-side filter connecting element, which is at a distance from the tank bottom, may, for example, also be in the form of a filter connecting element which can be hooked in on a tank wall, for example in the form of a pipeline which, when a cartridge with an appropriately matching coding is inserted, is used to carry out the untreated water with which the tank has been filled, and which is filtered by the filter cartridge.

If the water inlet openings for the filter path are arranged at an appropriately low level, the essential contents of the tank can also be emptied by means of an embodiment such as this, so that the tank does not contain any unusable water, or only a small amount of unusable water, which cannot be passed through the filter path.

The structures on the filter connection of the tank therefore have to interact on a key/lock principle with corresponding connecting structures on a filter cartridge, in order that the filter cartridge can be inserted into the water tank in such a manner that it can operate. A machine manufacturer or tank manufacturer can in this case ensure that the only filter cartridges which are used are those which ensure reliable operation of the machine. By way of example, the gravimetric water pressure can be produced by the water level in the tank being at an appropriately high level above the filter cartridge. The higher the water level and the lower the flow resistance in the interior of the filter cartridge, the more quickly the filtered water can be produced. For this purpose, the tank can particularly advantageously be provided with a cartridge holding section which is formed in a recessed manner, in order to allow the tank to be emptied as well as possible. However, gravimetric filter operation is invariably also possible with a conventional tank without any special depression, provided that the water level forces the untreated water that is located in the tank through the filter.

In one special embodiment of the invention, the filter connection of the tank is provided with at least one coding structure which comprises at least one projection and/or at least one recess and fits a complementary coding structure on the filter cartridge, which correspondingly comprises at least one recess and/or at least one projection. In this case, projections and/or recesses such as these can be provided in the axial and/or radial direction of the filter connecting element or of the filter cartridge.

In one particularly advantageous embodiment of the invention, the filter connection of the tank and a connecting stub on the filter cartridge are designed such that they at least partially surround one another. By way of example, in this embodiment, coding structures can be arranged in the radial direction, that is to say transversely with respect to the axis of the connecting stub of the filter cartridge that is used. In this embodiment as well, axial coding structures are, however, also possible without any problems, for example on the end face of the connecting stub or in the area of the tank bottom.

At least some of the coding structures are preferably at the same time in the form of fixing elements for attachment of the filter cartridge. In this case, these coding structures are preferably designed in an undercutting form such that, for example, the filter cartridge can be fixed to the tank bottom or an attachment element that is fitted to the tank bottom by rotation or by clipping, in which case, of course, the corresponding coding structures must match one another in order to ensure operation with a correct filter cartridge.

In one particularly simple embodiment, the coding structures are in the form of a bayonet fitting. For this purpose, projections which preferably run transversely with respect to the axis of the filter connecting element are provided on the filter connection of the tank and/or on the tank connection of the filter cartridge and correspond to holding and/or guide webs, which correspond thereto, on the tank connection of the filter cartridge and/or on the filter connection of the tank. The spatial arrangement of these projections and holding or guard webs allows, for example, mechanical coding for a correct filter cartridge. Different arrangements and shapes can also be provided, for example, for coding of different filter types for different machines.

Thus, by way of example, it is also possible to provide double bayonet fittings or multiple bayonet fittings, in which case this double or multiple structure may relate not only in plan view to the circumferential surface of a corresponding connecting element but also to its longitudinal extent. In this case, angle arrangements at different spacings can also be provided, in relation to the plan view of the circumferential surface, between individual and/or a plurality of double or multiple bayonet fitting elements. This allows coding to be achieved for differently designed bayonet fitting structures corresponding to the respectively formed complementary bayonet fitting elements, in which case a bayonet connection can be provided completely in a first, a second or else a further plane in each case, or else it could be made impossible for a bayonet fitting element which is provided on an incorrectly coded filter cartridge to pass through, thus preventing use of this cartridge for operation.

Radially projecting, vane-like projections on the cartridge furthermore offer the advantage of broader guidance with respect to bayonet fittings in which corresponding structures, which are directed inwards, are fitted in the tank fitting. Furthermore, this embodiment allows easier insertion into corresponding guide webs in the tank fitting since the projections or vanes on the cartridge can be seen by an operator during insertion. These radial projections furthermore result in an increase in the circumference of the cartridge in the area of the attachment, thus improving the robustness of the anchorage.

Furthermore, projections or vanes such as these on the filter cartridge can be manufactured from material which is more elastic than the material of the tank fitting, thus allowing better bracing of the filter cartridge to be achieved in the axial direction, via a spring-like effect.

Fundamentally, the embodiment in the form of a bayonet fitting in conjunction with an axial seal, which is pressed against a tank-side seal in the axial direction, is advantageous. The bayonet fitting offers a corresponding tightening torque in the axial direction, while the axial seal offers corresponding advantages during insertion. For example, there is no need to overcome any friction forces whatsoever for pressing on and releasing an axial seal during insertion and removal of the filter cartridge.

The developing features, as mentioned above, of a bayonet fitting with radially projecting projections or vanes on the filter cartridge offer the stated advantages in particular in conjunction with an axial seal. The corresponding projections and guide webs of the bayonet fitting can in this case, as before, be used as a coding structure for the purposes of the invention.

In principle, coding structures can also be used as operating members in the area of the tank connection. For example, a switching mechanism which is fitted to the tank can thus be operated by the coding structures on the filter cartridge, and the switching mechanism can be used to signal that the filter cartridge is correctly seated or to identify the correct type of cartridge by the associated appliance. A refinement such as this of the coding elements as an operating member is possible inter alia in conjunction with the above embodiment of a bayonet fitting, but also with all other types of coding structures.

In another embodiment of the invention, the coding structure is provided by the shape of the circumference of the tank-side filter connection. For example, coding can be carried out by means of a discrepancy from the previous connecting elements, which preferably correspond over a specific longitudinal extent to circular cross-sectional shapes of the same size. For example, if the tank-side filter connection has a conical and/or oval shape over a specific longitudinal extent, this therefore makes it possible to ensure that only a filter cartridge which correspondingly fits it can be used. Furthermore, further coding structures, for example projections and/or recesses which act in the axial direction, can also invariably be provided in conjunction with this embodiment.

In one development of this embodiment, the filter connection of the tank is provided with a circumferential contour in the form of a polygon train. A shape such as this furthermore allows more extensive angle coding for different insertion angle positions of the filter cartridge.

A rotationally symmetrical circumferential contour is preferably provided on the filter connecting element for this purpose. A rotationally symmetrical configuration allows various predetermined angular positions to be implemented on insertion of a filter cartridge, which can be associated, if required, with an additional function, depending on the angular position. One example of a circumferential shape of the tank-side filter connecting element according to the exemplary embodiments described above would, for example, be provided by a hexagonal cross-sectional contour. A contour such as this allows, for example, six different angular positions of a filter cartridge which corresponds to it.

The tank-side filter connecting element may in this case be in the form of a recess with a corresponding internal circumference and/or external circumference, or else may be in the form of a projection with a corresponding external circumference and/or internal circumference. A connecting stub can accordingly be provided with the corresponding circumferential contour either on the internal circumference and/or on the external circumference, both for plugging in and for plugging on a corresponding connecting element of the filter cartridge.

The circumferential surface shaped in this way is advantageously at the same time in the form of a sealing surface. The seal can thus advantageously be produced from the same material as the cartridge housing, preferably by spraying on. This ensures that only a filter cartridge with a seal shape that corresponds thereto for the filter output line can be inserted into the tank in a manner that allows it to be operated, and can be connected to the tank-side filter connecting element.

A circumferential surface which is shaped as described above can also be used as a holder for the filter cartridge, which corresponds to a correspondingly shaped holding element in the tank area. In this case as well, the circumferential surface provides a coding structure.

A further coding option for the tank filter connection is to vary the alignment of the longitudinal axis, which runs through the filter-side tank connecting element, with respect to a longitudinal axis which runs through the filter housing, such that, for example, they form a specific, in particular acute, angle with respect to one another. For this purpose, the filter-side tank connecting element may be designed to be preferably slightly bent with respect to the cartridge housing. Cartridges which do not have a connecting element which is aligned in a bent position such as this cannot be inserted in a manner which allows them to be operated in a correspondingly narrow water tank. A further advantage of coding such as this is that this also makes it possible to fit curved and/or bent water tanks with a comparatively long longitudinal extent in an operationally safe and reliable manner, since the angle between the two longitudinal axes makes it possible to provide a correspondingly reliably sealing and fixing tank/filter holder for optimum alignment of the tank-side filter connecting element in the tank, and to provide an insertion movement, which is not a vertical insertion movement, for the angled cartridge.

If required, further guide elements can be provided for this purpose on the filter cartridge and/or on the tank, for reliable connection of the tank-side filter connecting element to the filter-side tank connecting element. In particular, for example, the ribs which are provided on the tank side and form a cross section which tapers in the insertion direction are particularly suitable for this purpose, by means of which the filter-side connecting element and/or the filter housing and/or a guide structure which projects from the filter housing, for example a connecting ring or the like, are guided during insertion of the filter cartridge. A guide structure such as this on the filter side may be in the form of a circumferential surface although it may also have contours which are in the form of a slot, and are formed in a complementary manner to the ribs described above, and/or may have some other suitable structure.

In the case of rib/slot coding, a further coding option is in turn possible by means of different angle coding, when seen in a plan view, for one or more such complementary elements. Only when the slot/rib combination and the angled tank/filter connecting structure match one another can a corresponding filter cartridge be inserted such that it can be operated.

This guidance and coding structure as described here can, however, also invariably be used with the same effect for filter connecting elements which are not designed to be angled.

An additional guidance and/or coding function can be achieved by projecting points or recesses which are formed at the end on the filter cartridge and can engage in correspondingly complementary shaped tank-side coding and/or guidance structures.

Particularly when the coding structure forms the sealing surface at the same time, it may have a cross-sectional taper which extends in the axial direction, for example in the form of a truncated cone or truncated pyramid. This allows the plugging-on process to be carried out more easily, forming a seal, without any major friction forces.

As has already been mentioned a number of times, the appropriate coding structures which correspond to the tank-side coding structures must be provided on the filter cartridge side. If the sealing surface of the tank-side filter connection is enclosed in the shape of the coding structures, then, in one special embodiment, the seal itself is provided with the appropriate shape as a filter-side tank connecting element. For example, if the tank-side filter connecting element has a hexagonal cross section, this therefore provides the option of providing a correspondingly hexagonal seal as the mating piece. In this case, as an axial seal, this can preferably be in the form of a radial seal which is either plugged into an appropriately shaped recess, which is hexagonal in the above exemplary embodiment, or else is plugged onto a projection which is shaped in the same way.

In the case of a cross-sectional taper as stated above, the seal is also preferably appropriately adapted in this case such that it merges over an area when plugged onto a projection which, for example, is in the form of a truncated hexagonal pyramid.

In this refinement, only one filter cartridge with an appropriately shaped seal can be inserted such that it can operate.

In one development of the invention, two or more different coding structures are provided. Thus, for example, in conjunction with a coding of the connection as described above, a fixing means can additionally be provided, by means of which the filter cartridge can be positioned, in which case further coding structures can be accommodated in this fixing means. For example, coding by means of the sealing surface, as described above, can thus be combined with an apparatus which is arranged separately therefrom, for fixing and/or additional coding. Such fixing can be carried out within the filter cartridge or else outside the filter cartridge, as well.

In one special embodiment, fixing means are provided which project from the bottom of the tank, act on the external circumference of the filter cartridge and can additionally have a coding characteristic. For example, a bayonet fitting or a corresponding fixing can thus once again be provided via an element such as this. One example of a fixing which is not a bayonet fitting is, for example, latching or clipping-in of the filter cartridge into corresponding latching or clip elements which, if required, can likewise be in the form of a coding structure.

Furthermore, advantageously, a blending setting is provided by means of which a bypass flow of unfiltered water, water which has been filtered in some other way or water which has been prepared in some other way bypasses the filter bed, with the amount of the unfiltered water, or water which has been filtered or prepared in some other way being adjustable. For example, this can be done by means of one or more bypass openings which are opened in a variably adjustable manner in order to set the amount of water which bypasses the filter bed. A blending setting such as this can be implemented, for example, via the angular position of the installation position of the filter cartridge. In this case, the combination of the coding structure with the presetting of fixed angular positions via the installation position is particularly advantageous. By way of example, a preset such as this can be achieved by a bayonet fitting or else by a rotationally symmetrical circumference of the corresponding coding structures, as well.

The blending amount of unfiltered water or of water which has been prepared in some other way can in this case be produced by appropriately designed openings which connect the tank interior directly to the tank outlet flow. These openings can be made of different size or can be opened to different extents and/or different numbers of them can be opened, depending on the insertion angle of the filter cartridge, thus resulting in a different blending ratio depending on the installation position of the filter cartridge.

In the case of a hexagonal coding structure in the connecting area of the filter cartridge in the tank-side connecting stub, which is intended for connection to the filter cartridge, for example, openings of different size can thus be provided as a bypass and are closed as a function of the angle when a filter cartridge is plugged on. In this case, the bypass openings are preferably introduced in the sealing surface in such a way that all of the openings with the exception of the opening which is intended to be used as the bypass opening are sealed by an appropriately shaped connecting seal of the filter cartridge when the filter cartridge is inserted.

The blending amount can also be set in a different manner by using the coding structure. For example, a coding structure can thus at the same time be used as a mechanical driver in order to mechanically operate an adjusting element in the tank area by means of the filter cartridge. In the case of a hexagonal connecting fitting in the tank area, for example, a corresponding hexagonal contour on the filter cartridge could be used in order to rotate a rotatable fitting element to the blending amount setting. The hexagonal coding structure on the filter cartridge would then not only have a coding function but would at the same time be a mechanical operating element, so to speak in the form of a hexagonal key.

However, corresponding openings and/or channels can also be formed in the filter cartridge in order to provide a blending apparatus, allowing blending for the water that is filtered by the filter cartridge, for example with and/or without interaction with a tank-side blending element. This also applies in a corresponding manner when using a connection which may be joined between the tank-side and filter-side connecting element and/or an extension element, such as an adapter with the same and/or a different connecting and/or coding and/or fixing and/or sealing structure.

In order to ensure that the tank of a machine is not replaced by a tank that is not permissible and does not have coding structures for use of filter cartridges which are not permitted, in order to circumvent the coding according to the invention, it is recommended that the interface between the tank and the machine likewise be provided with coding structures, which may be the same as one of the exemplary embodiments described above. In this case, the machine-side and the tank-side connecting elements must be appropriately coded.

The invention also covers embodiments which provide the connection for the filter cartridge via separate adapter parts which can be connected to the filter cartridge or to the tank. This also applies to the connection between the tank and the associated appliance.

The invention can be used advantageously in all appliances which use water, in particular in domestic appliances which use water or appliances for preparation of foodstuffs and/or drinks, such as automatic drinks machines, in particular automatic coffee machines, drinking water dispensers, cooking and baking appliances, steam and/or high-pressure cleaners, air cleaners and conditioners or the like, which have a corresponding water tank.

BRIEF DESCRIPTION OF THE SEVERAL VIEWS OF THE DRAWING (S)

Various exemplary embodiments of the invention will be explained in more detail in the following text with reference to the figures, and are illustrated in the drawing, in which, in detail:

FIG. 3 shows a side view of a second embodiment variant of a filter connection,

Figure 12:
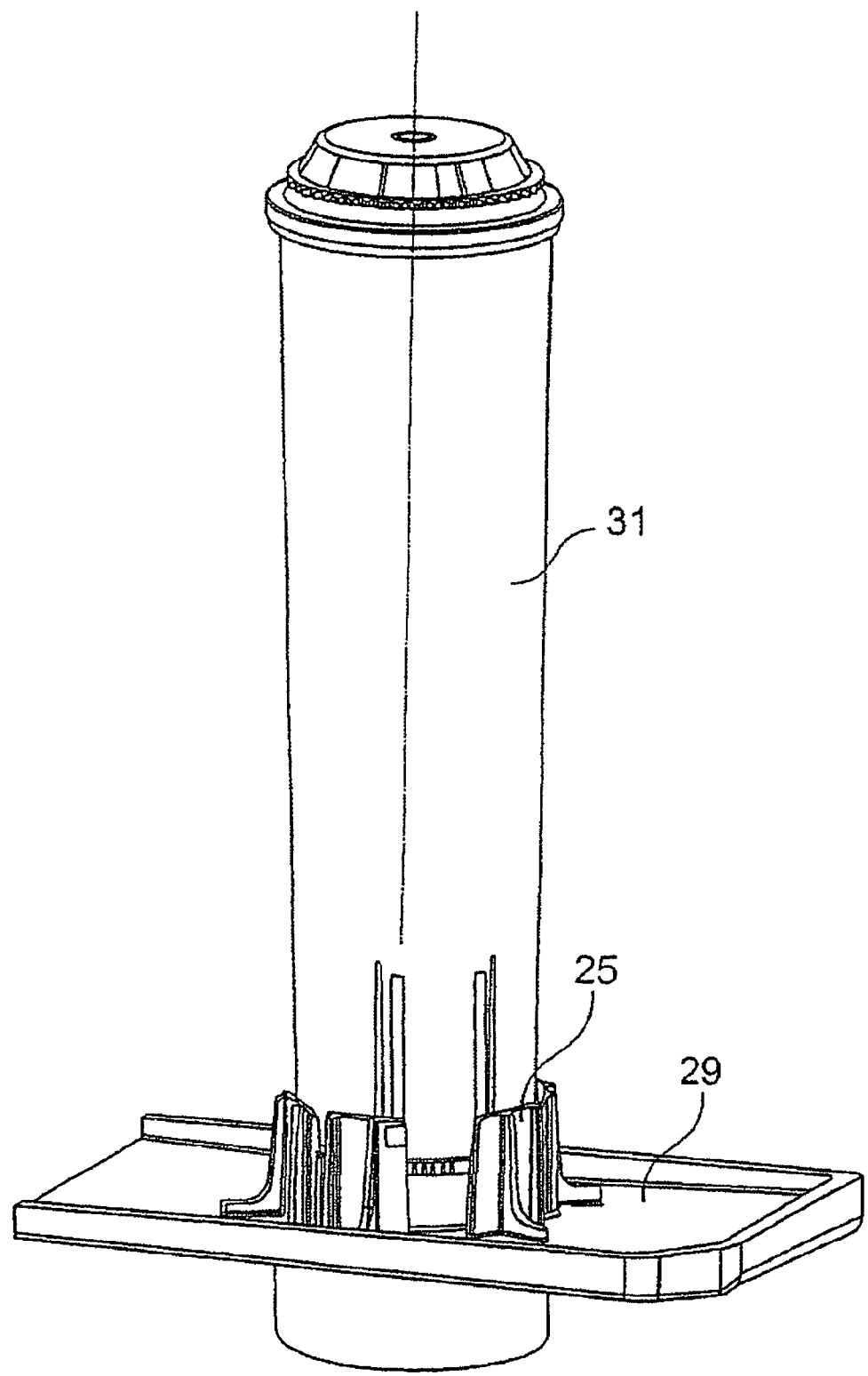
Figure 13:
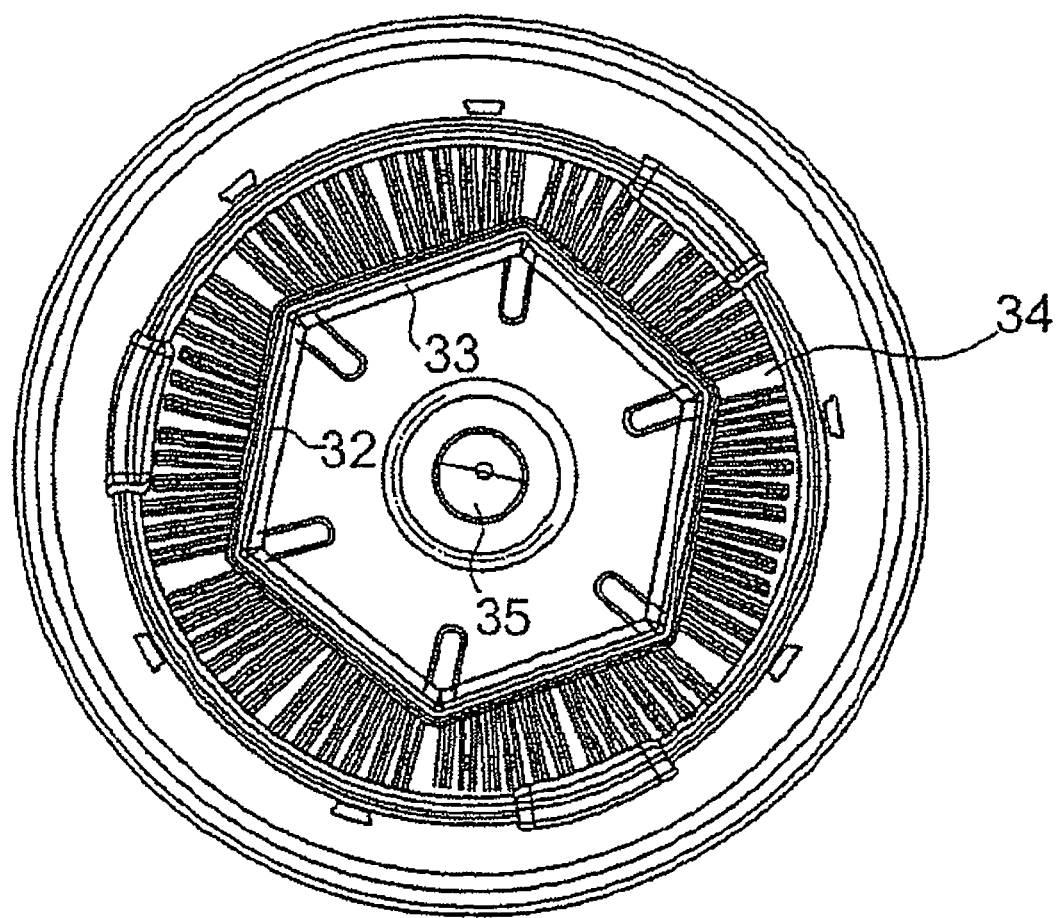
Figure 14:
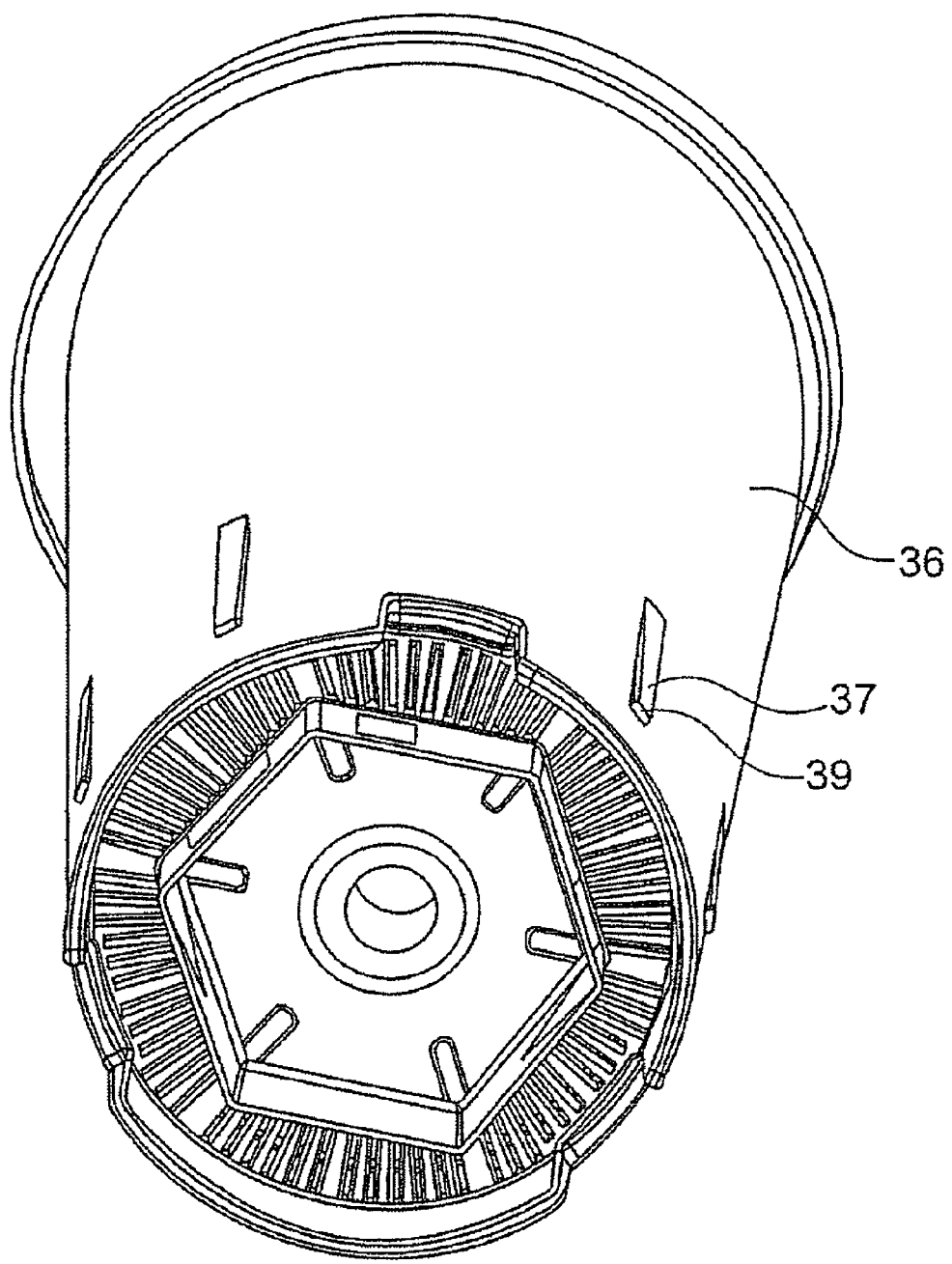
Figure 15:
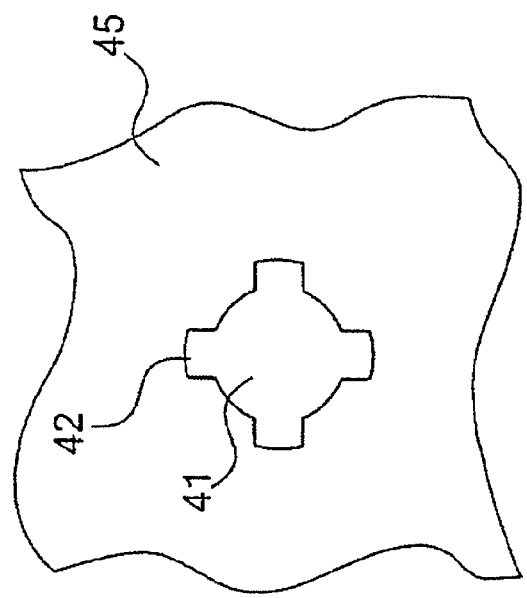
Figure 16:
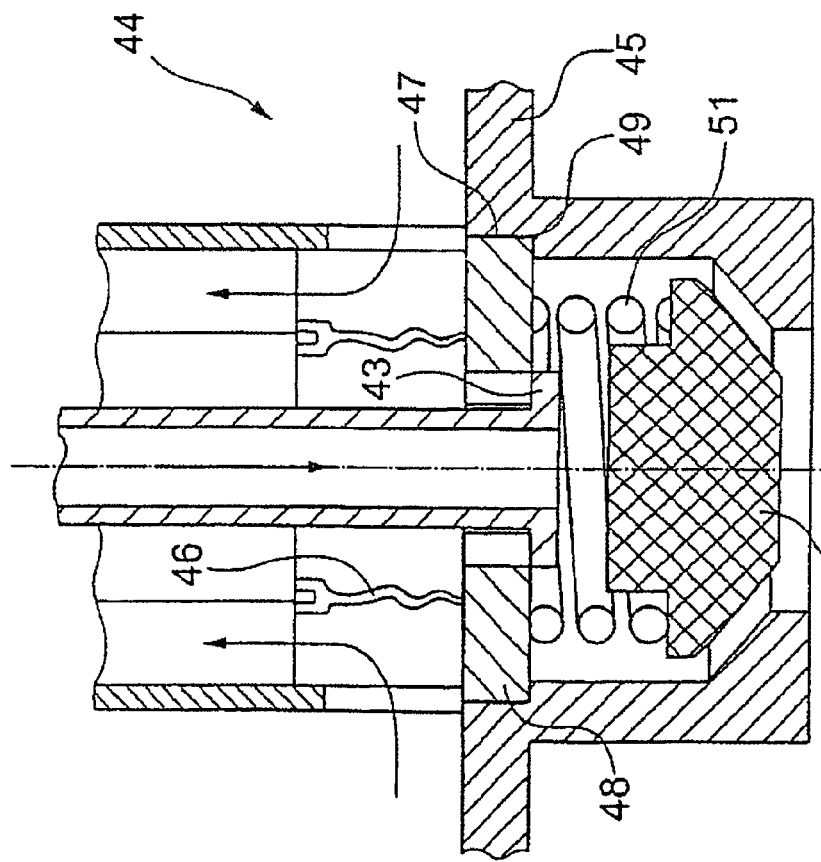
Figure 17:
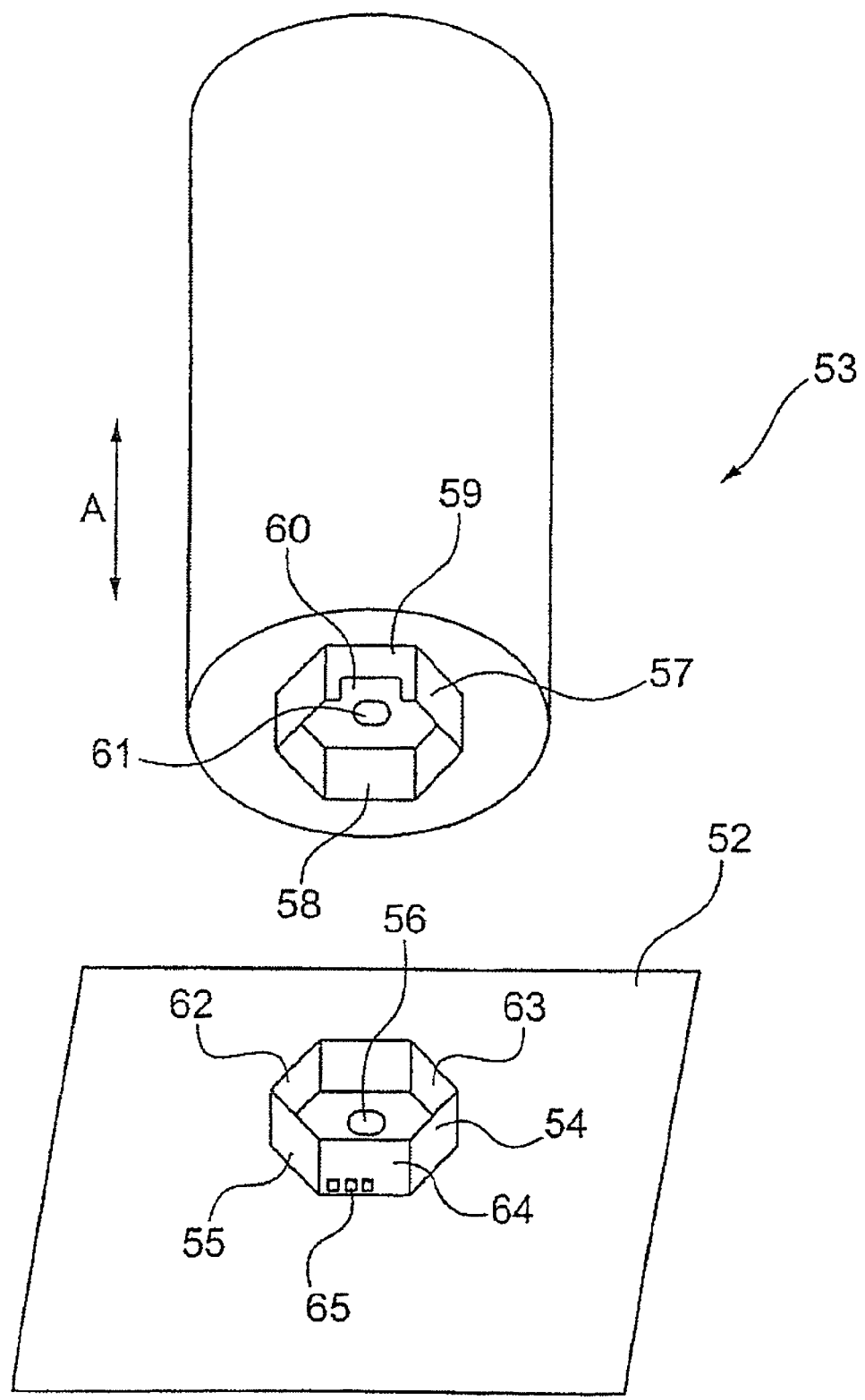
Figure 18:
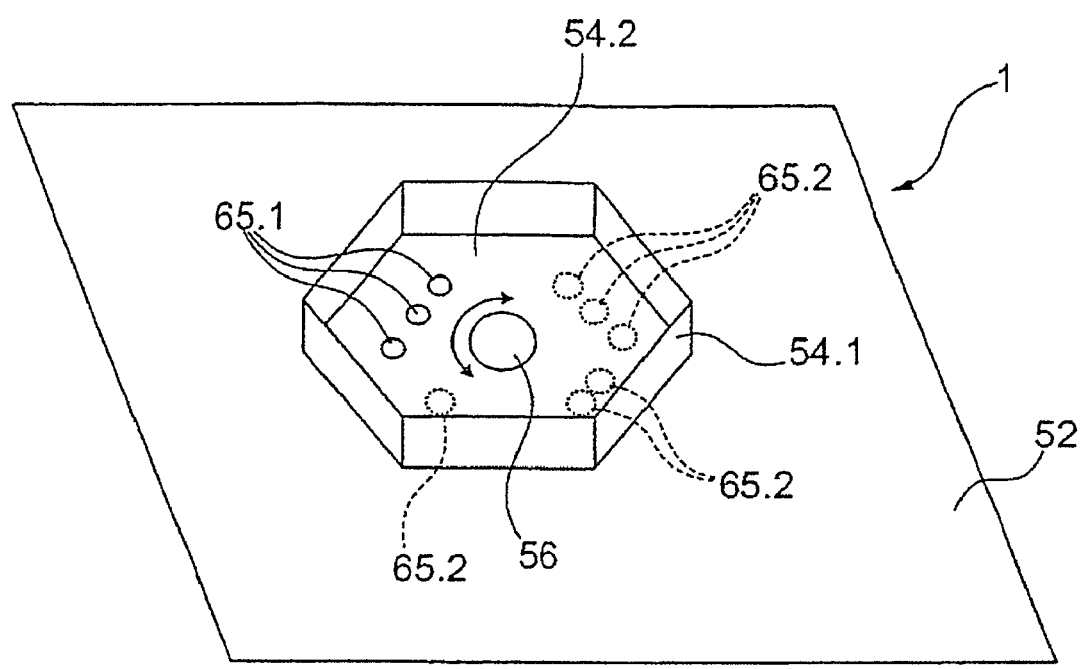
Figure 19:
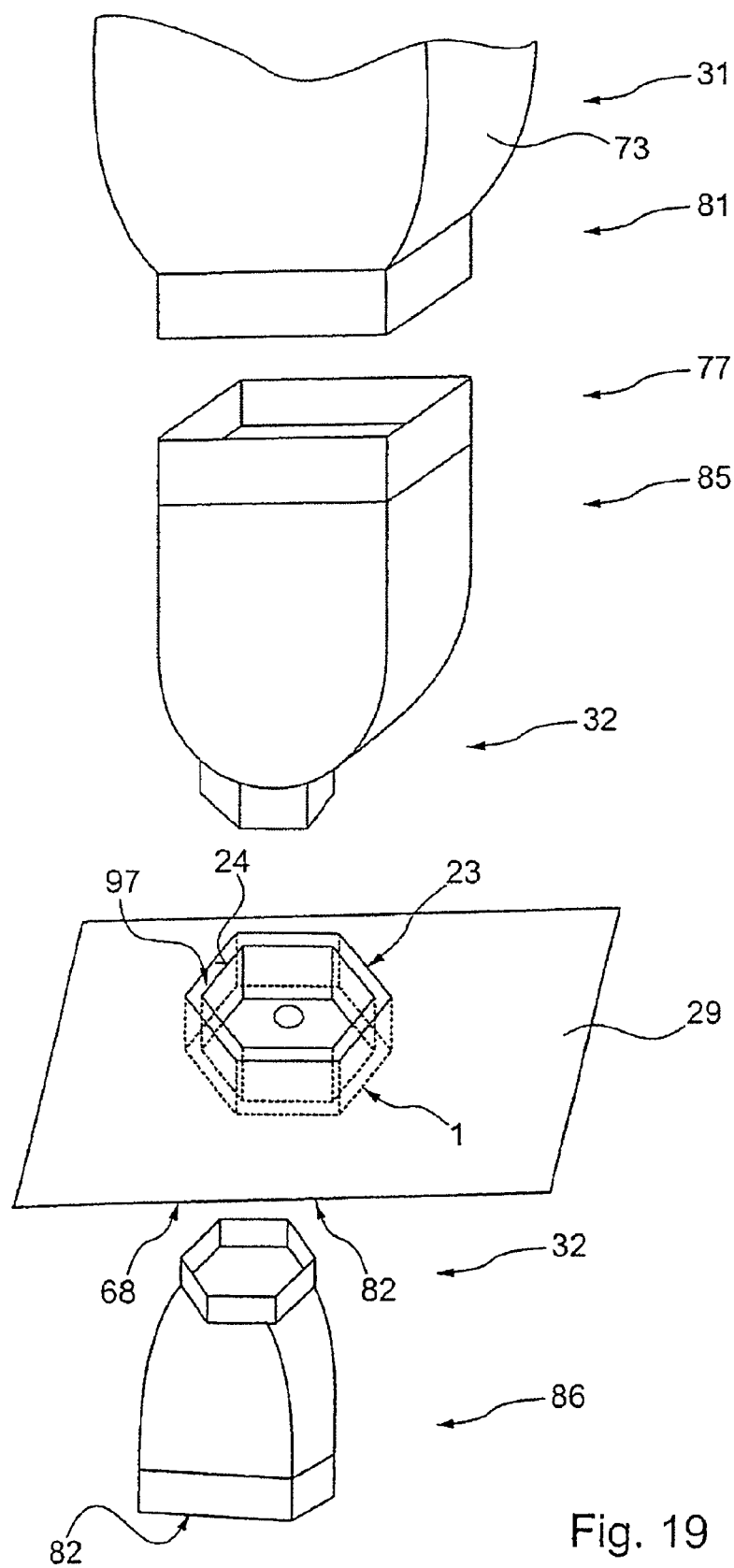
Figure 30:
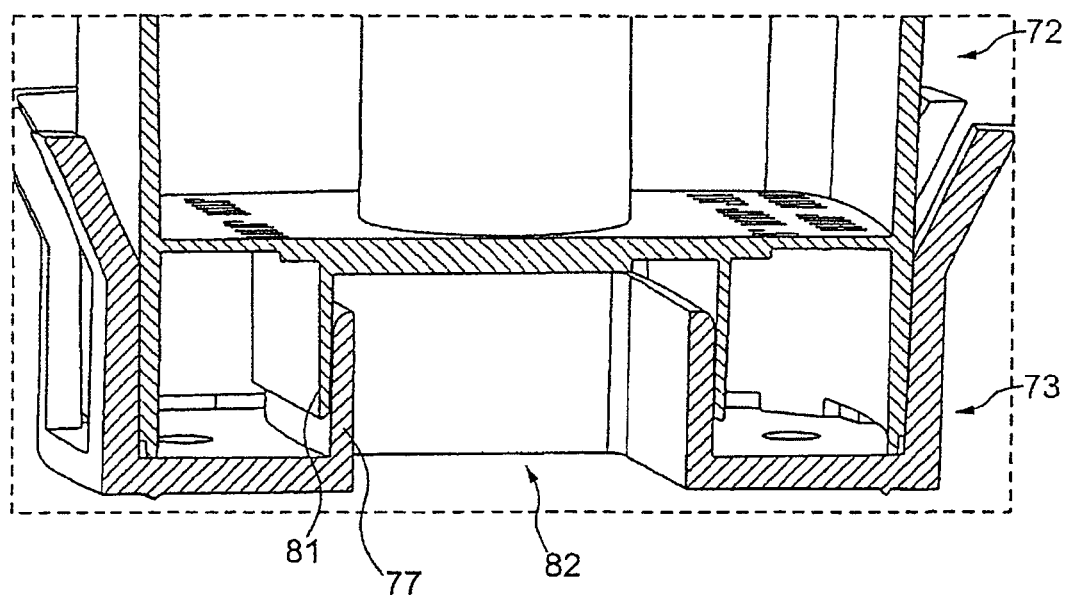
Figure 31:
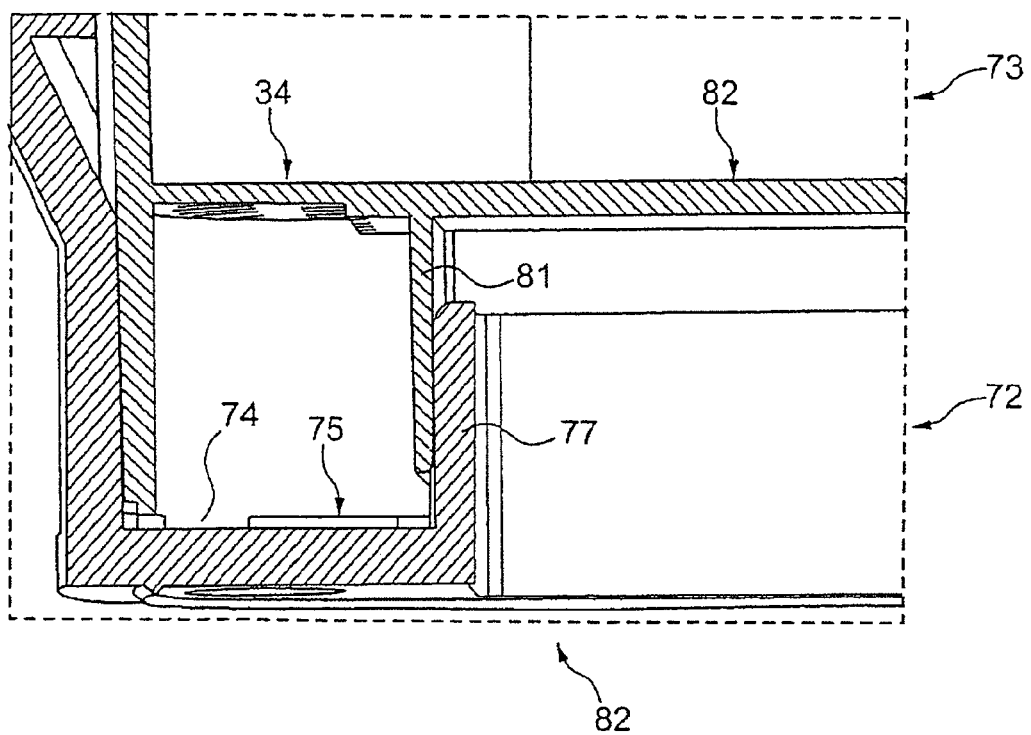
Figure 32:
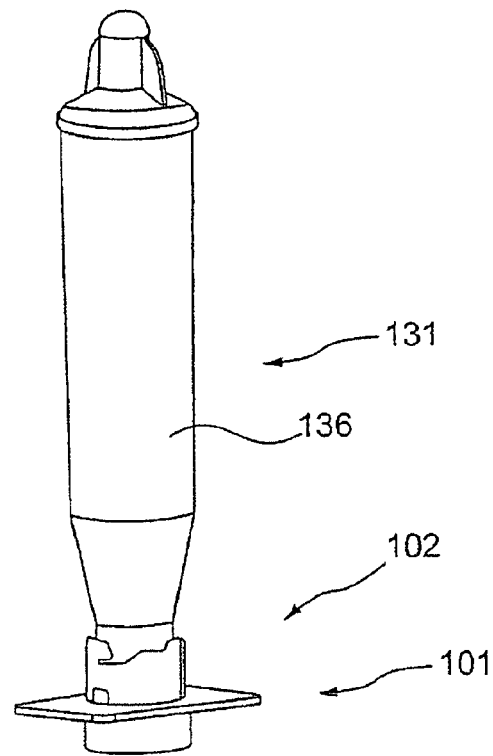
Figure 93:
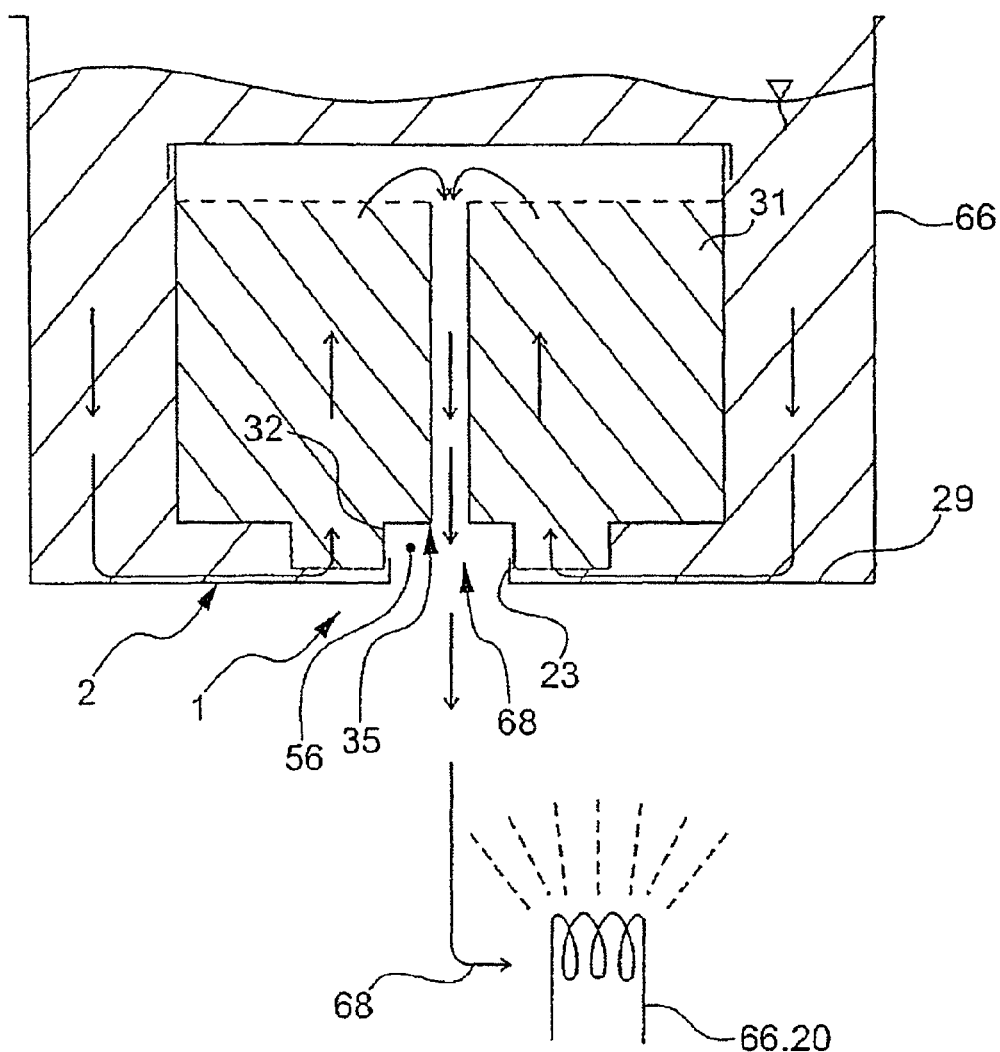

FIG. 4 shows a section illustration of the second embodiment as shown in FIG. 3, FIG. 5 shows an enlarged side view according to FIG. 3, FIG. 6 shows an enlargement of a detail from the side views shown in FIG. 3 and FIG. 5, FIG. 7 shows a plan view of a tank-side filter connecting element, FIG. 8 shows a section illustration of a connecting element as shown in FIG. 7, FIG. 9 shows a plan view of a further embodiment of a tank-side filter connecting element, FIG. 10 shows a section illustration through a filter connecting element as shown in FIG. 9, FIG. 11 shows a plan view of a bottom detail of a water tank according to a further embodiment, FIG. 12 shows a side view of a bottom detail of a water tank as shown in FIG. 11 with a filter cartridge inserted, FIG. 13 shows a plan view of the tank connecting element of a filter cartridge as shown in FIG. 12, FIG. 14 shows a perspective illustration of a filter cartridge as shown in FIG. 12, FIG. 15 shows a plan view of a bottom detail of a water tank according to a further embodiment, FIG. 16 shows a section illustration into the connecting area of the filter cartridge of an embodiment as shown in FIG. 11, FIG. 17 shows an embodiment variant with angle-dependent blending amount setting, FIG. 18 shows a second embodiment variant with angle-dependent blending amount setting, FIG. 19 shows, by way of example and schematically, a filter-side and an appliance-side tank connection, in each case in conjunction with an appropriately designed adapter piece, FIGS. 20-31 show a further embodiment of a filter connection for a filter cartridge which can be connected to a tank, having a tank-side filter connecting element and a filter-side tank connecting element, schematically and by way of example, in different views and details, and FIGS. 32-93 show further possible embodiments in different views, by way of example and schematically.

DETAILED DESCRIPTION OF THE INVENTION INCLUDING BEST MODE

Figure 1:
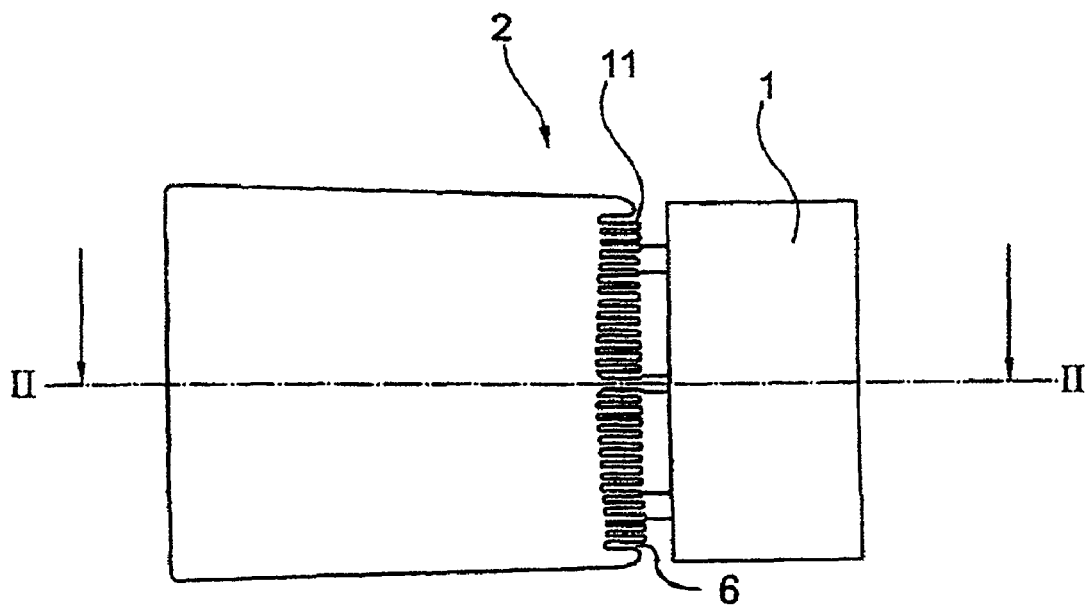
FIG. 1 shows a side view of the filter connecting area in a first embodiment.
Figure 2:
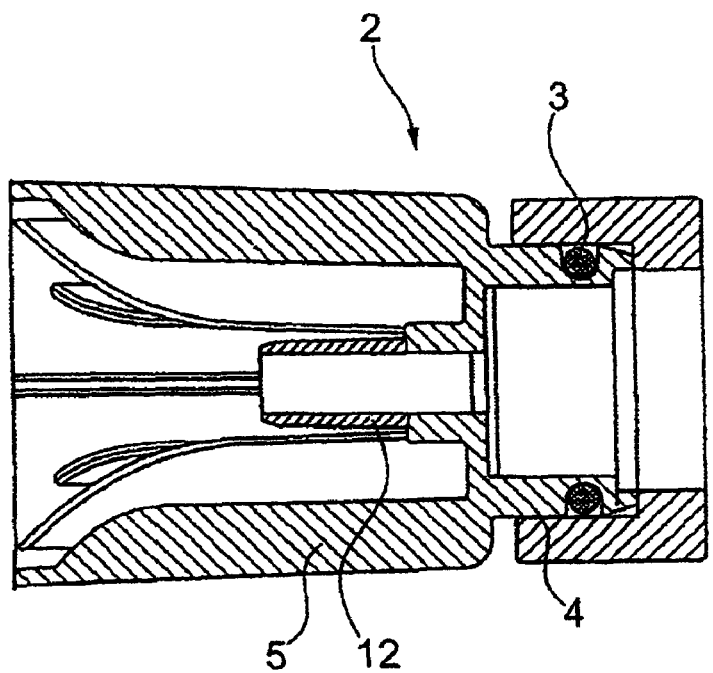
FIG. 2 shows a section illustration of the connecting area shown in FIG. 1.

FIG. 1 shows the connecting elements of a water tank and of the associated, preferably gravimetrically operated, filter cartridge. In the gravimetric mode, the water which is located above the filter path in the tank presses on that located underneath through the filter cartridge. If required, an apparatus which produces reduced pressure, for example a pump, could also be provided in order to assist this gravimetric operation, thus also allowing combined gravimetric operation with suction assistance. Referring now to FIGS. 1-6 a connecting fitting 1 is shown on the tank side and is firmly connected to the bottom of an associated tank, for example by welding, adhesive bonding or by attachment in some other way. The tank connecting element 2 of a filter cartridge is inserted into this connecting fitting 1 and is sealed by means of a radial seal 3. The tank connecting element has a connecting stub 4 which merges into a cartridge housing 5, only part of which is illustrated. In the embodiment variant shown in FIGS. 1 and 2, the water is passed via side slots 6 into the cartridge housing 5, and then passes through a filter bed, which is not illustrated in any more detail. In this case, the filter part may be designed for upwards flow, downwards flow or a combination of both flow paths. The filtered water is finally passed through the outlet-flow tube into a reservoir or storage vessel, or into the appliance connection.

FIG. 3 shows another embodiment variant with a connecting fitting 8 with an out-flow tube 7 and a tank connecting element 11, and a connecting stub 10 is also provided in this case, and is inserted into the connecting fitting 8. The connecting stub 10 merges into a cartridge housing 11, only part of which is illustrated, once again. In this embodiment variant, an axial seal 12 is provided, which seals the filter cartridge from the tank bottom, which is not illustrated in any more detail.

In the embodiment variant shown in FIGS. 3 and 4, the water passes via the intermediate area 13 between the connecting stub 10 and the axial seal 12 into the filter housing. Sieve slots which are not illustrated in any more detail are provided for this purpose, allowing entry into the filter cartridge housing 11. Here as well, filtered water is passed via the inner outlet-flow tube 14, after a filter path with any desired flow direction, for example upwards flow, downwards flow or a combination of upwards flow and downwards flow, back into the outlet-flow area of the associated tank.

The embodiment shown in FIGS. 3 and 4 is provided with a bayonet fitting, which is illustrated in more detail in FIGS. 5 and 6. For this purpose, the connecting fitting 8 is provided with the holder and guide webs 15 into which projections 16 which project radially from the connecting stub 10 are inserted. The filter cartridge is latched in the connecting stub 10 by a rotary movement, by means of appropriate latching elements 17, 18 in the projections on the filter cartridge on the one hand and in the holding and guide webs 15 on the other hand. This results in the filter cartridge having a defined final position. More extensive holders are no longer necessary since this type of bayonet fitting holds the filter cartridge reliably on the bottom, with the axial seal 12.

In the embodiment shown in FIGS. 3 to 6, the projections 16 and the associated holding and guide webs 15 themselves form a type of coding structure. Both in this embodiment and in the embodiment shown in FIGS. 1 and 2, additional coding structures according to the invention may be provided. FIG. 7 shows a plan view of one possible refinement of a connecting fitting 19 with three openings 20, which are shaped in the form of a keyhole. By virtue of their arrangement and shape, these openings 20 form a radial coding structure. As can be seen in FIG. 8, coding projections in the form of key bits can be inserted into these openings 20. Furthermore, a matching coding spring 22 can be formed in the associated connecting fitting 19, fitting into the groove that is formed between the coding projections 21. When a filter cartridge is inserted into the connecting fitting 19 and is rotated, the openings 20, the coding projections 21 and the coding spring 22 accordingly interact with one another and thus result in coding structures which allow only a filter cartridge with appropriate structures to be inserted.

The embodiment shown in FIGS. 9 and 10 corresponds to the embodiment variant described above, but illustrating a quadruple key/lock principle now instead of a triple key/lock principle. Four openings are now provided instead of three openings 20. Furthermore, the rotation angle $\alpha$ is illustrated, through which the coding projections 21 can be rotated with respect to the openings 20 in order to achieve the installed position.

FIG. 11 shows a type of coding which differs from the abovementioned exemplary embodiment.

A tank-side connecting fitting 23 has a hexagonal external contour whose circumferential outer surface forms a sealing surface 24. Outer shells 25 are arranged externally around the fitting 23 and are suitable for at least partially surrounding a filter cartridge housing and its connecting area on the outside.

Blocking elements 26 are fitted in the intermediate space between the connecting fitting 23 and the outer shells 25, and ensure that only a narrow seal, which fits the sealing surface 24, can be inserted into the area of the connecting fitting 23.

Bottom ribs 27, 28 prevent sealing with respect to the tank bottom 29, in the same way that internal ribs 30 prevent sealing by means of an inner radial seal. These structures mean that only the sealing surface 24 is accessible as a sealing surface, as a result of which the hexagonal external contour of the sealing surface 24 provides a coding structure according to the invention.

The filter cartridge 31 (FIGS. 12 & 13) which has been inserted is provided with a molded seal 32 which accordingly likewise has a hexagonal cross section (see FIG. 13). The internal surface of the molded seal 32 in this case forms the sealing surface 33.

Furthermore, FIG. 13 shows the inlet slots 34 for supplying water into the filter cartridge, as well as an outlet-flow opening 35 for water to flow out of.

Above the molded seal 32 with a correspondingly shaped connecting fitting 23, the illustrated embodiment also comprises further coding structures. For example, snap-action elements 37 (cf FIG. 14) are integrally formed externally on the filter cartridge housing 36. The snap-action elements 37 can be inserted into corresponding holders 38 in the outer shell 25. A pressure point is created when the lower edge 39 is placed on the stop 40 of the holders 38. Until reaching this position, the filter cartridge 31 can easily be placed in the correct angular position, without any opposing resistance. In this angular position, the molded seal 32 is located such that it is aligned with respect to the sealing surface 24 of the connecting fitting 23, such that it can be inserted further in the axial direction. By pushing in further in the axial direction, the snap-action element 37 snaps over the stop 40, with the molded seal 32 being pushed in along the sealing surface 24. The inclination of the snap-action elements 37 and the corresponding internal shape of the outer shells 25 fix the filter cartridge 31 in the outer shells 25. There is no longer any need for any further axial fixing elements in this embodiment.

FIG. 15 illustrates a further embodiment variant. FIG. 15 shows a bottom section of a tank which has a bottom opening 41 which, by virtue of its contour, is used as a keyhole. By way of example, the external contour in the present exemplary embodiment is provided with grooves 42. The contour of this bottom opening 41 can, however, be chosen freely, as a coding structure.

Corresponding key elements, matched to this contour of the bottom opening 41, are provided in the filter-side tank connecting area 44. In the present case, key elements 43 are in the form of hooks, as a result of which they can be passed through the tank bottom 45 by means of the grooves 42 and then clasp the bottom 45 in an undercutting manner by rotation. Once again, this results in a type of bayonet fitting. The filter cartridge is fixed to the bottom 45 by means of this fitting. The inlet-flow area is sealed via an axial seal 46 from the outlet-flow area (see the arrow pointing downwards), as illustrated by arrows pointing upwards. In this embodiment as well, the flow can be guided as required in the filter bed.

The shape of the bottom opening 41 makes it possible to prevent sealing being achieved by a radial seal in the bottom opening 41. Furthermore, ribs and/or grooves which are not illustrated in any more detail on the bottom 45 can be used to prevent the possibility of bottom sealing outside the location intended for the axial seal 46. Ribs such as these can in this case also be made sufficiently high that they additionally hold the cartridge on the outside.

FIG. 16 shows a non-return valve which is arranged underneath the bottom 45, seals the tank in the raised state, and is pressed upwards during fitting to the associated machine, thus releasing the corresponding opening.

A separating line 47 illustrates one possible way of manufacturing a tank-side filter connection such as this. The keyhole or the bottom opening 41 is in this case arranged in a disk 48, which is manufactured separately from the rest of the tank. This allows the tank and in particular also the illustrated area to be manufactured using a spraying process, thus making it possible to reliably ensure external sealing. A disk 48 is then inserted, which can be done without any problems by means of the annular shoulder 49. The disk 48 can then be connected in any desired manner to the tank bottom 45, for example by welding, in particular ultrasound welding. Furthermore, before the disk 48 is inserted, the valve can be inserted, for example in the form of the valve body 50 with a spring 51.

In addition to the advantageous type of manufacture, this design also offers the capability to design the coding by means of the bottom opening 41 as a keyhole to be extremely flexible and variable, and only one other disk 48 is inserted in the keyhole. This allows coding for different tank and machine types to be provided in a particularly simple form. An associated filter cartridge can likewise be adapted simply by modifying the key elements 43 without any complex measures being required on the filter cartridge for this purpose. In this embodiment variant, the bottom fixing by means of key elements 43 that engage behind in conjunction with the axial seal 46 is particularly advantageous, since the fixing and the coding are at least partially carried out by the same components.

In a modification of this embodiment, the disk 48 is not flat but is in the shape of a dome or a projection from the tank bottom, which extends into the interior of the tank and on which the filter cartridge can then be fixed. This refinement would have the advantage that already existing valve forms and tank elements can be retained in the area of the tank connection.

FIG. 17 shows a schematically illustrated embodiment with a blending amount which can be adjusted as a function of the angle. The tank bottom 52 is illustrated only in the form of a detail, in the connecting area of the filter cartridge 53. The tank bottom 52 comprises a hexagonal connecting fitting 54, which converges slightly in the upwards direction, in the form of a truncated pyramid. This tapering cross section can scarcely be seen in the perspective illustration.

At the same time, the outer surfaces 55 of the connecting fitting are used as a sealing surface, in order to entirely or partially seal the outlet-flow line 56 with respect to the interior of the tank when the filter cartridge 53 is fitted.

The filter cartridge 53 has a hexagonal seal 57 which corresponds to the connecting fitting 54. The individual walls 58, with the exception of one wall 59, have the same length in the axial direction A. The wall 59 is provided with a cutout 60 on the lower face, whose function will be explained in more detail in the following text. The outlet 61 from the filter cartridge 53, through which the filtered water is passed into the outlet-flow line 56, can be seen in the interior of the seal 57.

Different fitting walls 62, 63, 64 of the connecting fitting 54 are provided with a different number of bypass openings 65. The bypass openings 65 are arranged such that they are closed in a sealed manner by the longer sealing walls 58 when the filter cartridge 53 is plugged on. Only where the wall 59 with the cutout 60 is used can the bypass openings 65 remain open, as a result of which filtered water is passed directly via the cutout 60 out of the tank to the area of the outlet-flow line 56.

As can be seen easily from the illustrated exemplary embodiment, the angled arrangement of the filter cartridge, that is to say with the selection of the fitting wall 62, 63, 64, on which the cutout 60 is provided, makes it possible to adjust the size of the free cross section of the bypass openings 65.

In the present embodiment, the cross-sectional openings of the plurality of bypass openings 65 that are provided are added. In other embodiments, bypass openings 65 of different sizes can also simply be provided. Different proportions of unfiltered water which is added to filtered water result from the different cross sections of individual bypass openings 65 or from the total of a plurality of bypass openings 65 on one fitting wall, for example the fitting wall 64. This thus results in a blending setting which is dependent on the angular position of the filter cartridge 53.

In addition to the illustrated embodiments, further embodiments or combinations of these embodiments are feasible without any problems. For example, the coding structures which have been described with reference to the connecting fittings 1 and 8 shown in FIGS. 7 to 10 can thus also be accommodated in the wall of the bottom opening 41 or on a collar fitted on or under the bottom opening, and may be combined with key elements which, as in the abovementioned exemplary embodiment project inwards from the filter cartridge.

The reversal of a principle such as this in the form of key elements which are fitted to the tank bottom and project into the filter cartridge where they meet corresponding matching opposing contours, would likewise be feasible.

A further possible embodiment of a blending setting can be implemented, for example, by the provision of a driver element, which can be operated by the filter cartridge, in the form of a connecting fitting 54.1, whose position can be adjusted by rotation, corresponding to the illustration in FIG. 18. The bottom 54.2 of the rotatable connecting fitting 54.1 in this case, by way of example, has three bypass openings 65.1 and, depending on the rotation position, can be arranged with respect to the tank bottom 52 such that complementary bypass openings 65.2 which are arranged in the tank bottom 52 are released, allowing fluid to pass, or are closed.

Purely by way of example, this illustration shows four different settings, the illustrated rotation position with the bypass closed and three further positioning options, with respectively one, two or all three bypass holes 65.1 being released, by their positions being made to match with the corresponding bypass holes 65.2. A possible separating variant between the bypass holes 65.1 which are connected to the tank-side fresh-water connection and the outlet-flow line 56 which, by way of example, is arranged centrally, would be the arrangement of a seal located inbetween, in particular and preferably an axial seal which extends, providing a seal, between the end face of the filter-side tank connecting element and the bottom 54.2 of the connecting fitting 54.1. However, other and possibly also additional separating and/or sealing elements can, however, also invariably be provided between the fresh-water side and the filter-water side.

In addition to the illustrated embodiments, further embodiments and/or combinations with these embodiments are also feasible without any problems. For example, the coding structures described above in the form of hexagonal polygons, which are illustrated by way of example, can thus have other coding structures added to them, once again for example in the form of quadrilateral polygons, and/or can be combined therewith, as is additionally shown by way of example in an embodiment in FIG. 6.

Finally, in addition to a fitting/filter connection described in comparison to the embodiments in FIGS. 11 to 14 and 17 and in the form of an axial projection 23 on the tank-side filter connecting element 23, FIG. 19 shows a complementary form as an axial recess 23 formed in the tank bottom 29 in which, in the same sense, all the coding options described with respect to the first embodiment can also be implemented here, to be precise either in the same way and/or also in a complementary form, or else in combined embodiments.

As a second major feature, FIG. 19 shows the option of using adapters 85, 86. The adapter 85 is illustrated purely by way of example for connection of a filter cartridge 73, which is likewise illustrated by way of example, to a tank-side filter connection 1, in which case the embodiment of the filter connection 1, in particular its fitting 23, as already described above, may be both in the form of an axially projecting fitting and in the form of an axially recessed groove. The same applies in the same sense to the tank-side appliance connection on the lower face of the tank bottom 29. Because the functionalities are the same in this sense, the individual elements are also provided with the same reference numbers as those which in some cases have already been used above in the description. For clarity reasons, the details of the blending apparatus are not illustrated, with reference being made to the examples in FIGS. 17 and 18, although embodiments such as these are also possible in a corresponding manner here.

The illustrated embodiment variants also show the widely differing coding structures which can be provided according to the invention. In any case, this ensures that only appropriately matched filter cartridges with a key function fit into the corresponding tank-side filter connections.

In a further embodiment, by way of example, the coding structures described above in the form of hexagonal polygons, which are illustrated by way of example, can have other coding structures added to them, once again by way of example in the form of quadrilateral polygons, for example, and/or may be combined therewith, as is additionally illustrated, by way of example, by the embodiment in FIGS. 20 to 31, for example.

Figure 20:
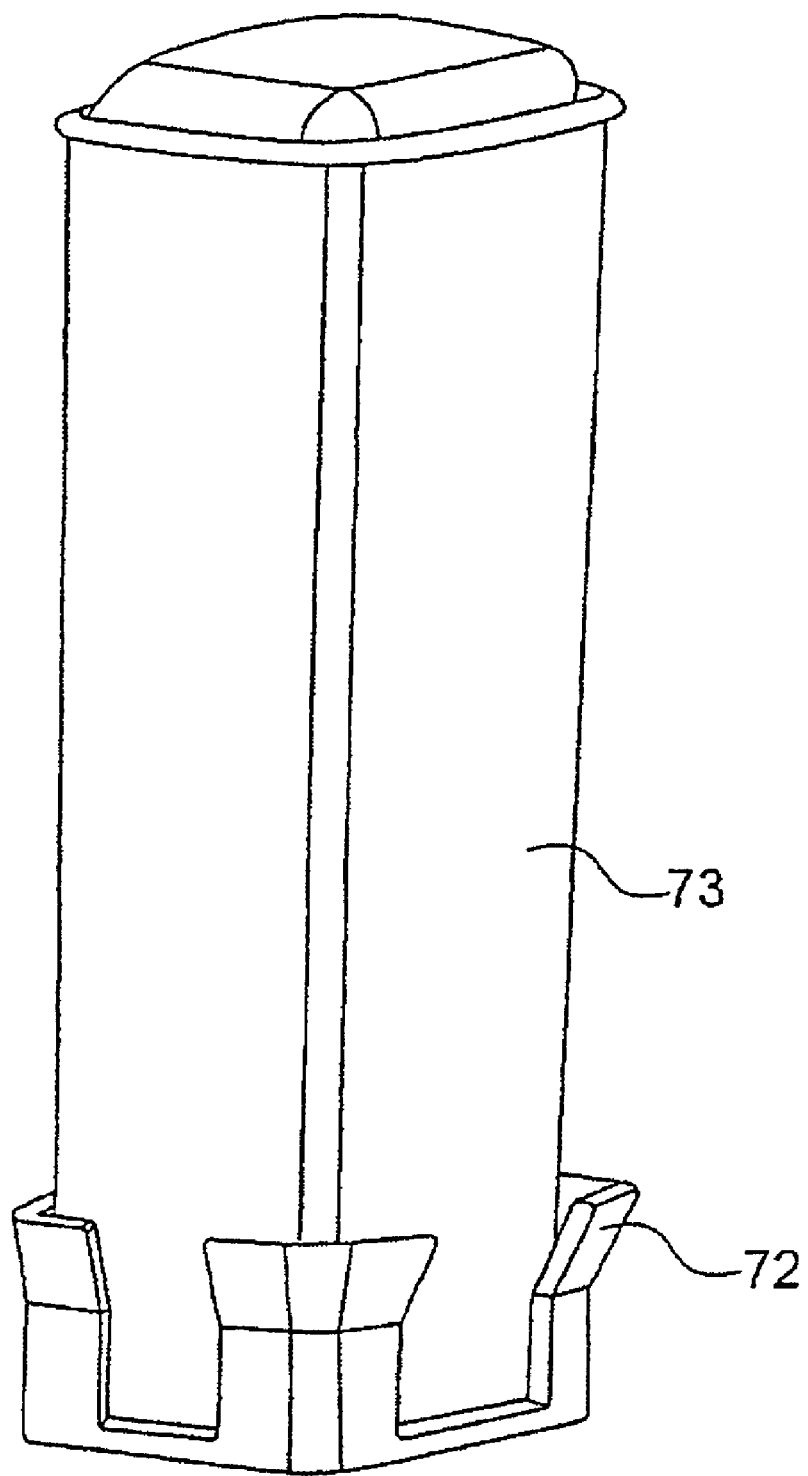

In detail, FIG. 20 shows a connecting fitting 72 which has a quadrilateral contour in a plan view and in which an appropriately shaped cartridge 73 with a complementary connecting piece, which likewise has a quadrilateral cross section, is inserted. For the sake of clarity, the tank and the tank bottom, to which the connecting fitting 72 can be connected forming a seal, have not been illustrated here.

Figure 21:
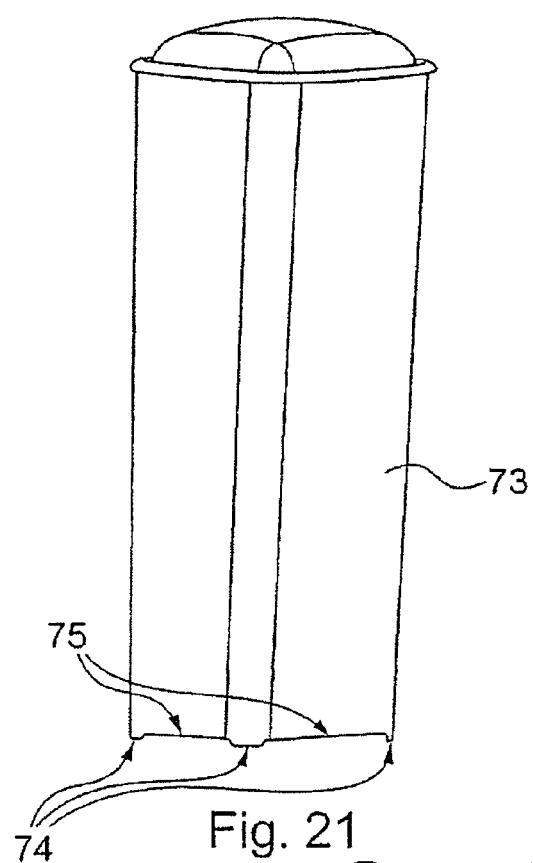
Figure 22:
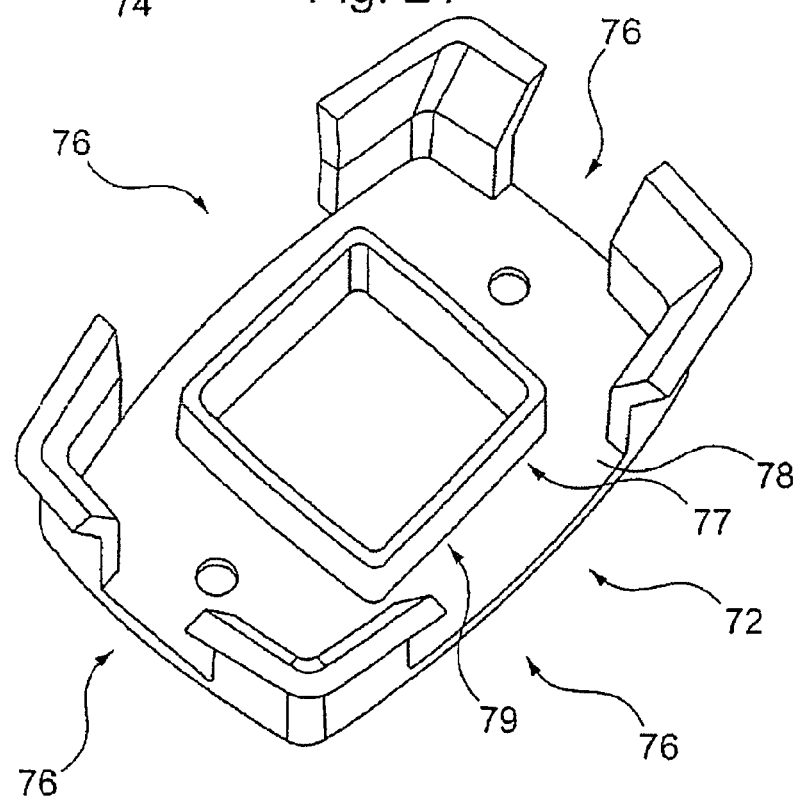

FIGS. 21 and 22 show the cartridge 73 and the connecting element 72, in each case illustrated on their own. Three of four feet 74 that are provided can be seen in the lower area of the cartridge 73, between each of which an inlet-flow opening 75 is formed, which is sufficiently large for fresh water to enter, when a cartridge 73 is inserted in the connecting element 72. The connecting element 72 has correspondingly complementary inlet openings 76 for fresh water to pass through from the tank towards the filter cartridge 73. A connecting fitting 77 which, by way of example corresponds to the connecting fitting 23, is formed by way of example centrally on a baseplate 78 of the connecting element 72, once again in the form of a projection. This connecting fitting 77, which is in the form of a projection, has a sealing surface 79 on its external circumferential surface, which sealing surface 79 separates the fresh-water area, forming a seal, from the area of the water that has been filtered by the filter, with respect to a complementary holding structure, which is arranged on the filter cartridge. In this quadrilateral embodiment as well, the connecting fitting 77 can preferably have an at least slightly conical shape, such that the cartridge to be fitted can on the one hand be fitted more easily with its connecting piece and, on the other hand, a larger surface area can also be provided for mutual coverage for sealing between the two elements.

Figure 23:
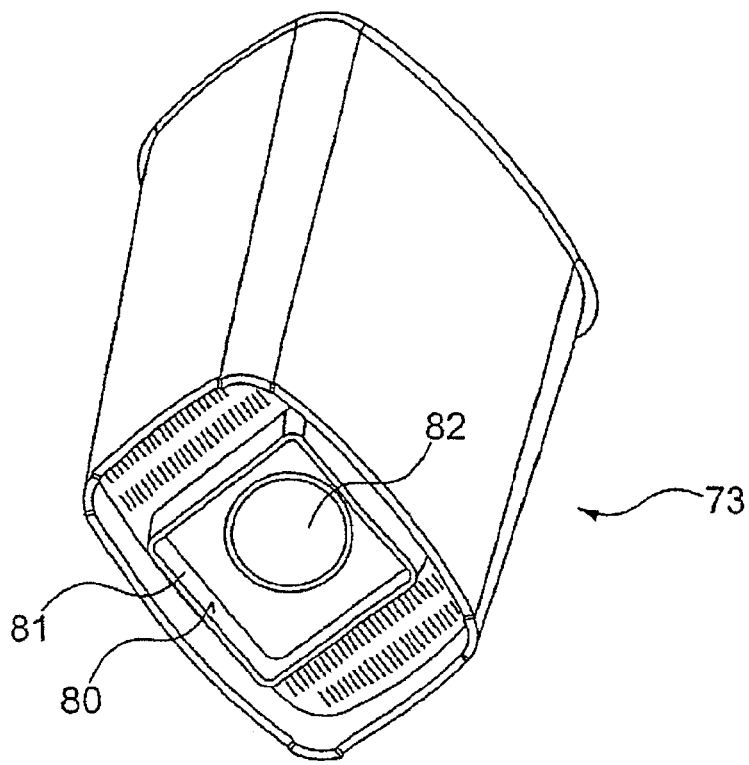
Figure 24:
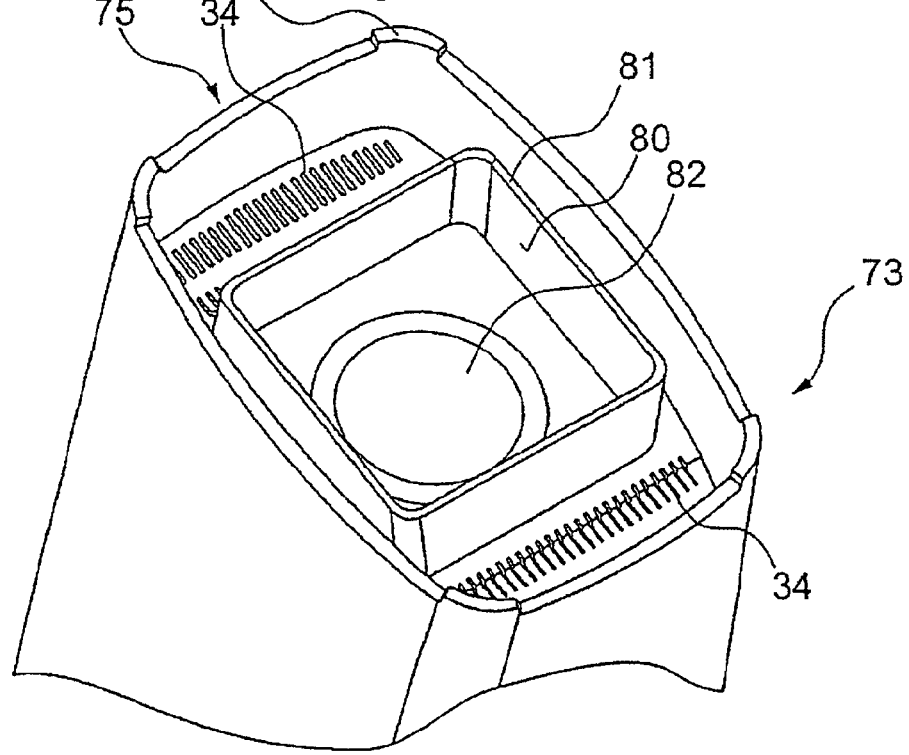

FIGS. 23 and 24 each show a cartridge 73 in a view from underneath, in which a molded seal 81, which is complementary to the connecting fitting 77 and has a sealing surface 80 formed in it, is illustrated. By way of example, the outlet 82 for the filtered water can be seen centrally in the middle, and this filtered water can flow through the inlet-flow slots 34 into the filter.

Figure 25:
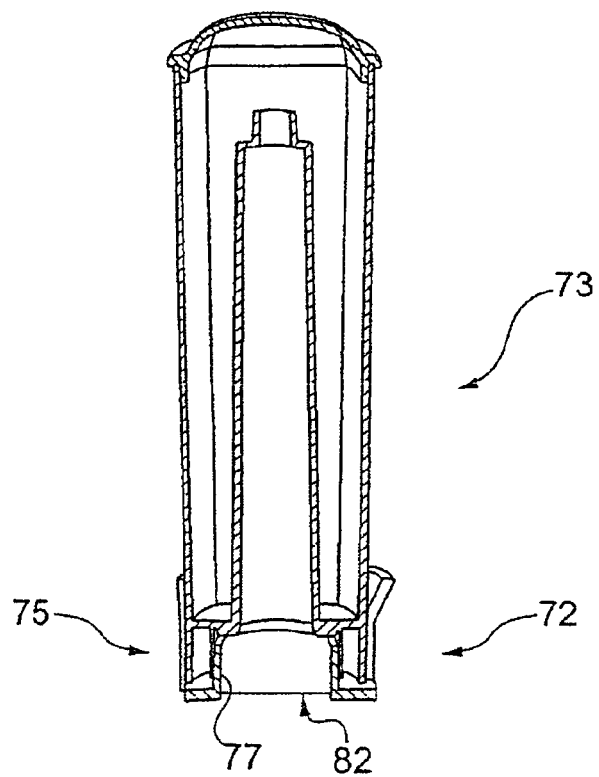
Figure 26:
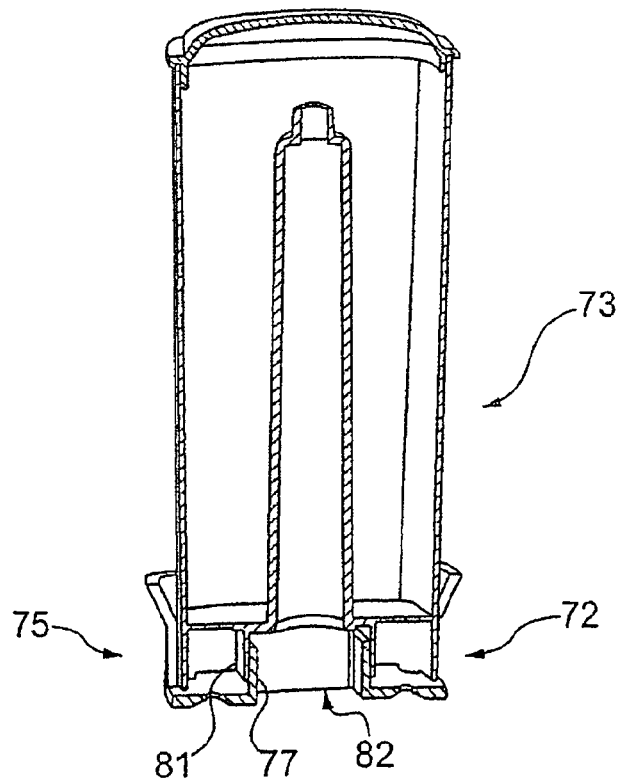

FIGS. 25 and 26 each show a longitudinal section through the connecting element 72 and a cartridge 73 inserted therein, firstly along the broad face (FIG. 25) and secondly along the longitudinal face (FIG. 26), of the connecting structure, which has a rectangular plan view.

Figure 27:
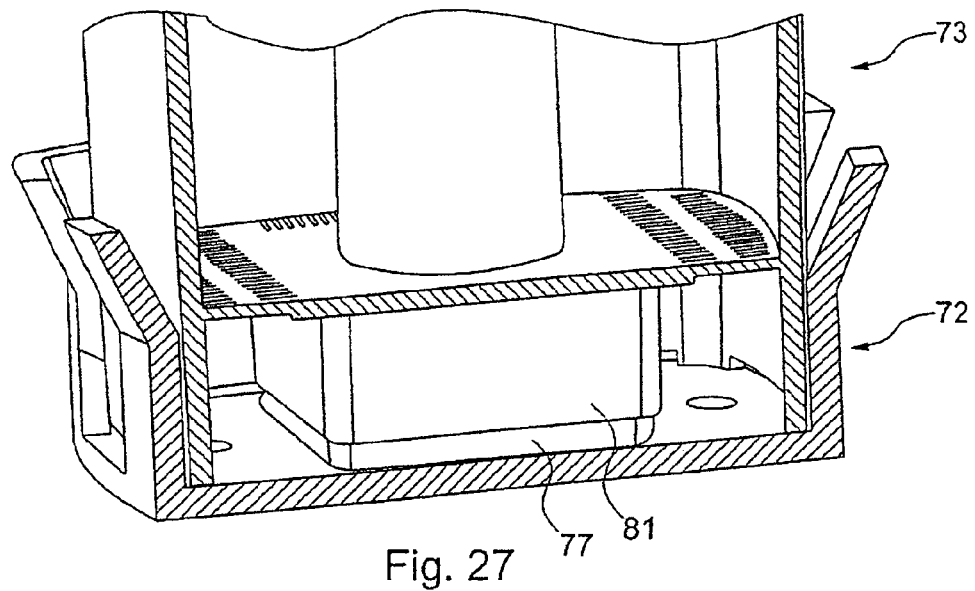
Figure 28:
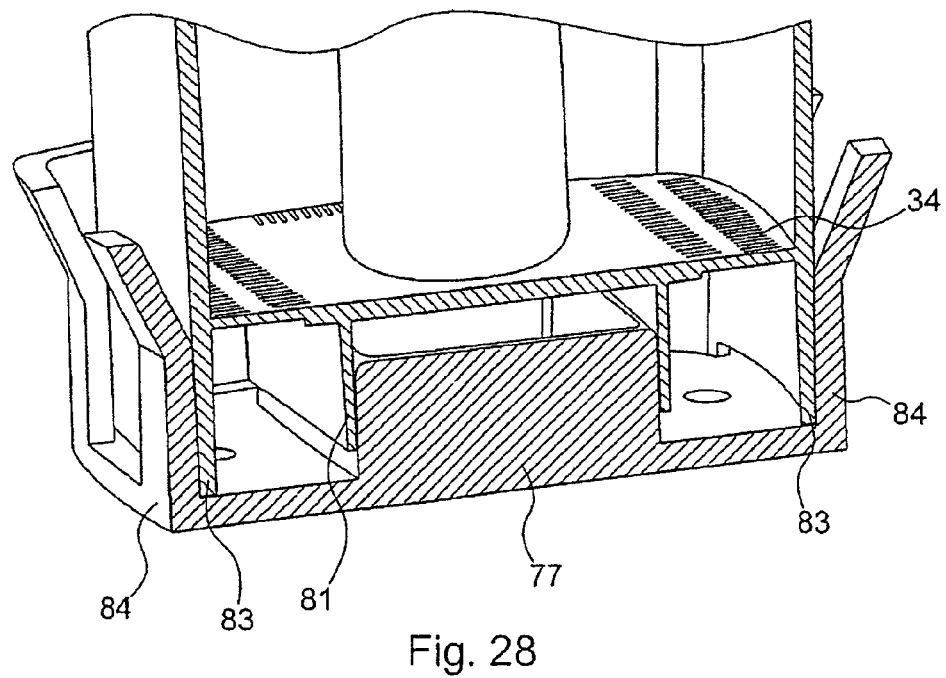

FIGS. 27 and 28 show two details in the connecting area between the connecting fitting 77 and the cartridge 73 with a molded seal 81 arranged therein, in each case in a section plane located at a different depth. FIG. 28, in particular, shows very well that, in addition to the interlocking connection between the molded seal 81 and the connecting fitting 77, a fixing effect is also provided between the lengthened outer wall 83, the filter cartridge 73 and the elements of the outer shell 84, preferably likewise in an interlocking manner.

Figure 29:
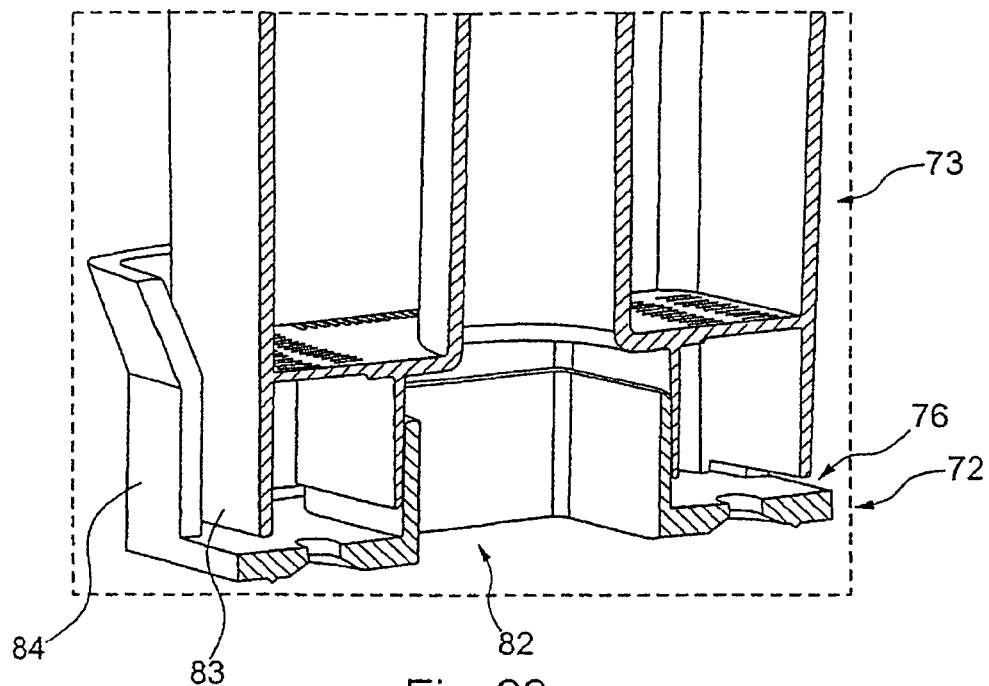

FIGS. 29 and 30 show two further section illustrations, corresponding to FIGS. 27 and 28, but once again on section planes located at different depths.

Finally, FIG. 31 shows a further illustration, in the form of a detail, on an even larger scale.

Even further possible embodiments will be described in the following text. FIGS. 32 to 39 show a tank/filter-cartridge connection with blending setting elements 106, 136.1, 160 and 165 and with coding structures, which are aligned axially with respect to a longitudinal axis of the connection, in conjunction with a further embodiment of an interlocking seal. For the sake of simplicity, features which correspond to the embodiments that have already been described are provided with the same basic numbering, but increased by the number 100.

Figure 33:
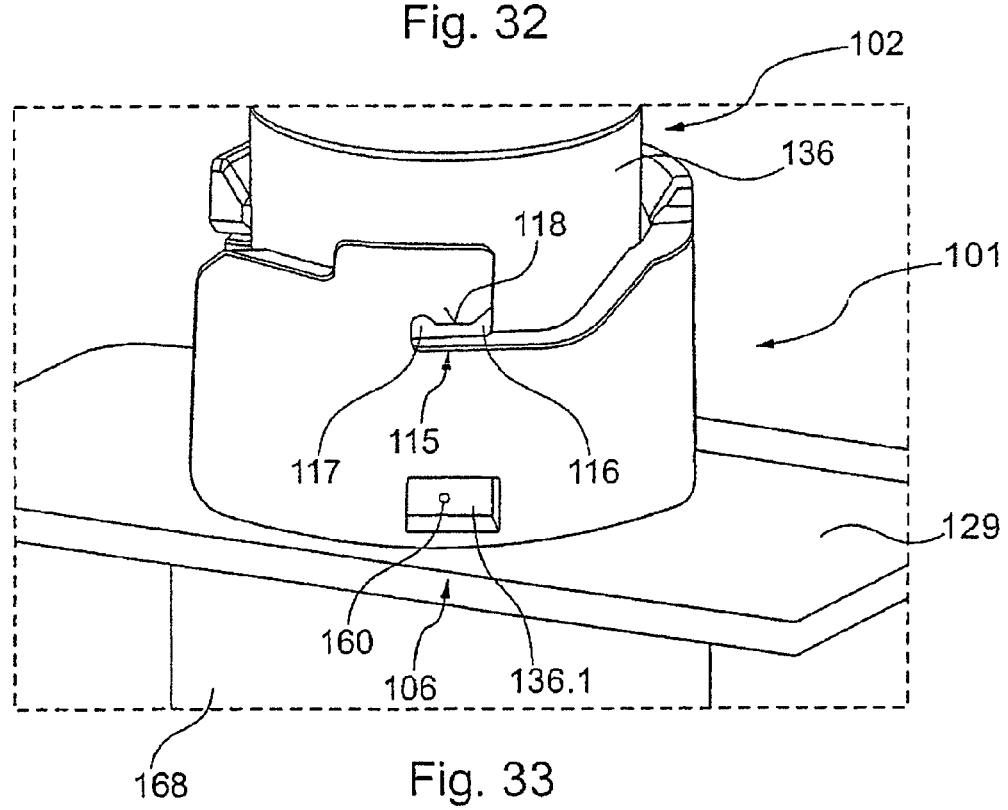

Accordingly, FIG. 32 shows a tank-side connecting stub 101 in which a filter cartridge 131 is connected via a filter-side tank connecting stub 102. Corresponding to FIG. 33, the housing 136 of the filter cartridge 131 is inserted completely in the tank-side connecting stub 101. The end of the cartridge housing 136 in FIG. 33 is illustrated behind an aperture slot 106 for the fresh water that is located in the tank to pass into the inner area of the connecting stub 101. In this section of the filter cartridge housing 136 that can be seen, a cutout 160 is illustrated in the form of a hole, which has the function of a blending element and allows fresh water to flow through it and through a further opening 165, which is arranged behind it but cannot be seen here but can be seen in FIG. 35, into the filter outlet area 135 (FIG. 35), in which the water which has been filtered by the cartridge is passed into the tank outlet 168. The blending setting can also be changed in this case for example by means of appropriate rotation positions, provided an embodiment is provided that has an adjustable, effective blending cross section. In one simple embodiment, as illustrated, a fixed blending setting is also possible which, for example, is independent of the rotation position.

A holding and guide web 115 for holding a radial projection 116 which is formed on the filter cartridge is illustrated as one of a number of possible ways of fixing the filter cartridge 131 on the tank-side connecting stub 101. Both have a respective latching element 117 and 118, which are complementary to one another, and latch into one another in a snapping form after a corresponding rotary movement during insertion of the filter-side tank connecting element 102, after overcoming corresponding clamping forces of the part which projects somewhat like a vane from the tank-side connecting stub. Since the latching element 117 has a thickened region in its front area, with respect to a rotary movement which is required for insertion of the filter cartridge, which is opposite a region cut out with a corresponding size in the latching element 118, this makes it possible to ensure that the two connecting elements are latched to one another in a secure position.

Figure 34:
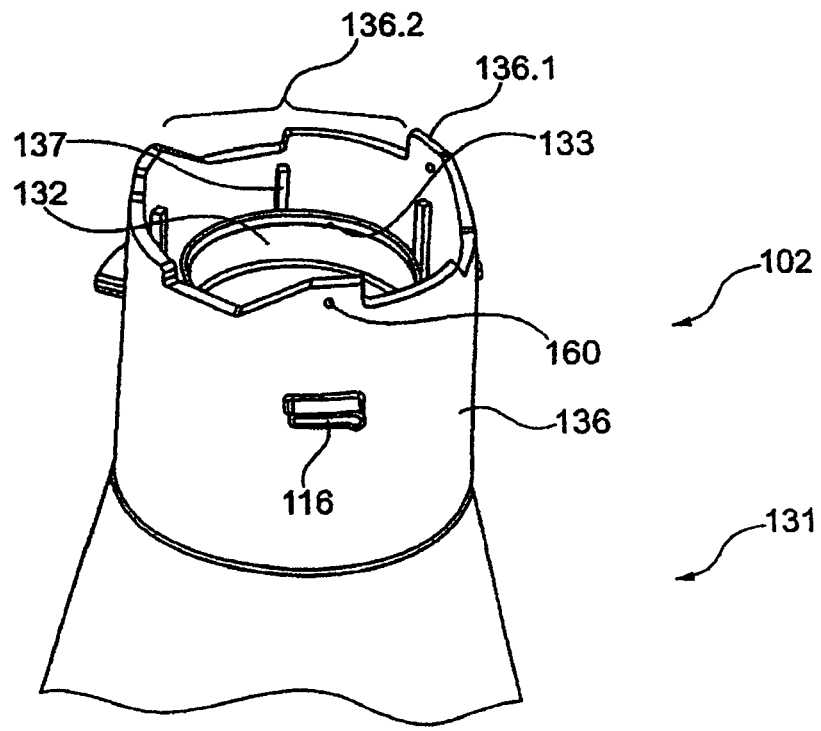

FIG. 34 shows the filter-side tank connecting area in the filter cartridge 131, with the housing 136 having a projection 136.1 which projects with respect to the cutouts 136.2 in the front, end area, in each case comprising the aperture opening 160, as already described above, as a blending element. For their part, the projections 136.1 of the filter cartridge housing 136 represent axially aligned coding structures which allow the filter cartridge to be inserted correctly in the relevant tank connecting element. As soon as one of these axial coding elements in the form of the housing projections 136.1 is missing, fresh water which is located in the tank flows directly through the aperture opening 106, which has a correspondingly large cross section, and the further bypass opening 165, which is located behind it, and likewise has a correspondingly large cross section, directly into a reservoir or storage vessel, or into the appliance connecting area 168.

Figure 35:
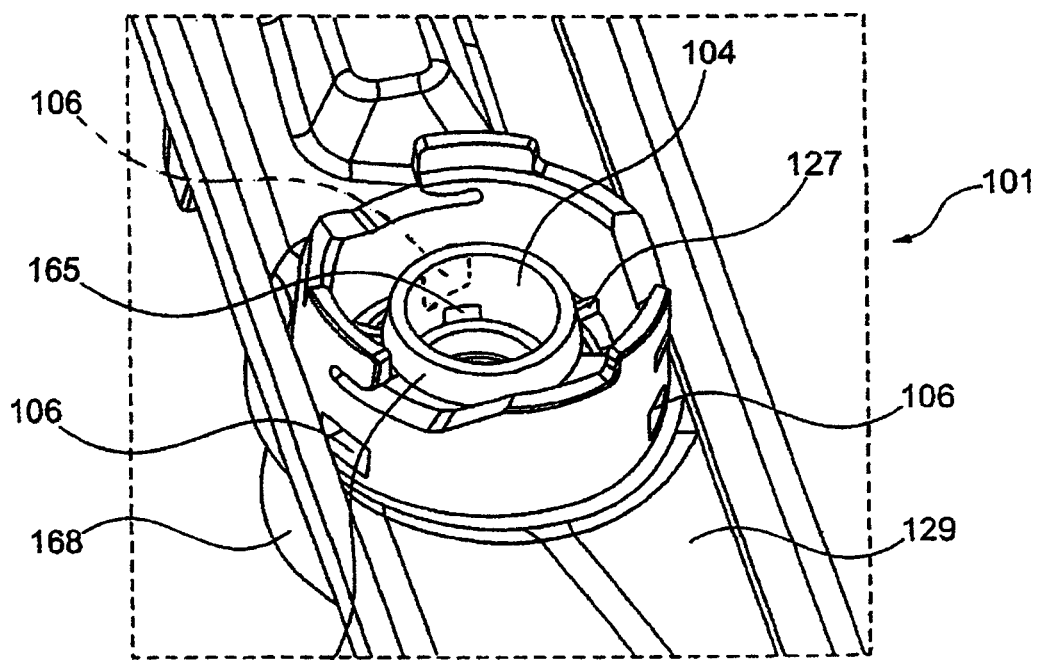

A filter cartridge which may be inserted but has no corresponding axially projecting housing projections or structures 136.1 would in this case have no filtering effect because of the high flow rate of fresh water into the inlet area of the appliance connection, as can clearly be seen from FIG. 35.

Figures 47, 49, 51:
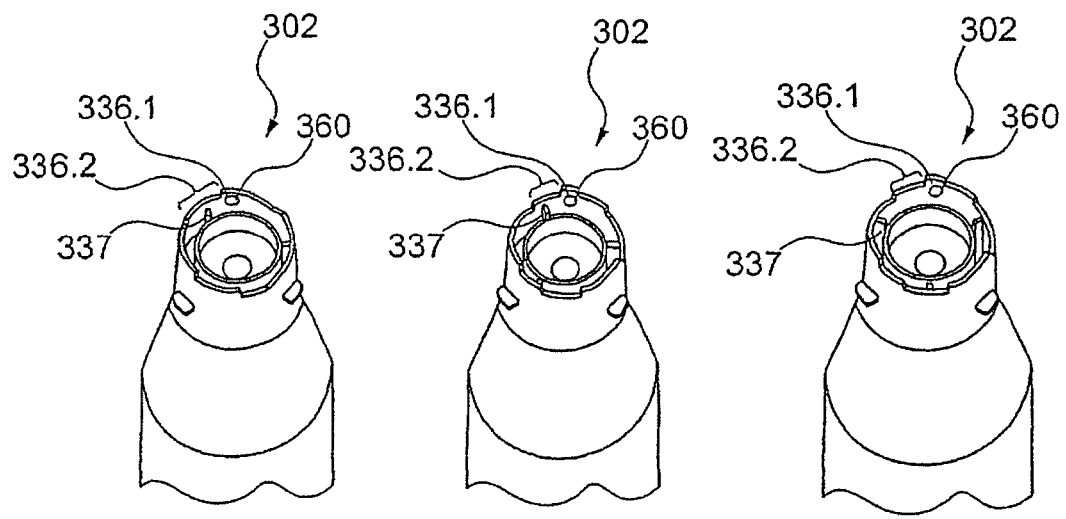
Figure 68:
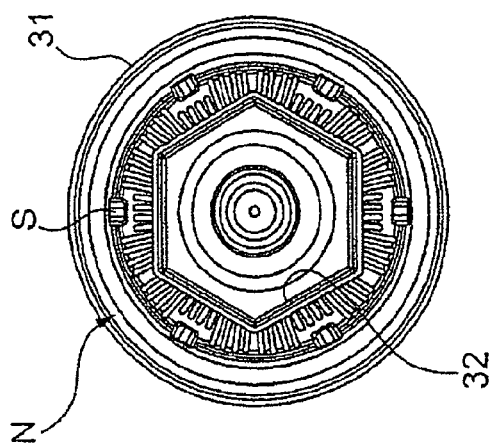
Figure 67:
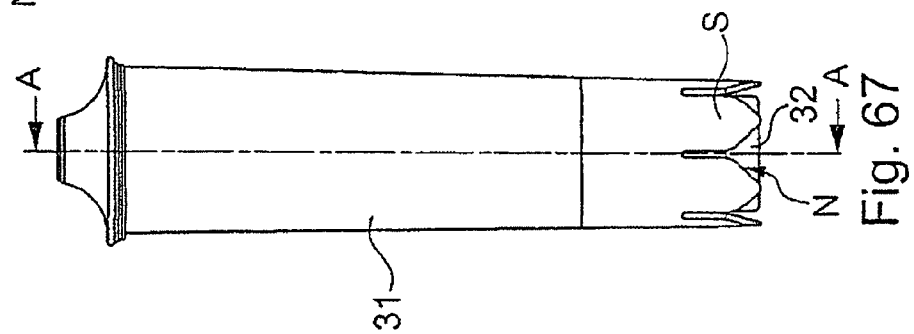
Figure 66:
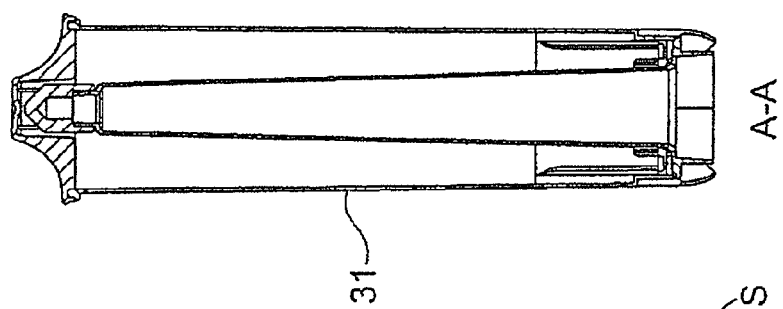
Figure 65:
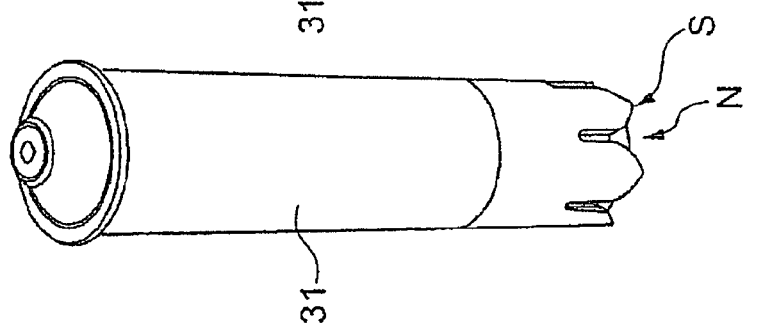
Figure 64:
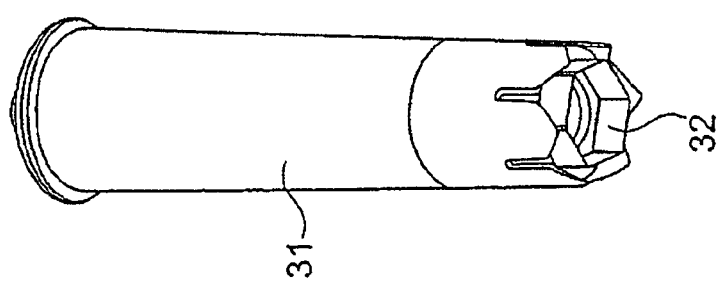
Figure 69:
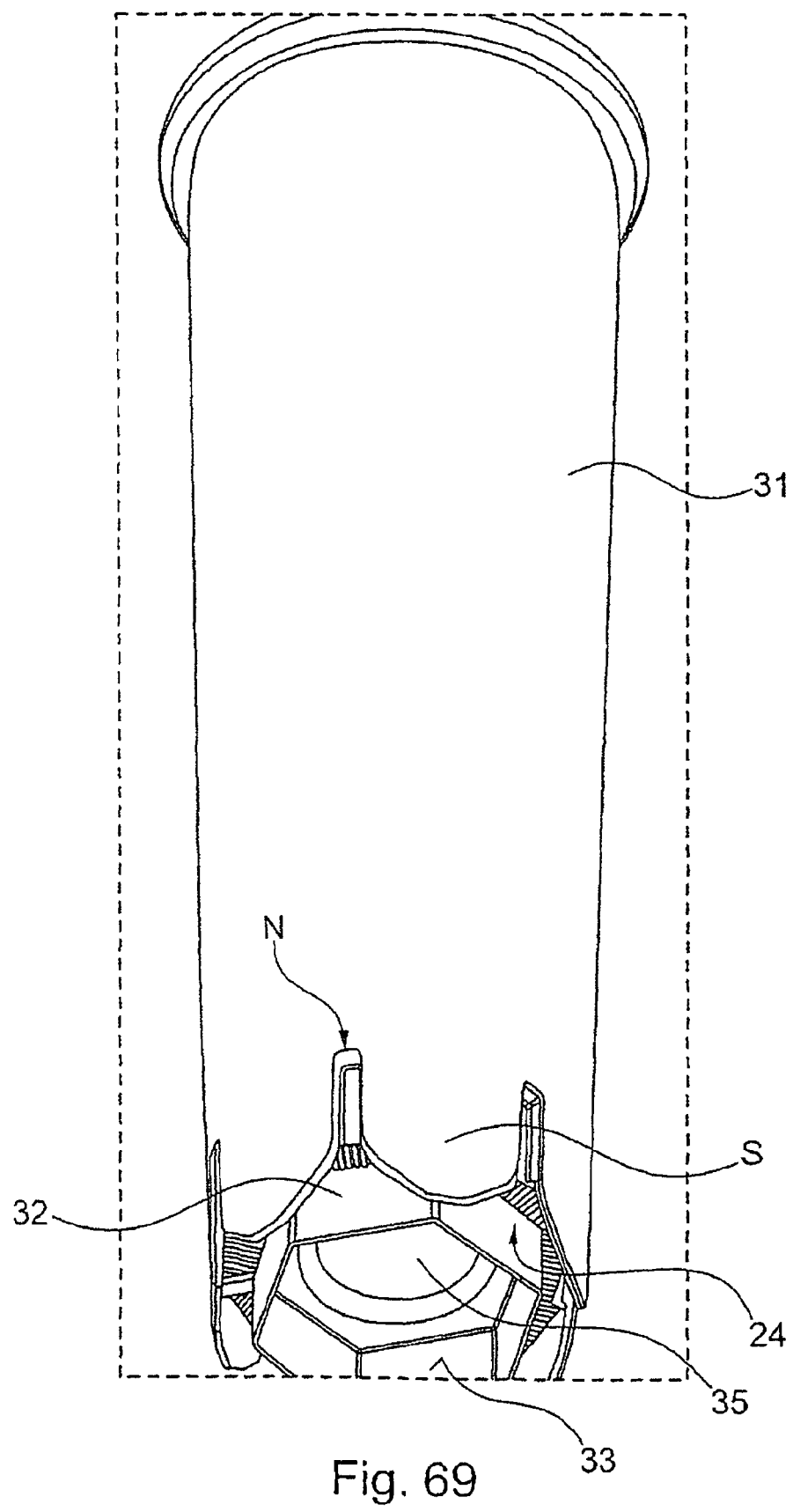

The embodiment described here in each case has three axially aligned coding structures 136.1 on the filter housing 136 which, in particular, are preferably arranged offset through 120° at the end on the circumference of the filter-side tank connecting element 302, as can be seen well in FIG. 49. The complementary connecting elements of the tank-side filter connection 101 are shown in FIG. 35.

Figure 36:
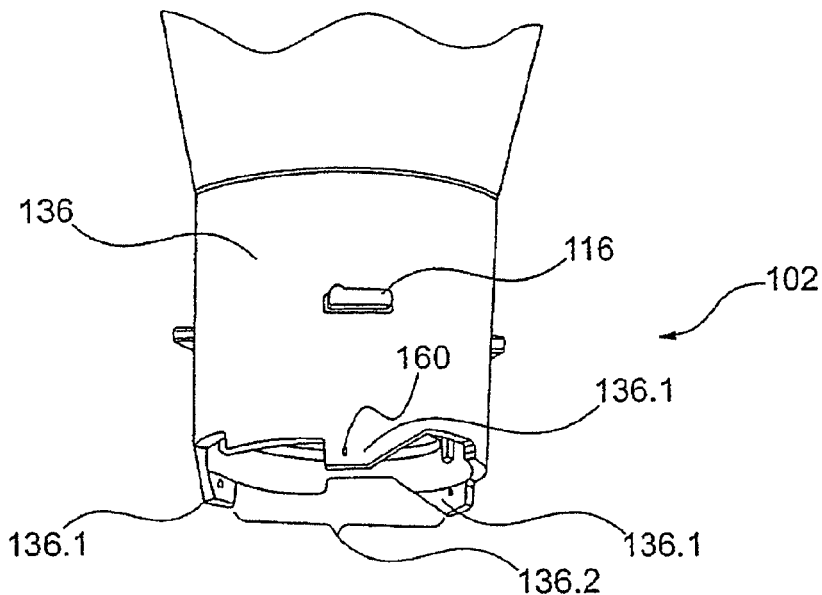
Figure 37:
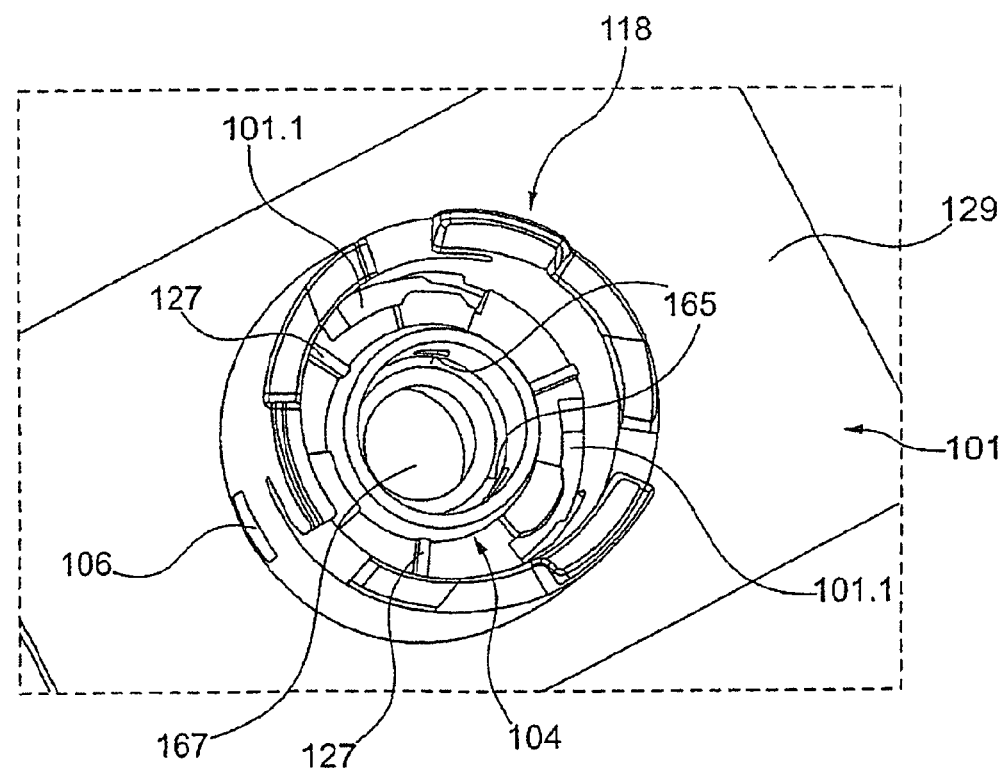

FIGS. 36 and 37 show two further views of this embodiment of a tank filter connection 101, 102. In this case, three axial recesses 101.1 are illustrated on the tank-side filter connection 101 and are incorporated recessed in the tank bottom 129 in order to allow the three complementary housing projections 136.1 on the filter cartridge to be accommodated. Once again, axial projections 136.1 and complementary axial depressions 101.1 are therefore illustrated here as a coding structure in order to prevent the use of filter cartridges which are not intended for that purpose.

Figure 38:
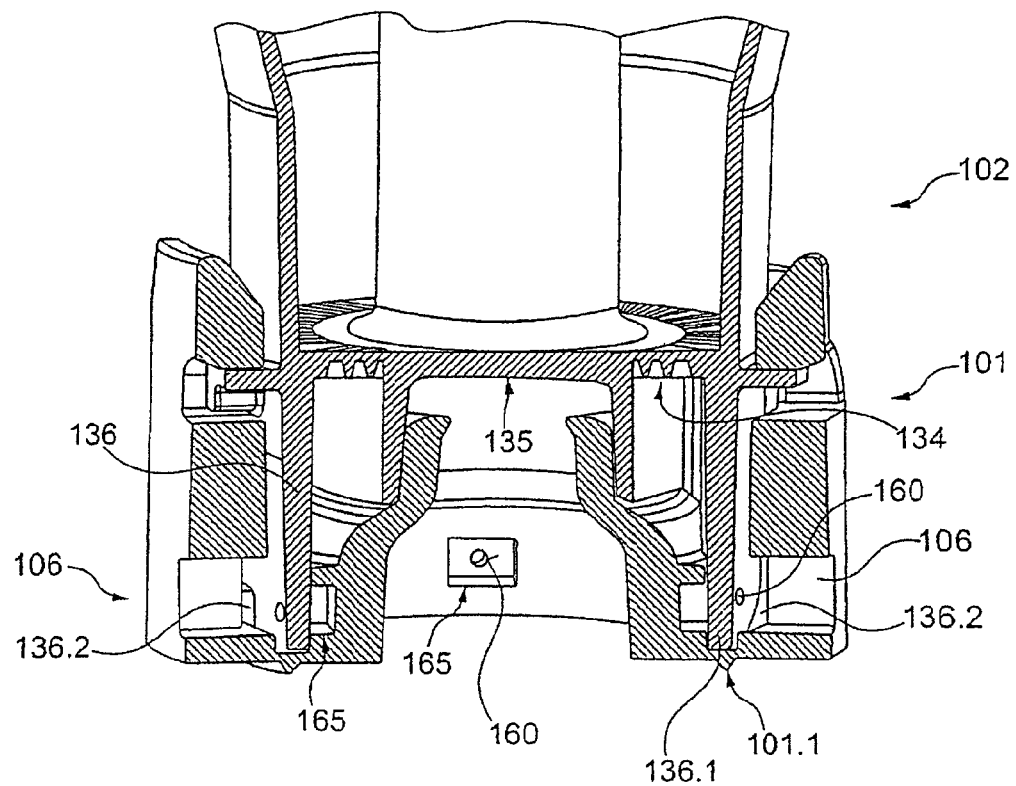

FIG. 38 shows a section through a tank-side filter connecting element 101 in which a filter-side tank connecting element 102 has been inserted. In this case, the bypass or short-circuiting openings 165, which are essentially closed by the three housing projections 136.1, can be seen in the lower, bottom area of the tank-side filter connecting element 101. When a filter cartridge is inserted, the bypass function is implemented in such a way that a specific amount of fresh water is added to the filtered water which has been filtered by the filter cartridge and emerges through the outlet 135. If there is no cartridge, this axial coding structure is ineffective, and this tank-side filter connection can be used only to pass on the fresh water that is located in the tank, without it being filtered.

When a cartridge is inserted, fresh water which enters through the slot 106 can rise through the cutouts 136.2 in the interior of the connecting stub 104 (FIG. 37) and can enter the filter chamber of the filter cartridge through the inlet slots 134, can flow through the filter and can be passed on from the filter outlet opening 135 into a reservoir or storage vessel or into the appliance connecting line of the tank or of the appliance.

Figure 39:
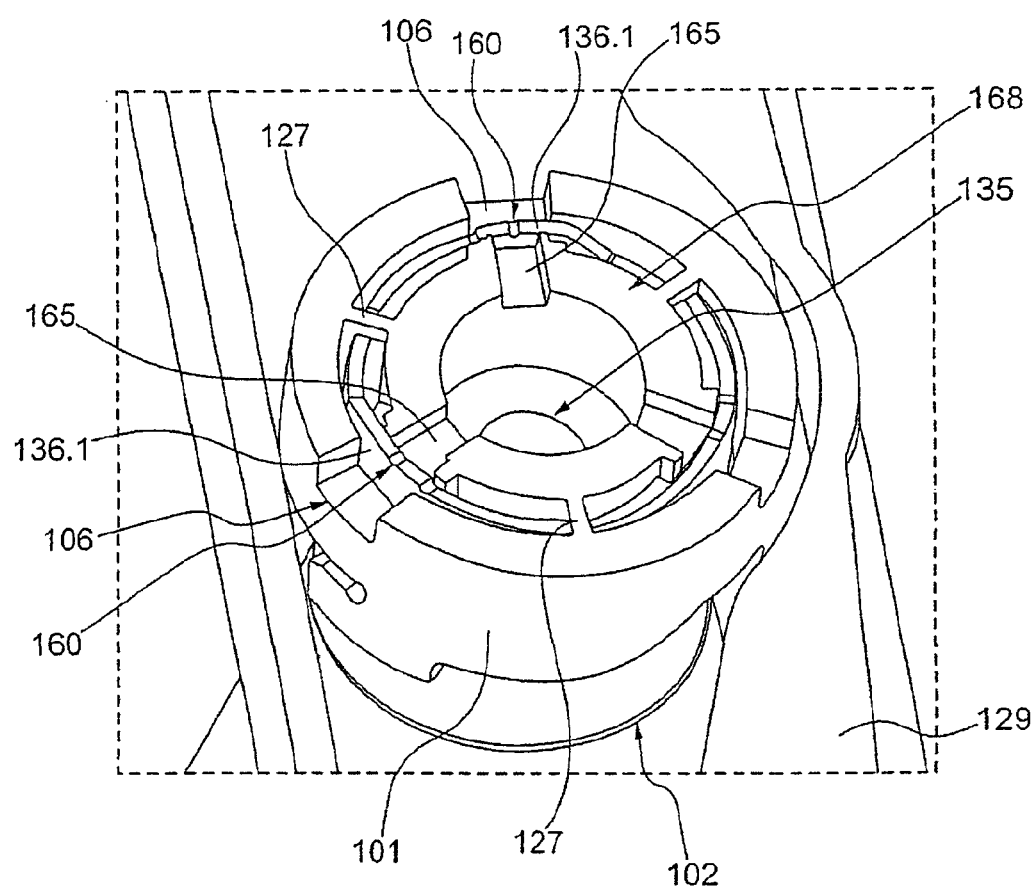
Figure 40:
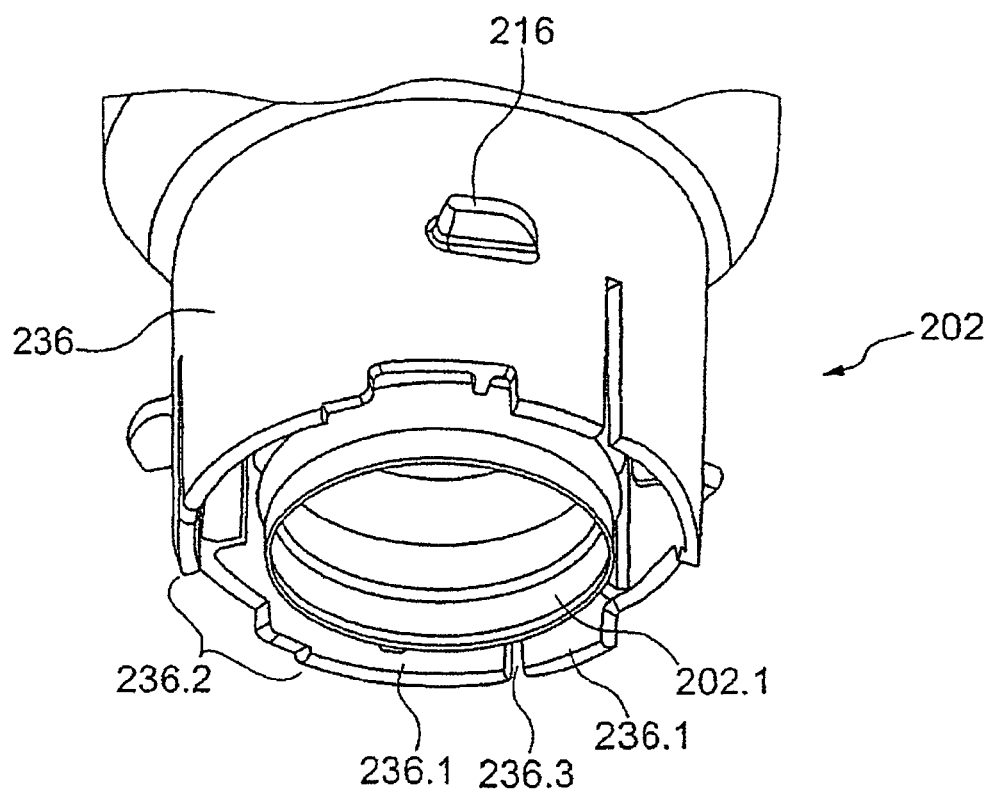

FIG. 39 shows a further section view through the tank bottom 129 and a tank-side filter connection 101 connected to it, as well as a filter-side tank connection 102, inserted therein, viewed from the bottom of the tank. In this case, the bypass or short-circuiting lines 106 and 165 can be seen very well, which indicate the unfiltered fresh water being passed on in a corresponding manner into the tank outlet area 168. When a cartridge with the correct axial coding is inserted, as in the illustrated example, the fresh water to be filtered is correspondingly blended through the bypass holes 160 which are formed in the housing sections 136.1, which project like vanes.

Instead of the three axial coding structures offset through 120° as shown by way of example here, four, five or for example six such structures can be provided. The distance between the individual complementary axial coding structures may in this case either be symmetrical or else asymmetric.

FIGS. 40 to 45 show a further embodiment, which is annotated with the number series 200, of an axially coded tank/filter connecting structure 201 and 202, in this case in conjunction with an axial seal 202.1. In this case as well, the same features as those already described are provided with the same basic numbering. The axial seal 202.1 is in the form of a circular elastically deformable sealing lip with a certain axial longitudinal extent, in order in particular and advantageously to also make it possible to compensate for certain axial insertion tolerances, securely, reliably and in a sealing manner.

In this case as well, axially aligned coding structures are used as axial projections 236.1 on the filter housing 236, and axial recesses 236.2, corresponding to the previously described embodiment with the number series 100. In addition, further axially aligned coding structures 236.3 are formed here as slots in the end housing projection 236.1, and can be used both for coding and, if required, for supplying fresh water into the internal area of the filter-side connecting fitting.

Figure 41:
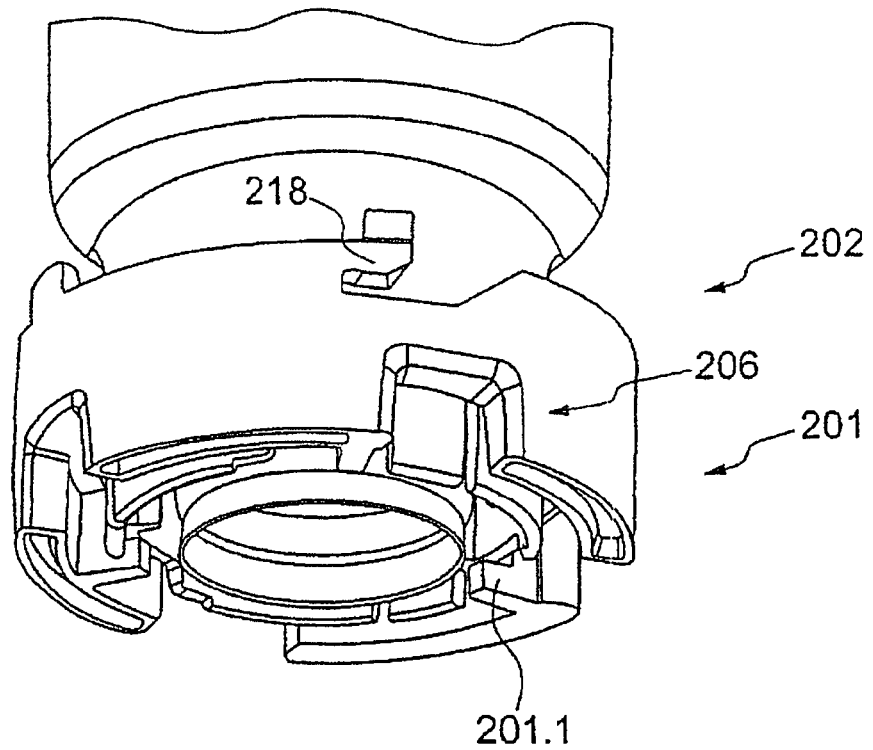

Axial connecting coding structures of complementary shape and in the form of projections 201.1 which project axially from the tank bottom are associated with the axial coding structures 236.2 and 236.3 in the tank-side filter connecting fitting 201, as is illustrated in FIG. 41. In principle, this embodiment could represent the reverse of the coding structure in the embodiment described with respect to the number series 100. However, both embodiments represent only possible examples and can invariably be modified and/or be supplemented and/or replaced by further coding structures and sealing variants.

Figure 42:
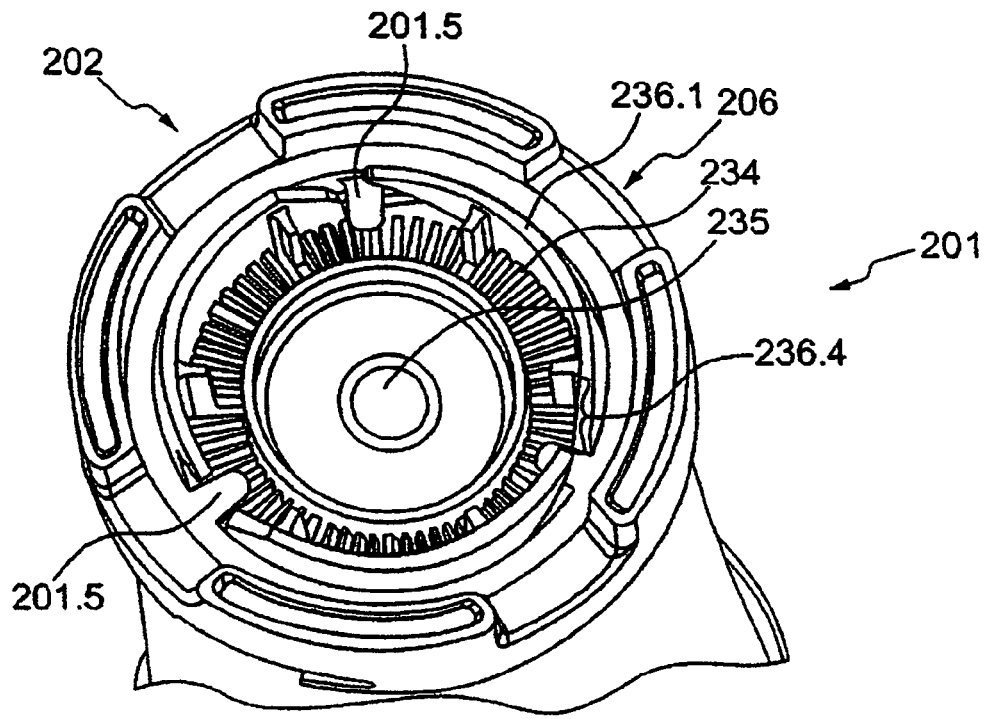
Figure 43:
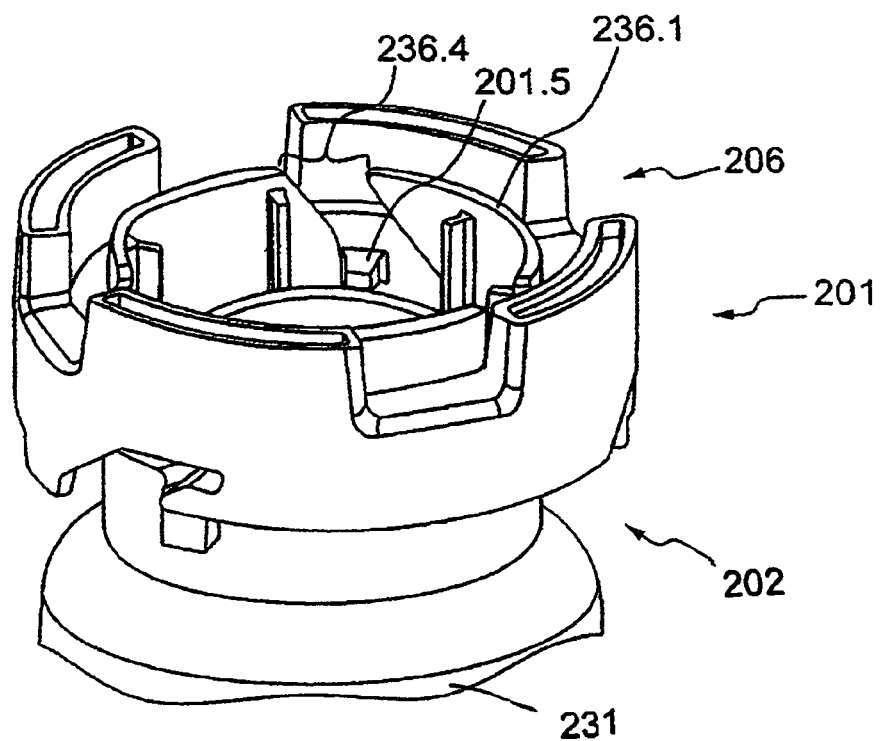

FIG. 42 shows a view from underneath of a tank-side filter connection 201 and of a filter-side tank connection 202 inserted therein and with axially coded connecting structures 236.4 and 201.5 which have been slightly modified from the axially coded connecting structures 236.1, 236.2, 236.3 and 201.1 described above. In this case, the filter-side recess 236.4 is in the form of an obliquely running slot which opens at the end on the filter housing 236 and is suitable for holding a coded element 201.5, which is in the form of a tab and projects radially inwards from the tank-side filter connecting element 201. The oblique profile of the slot 236.4 in this case takes account of an axial insertion movement which is intended to be used to fix the filter cartridge 231 by means of a final rotary movement, see FIG. 43. A filter cartridge without a recess 236.4 which is in the form of a slot and is aligned correspondingly axially cannot be inserted into a tank-side filter connecting fitting 201 which is coded in this way. In this embodiment as well, three-point coding is provided, just by way of example, with preferred 120° offset positioning, but this is not essential and can invariably be supplemented and/or modified by other positionings.

The coding structures 216 and 236.2 furthermore, jointly and by way of example, form a double or multiple bayonet structure, in this case in combination with an axially aligned and a radially aligned coding and/or fixing structure.

Figure 44:
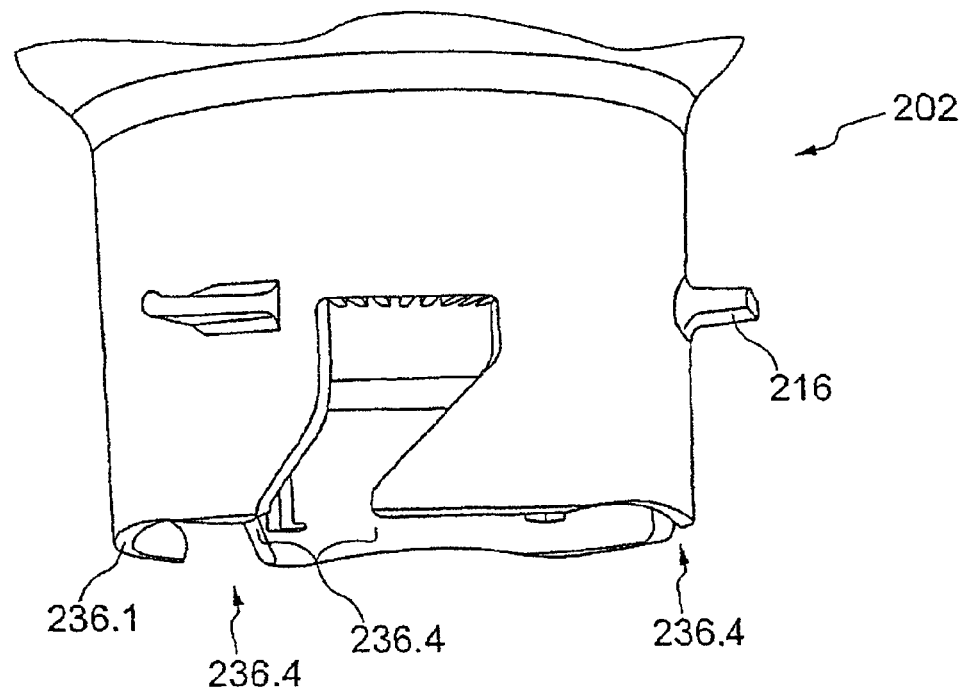
Figure 45:
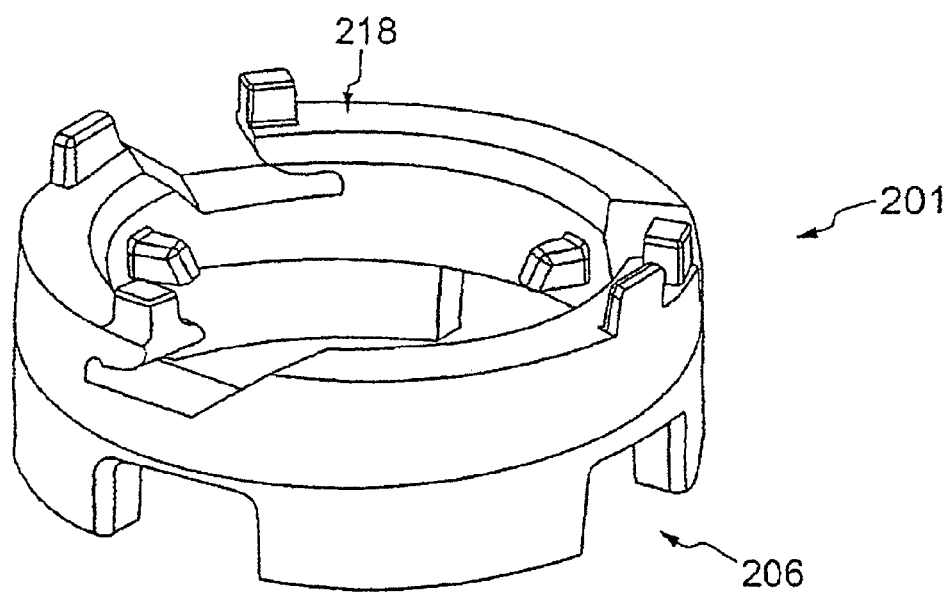
Figure 46:
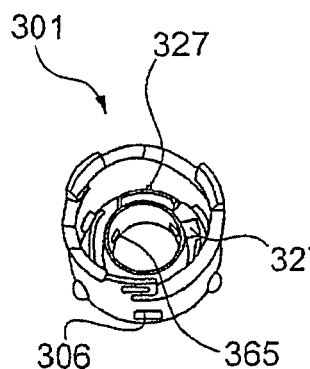
Figure 48:
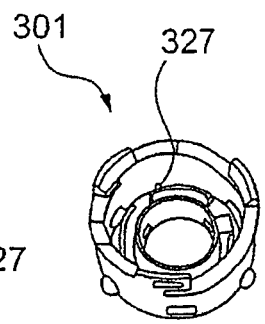
Figure 50:
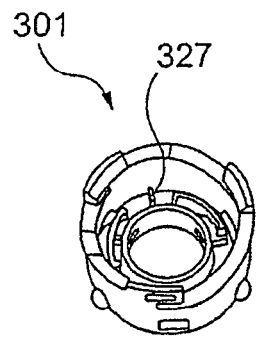

FIGS. 44 and 45 show the two elements described above and their major features, in each case illustrated separately.

FIGS. 46 to 51 show further embodiments of tank-side filter connecting elements and filter-side tank connecting elements, which have essentially already been described with blending structures 306, 336.1 and 365 of a blending apparatus in the sense of the above statements relating to the number series 0 to 99 and 100 upwards. In this case as well, and in a corresponding manner for the sake of simplicity, features which have already been described with regard to the embodiments described above are annotated with the same basic numbering, but increased by the number 300. They also have axially coded connecting structures in which, by way of example, when viewed over the circumference, axial coding structures 336.1, 336.2 and 337 are provided for the respectively illustrated, filter-side tank connections and, in order to distinguish between them, are each arranged at different angular positions with respect to one another. The tank-side filter connections 301 show the complementary axially coded connecting structures of the respectively associated tank-side filter connecting elements as further possible embodiments of different coding structures.

FIGS. 52 to 63 show further possible embodiments of coding and/or fixing structures for tank/filter connecting elements. In this case, FIGS. 52 to 55 show a first possible embodiment of bayonet fittings, FIGS. 56 to 59 show a second, and FIGS. 60 to 63 show a third possible embodiment of bayonet fittings, in particular double or multiple bayonet fittings, as a supplement to the embodiments already illustrated in FIGS. 4 to 10.

The major aspect of the embodiments in FIGS. 52 to 63 is in this case the illustration of different possible codings in the form of double or multiple bayonet fittings and key codings in the form of key/lock functions. FIGS. 52 and 53 show the filter-side tank connecting coding and fixing structure with FIG. 53 showing, in a corresponding manner but in a plan view, eight projections 21.1 and 21.2 which, corresponding to FIG. 52, are formed both axially and offset in a radial angular position with respect to one another, as two pairs of four, along the longitudinal extent of the filter-side tank connecting element.

The complementary connecting and coding structures 1, 9 are shown in the tank-side filter connecting element 19 in FIGS. 54 and 55. In this embodiment, corresponding to FIG. 55, an angle α is shown between one axis of an x-y coordinate system that is shown, and an axis running through the opening 20, with this angle α being a comparatively acute angle α. In order to allow the filter-side tank connecting element 8 to be fixed on the tank-side filter connecting element 19, the coding projections 21.1 which are arranged furthest forward at the end must be arranged distributed in a corresponding manner to the circumferential distribution of the openings 20 on the tank-side filter connecting element 19 so as to make it possible to insert the filter-side tank connecting element axially, at all. After overcoming the first insertion depth with respect to the coding projections 21.1, a rotation process must be carried out about a longitudinal axis which runs through the filter-side tank connecting element, until the second set of coding projections 21.2 matches the openings 20, allowing further axial insertion of the filter-side tank element into the tank-side filter element until fixing takes place after a further rotary movement about the longitudinal axis, by means of the filter-side tank connecting element.

FIGS. 56 to 63 illustrate similar embodiments, but with contours of the openings 20 which have been modified from the embodiments 52 to 55, and of the coding projections 21 which are complementary thereto, as well as alignments which have also been modified both axially and in terms of the angles, when viewed in a plan view.

A further difference is also the number of respective coding structures. In the embodiments 52 to 55, there are a total of eight on two levels, and in the embodiments 56 to 63 there are in each case only six, in the form of two triple-coded projection levels. These coding structures described here can also be combined without any problems with other coding structures, for example axially aligned coding structures, in order to allow even further distinguishing options for individual tank/filter connections.

Figure 70:
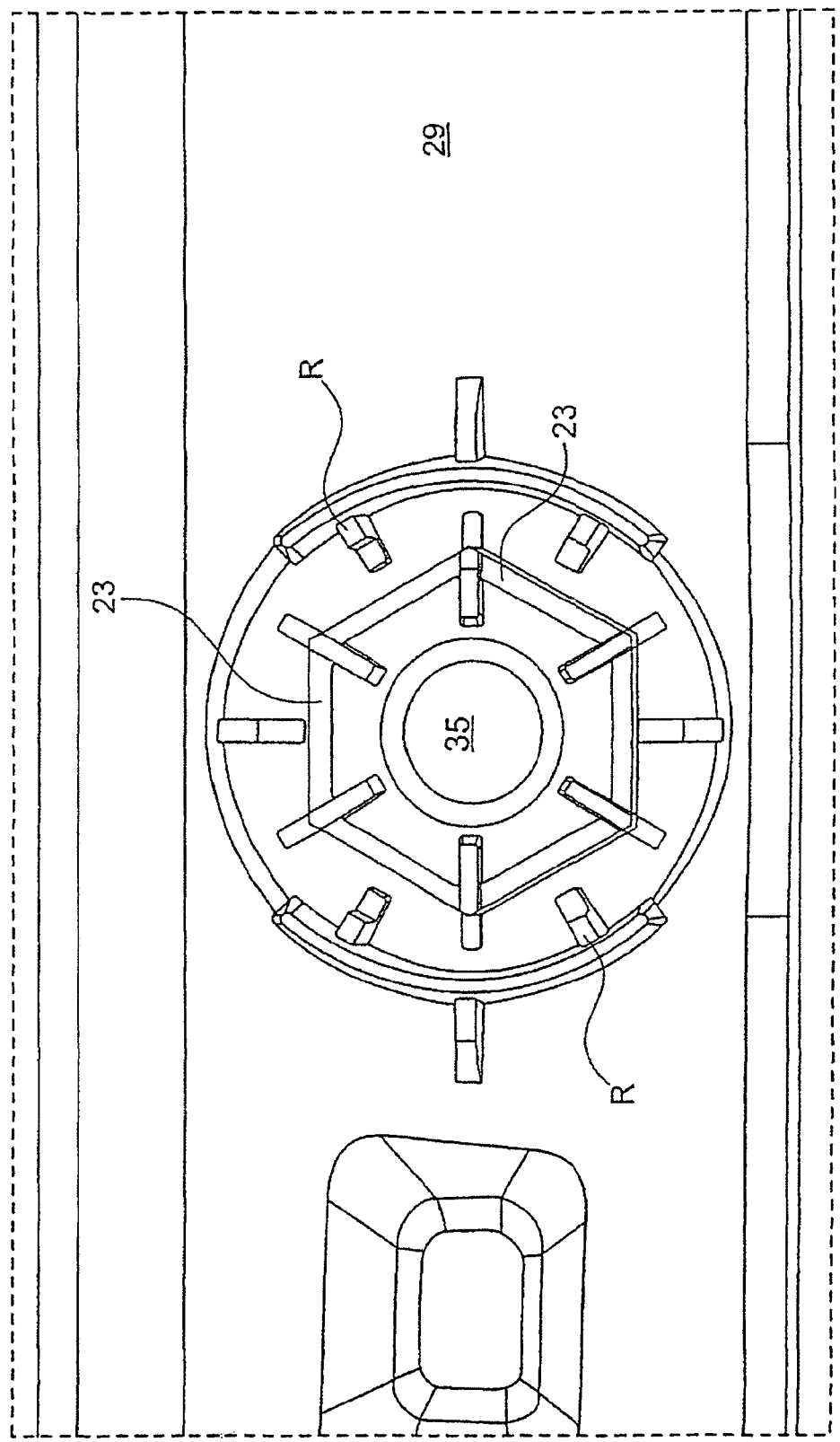
Figure 71:
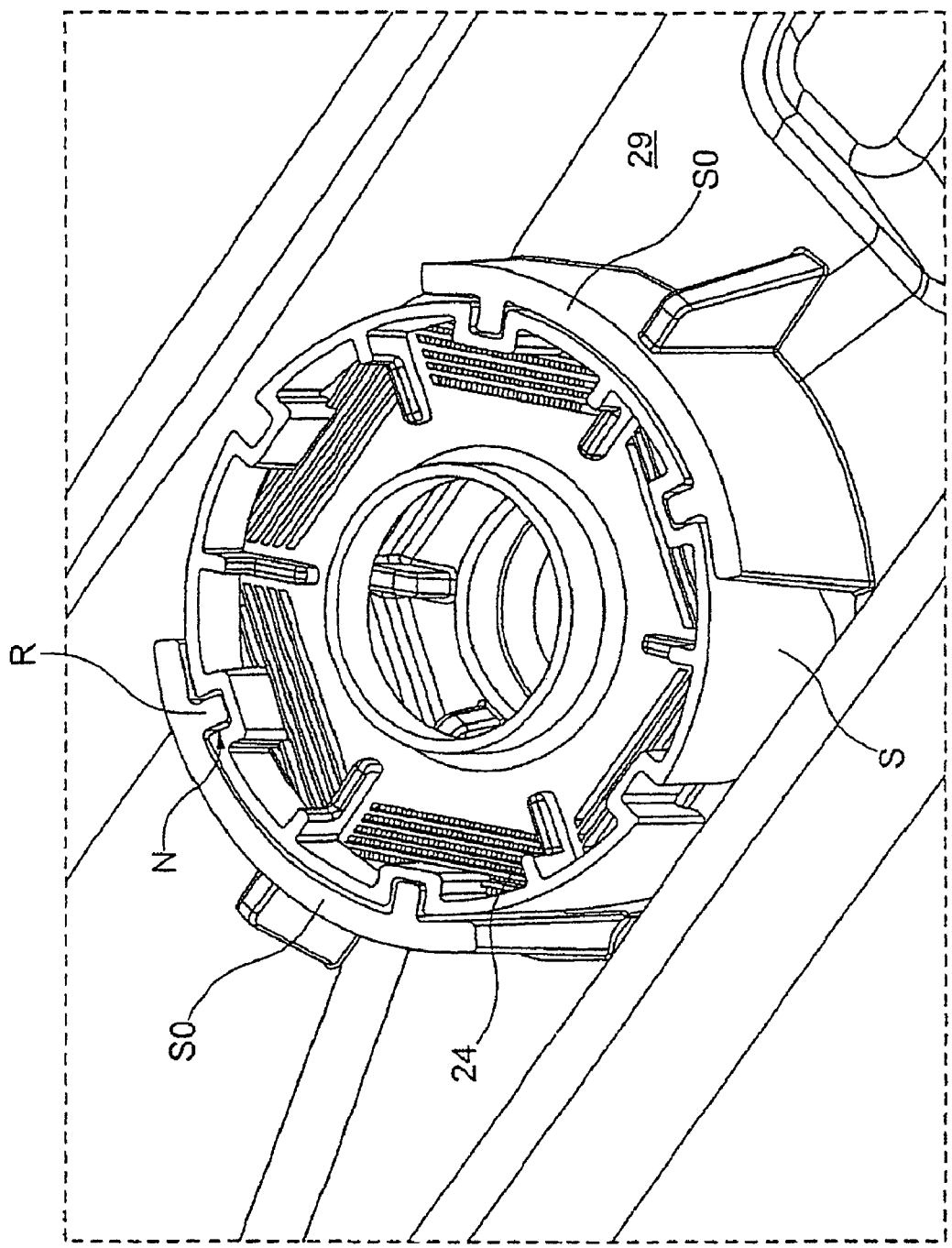

FIGS. 64 to 71 show a further embodiment of a tank/filter connection, in various views and illustrations such as oblique plan views, section illustrations, a front view and a view from underneath of the tank bottom 29, as well as a plan view of the tank-side filter connecting element with and without a filter-side tank connecting element inserted (FIGS. 70 and 71).

The major features of the embodiment of a tank/filter connection are the approximately wedged-shaped points S which project at the end from the filter cartridge 31 and the grooves N which are arranged between them. The geometric dimensions and angular positions of these points S and grooves N with respect to one another once again allow different codings and fixing points for the filter-side connecting element on the tank-side filter connecting element.

The points can also be used for positioning during insertion of the filter cartridge into the tank connecting stub, particularly in the case of connections which cannot be seen visually, for example in order to prevent damage to the sealing structures and/or other structures.

In this case, the slot separations and/or the slot widths and/or widths of the points or projecting vanes, likewise as well as their lengths and/or separations, which must correspond to corresponding structures on the tank-side filter connecting element, are particularly suitable for coding in order to allow the insertion of a filter cartridge whose use is permitted.

These corresponding coding and/or fixing structures comprise ribs R (FIG. 70), which are formed on the tank-side filter connecting element and whose interaction with the coding and/or fixing structures N and S that are formed on the filter-side tank connecting element can best be seen in FIG. 71. In this case, the ribs R are formed on a fitting SO which partially surrounds the filter-side tank connecting element and is in the form of a wall.

The coding and/or fixing structure described above may also be in a complementary form, in an embodiment which is modified from this, that is to say with grooves instead of ribs, and ribs instead of grooves. In a further modified embodiment, however, a mixed or combined coding and/or fixing structure is also invariably possible, by forming grooves and ribs on one tank- or filter-side connecting element, and/or on the other.

Figure 72:
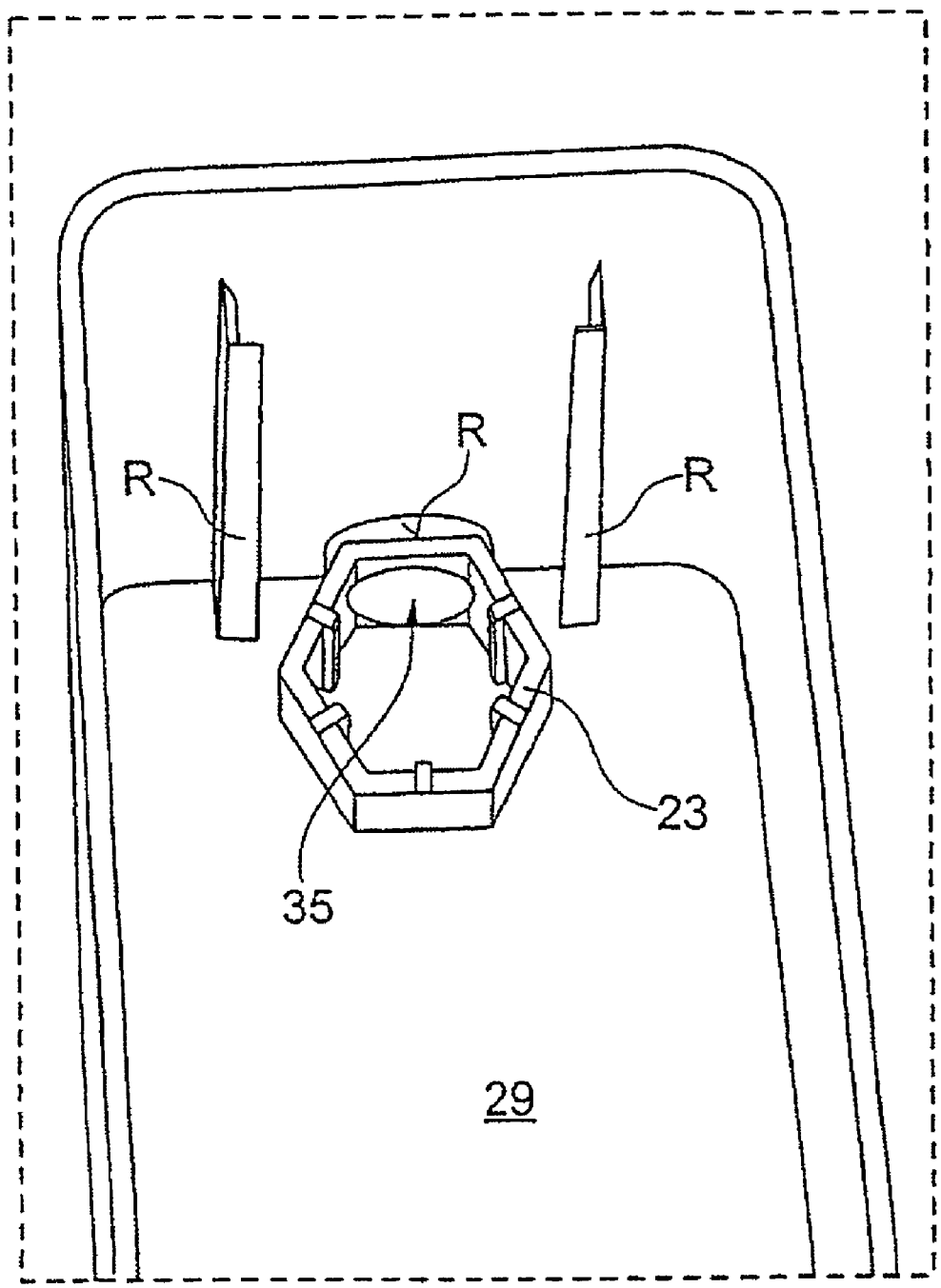
Figure 73:
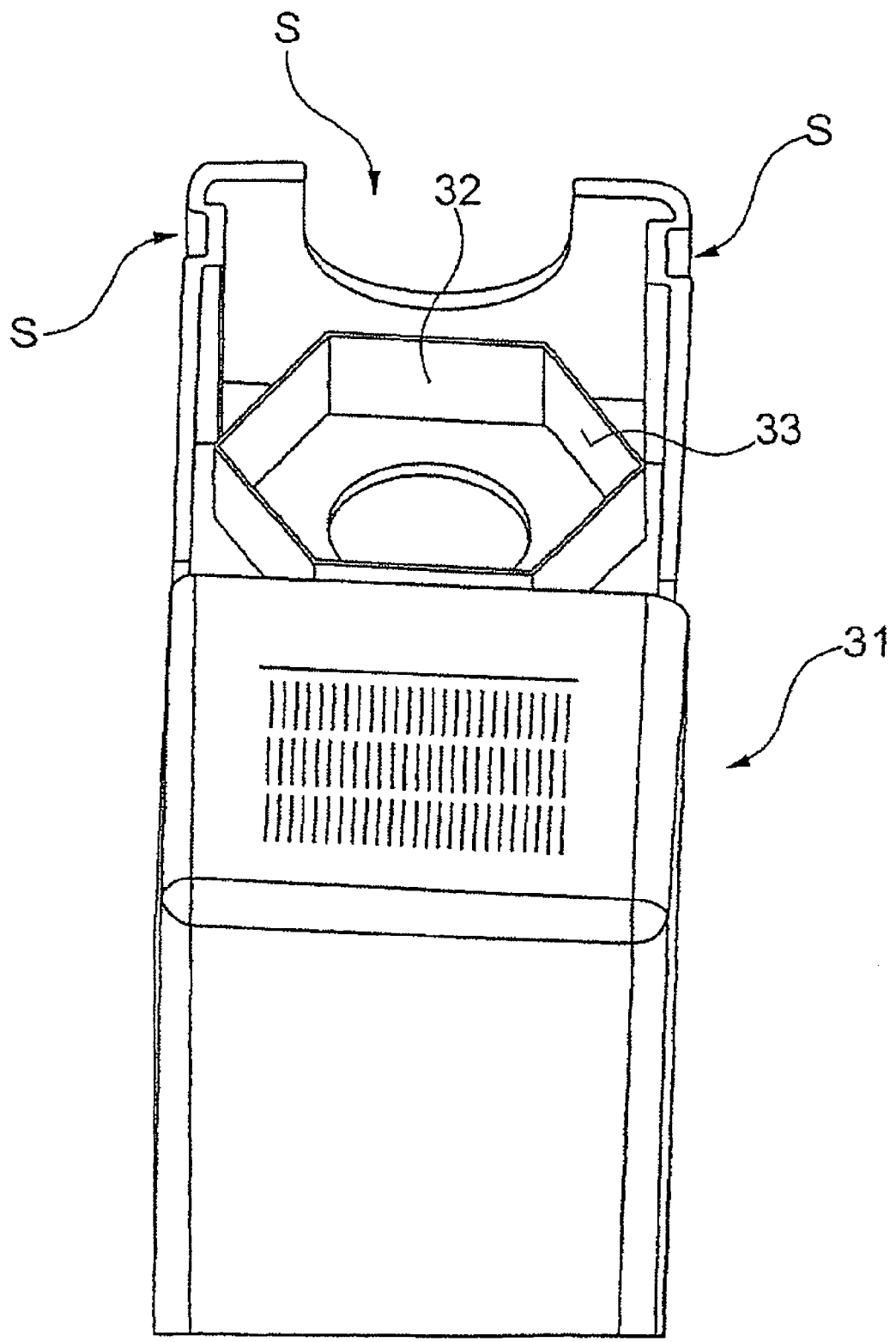
Figure 74:
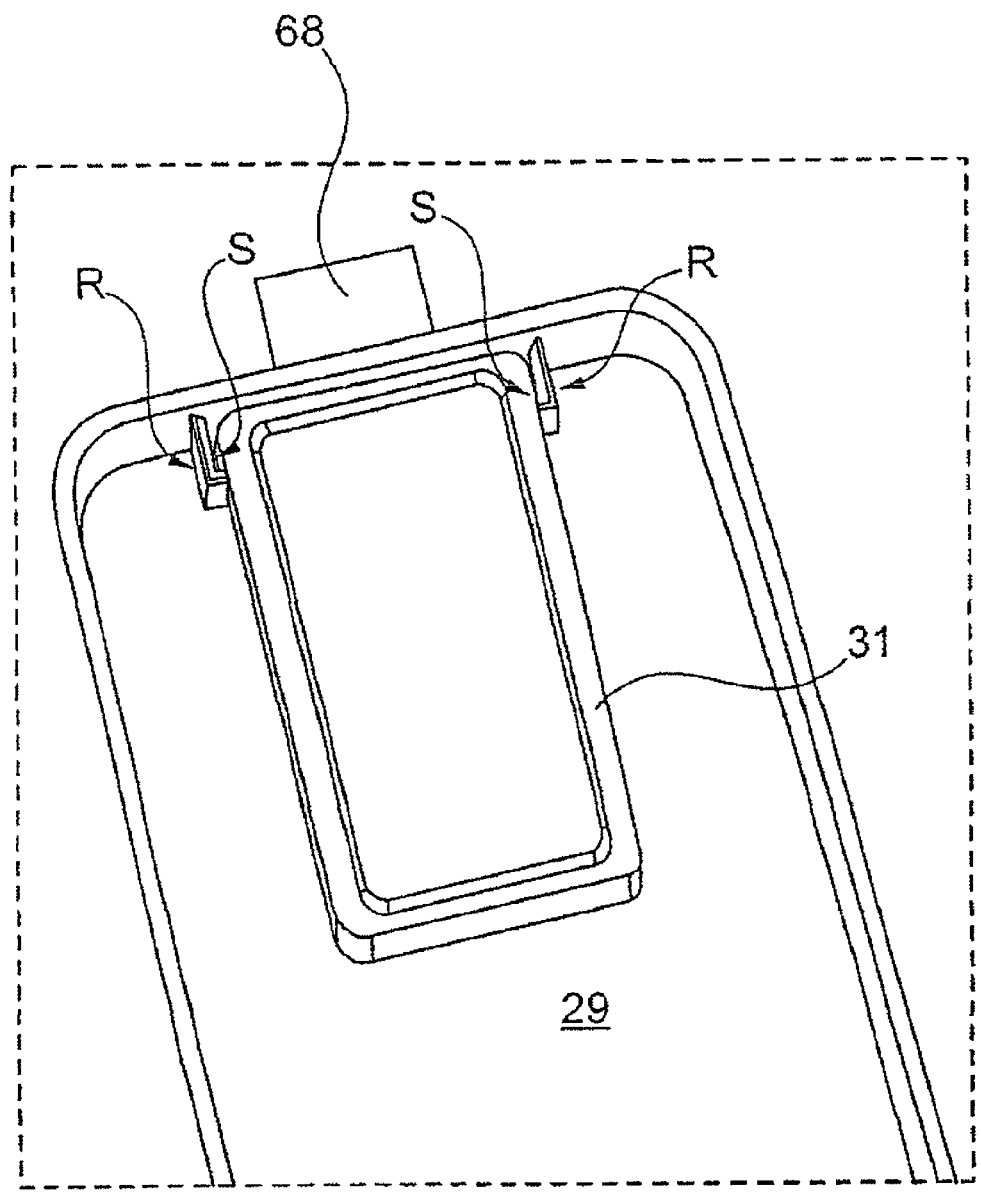
Figure 75:
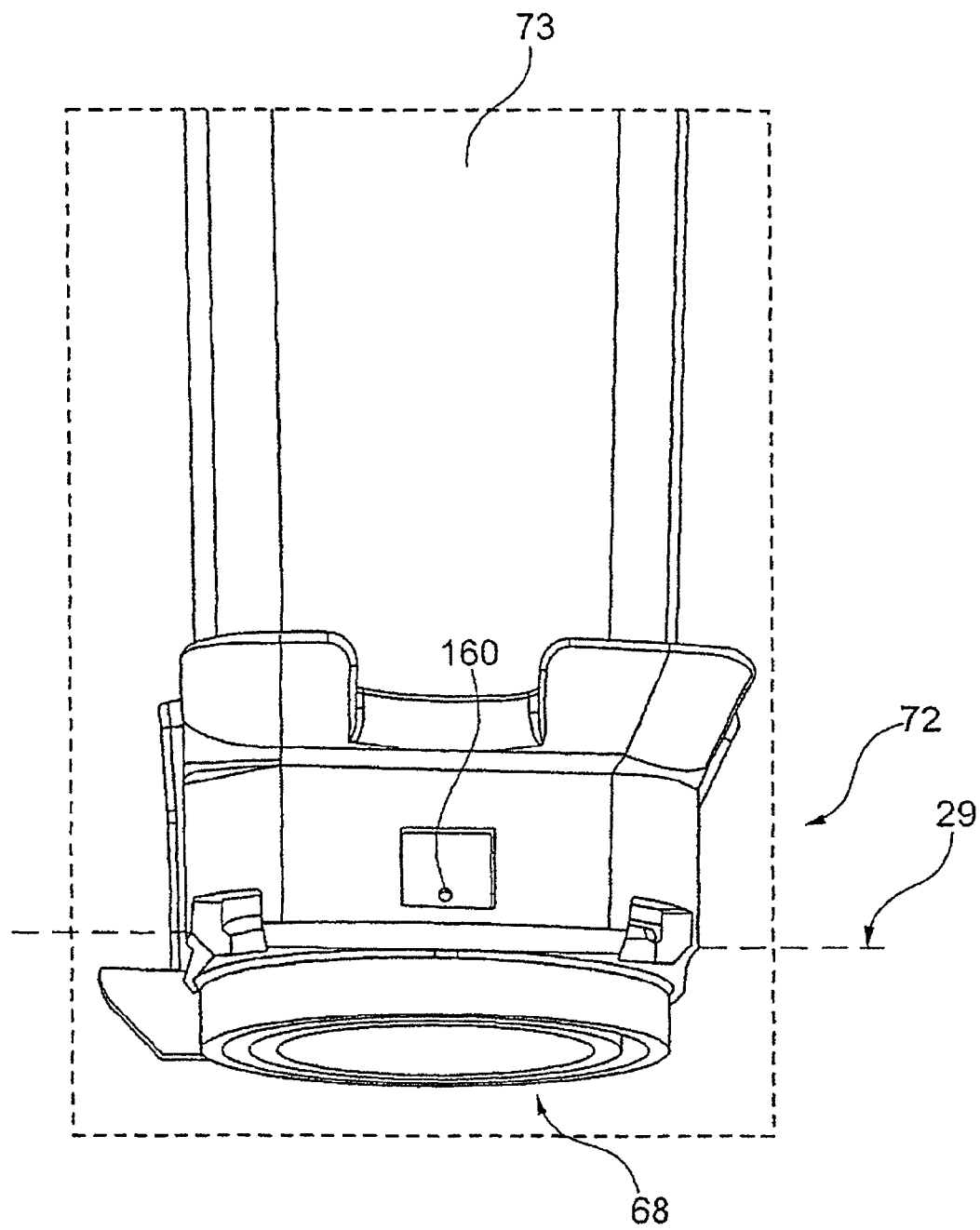
Figure 76:
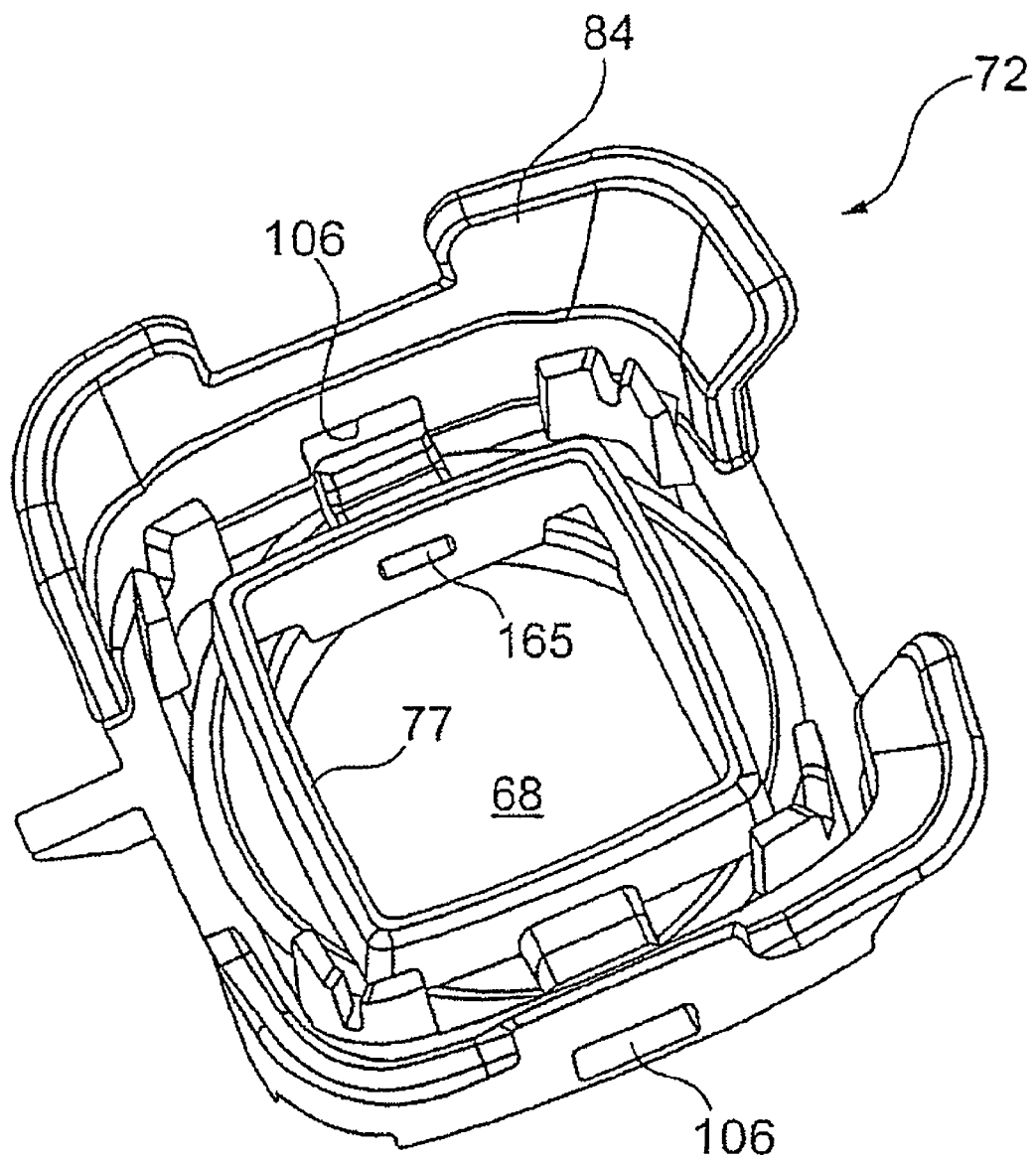
Figure 77:
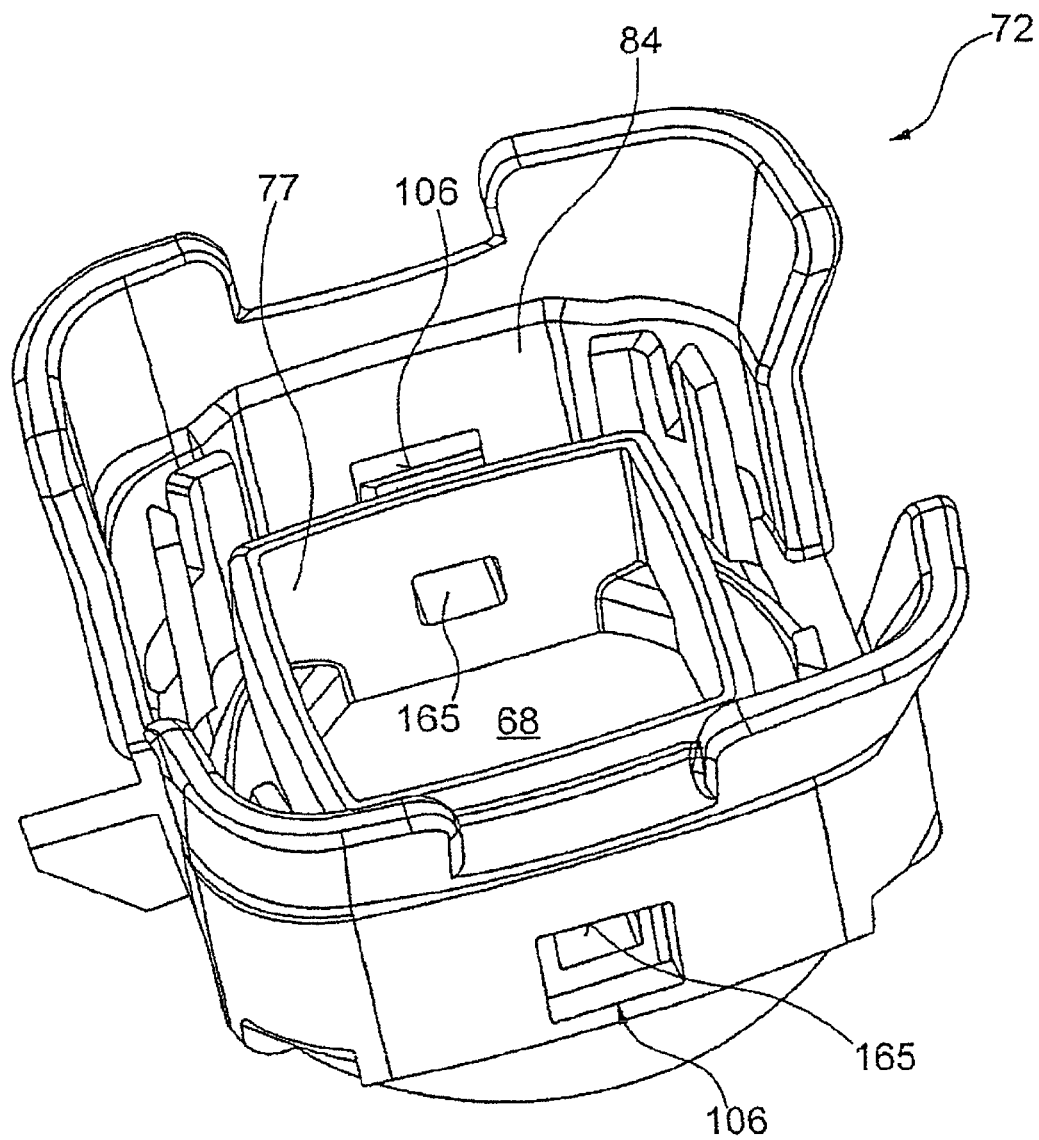
Figure 78:
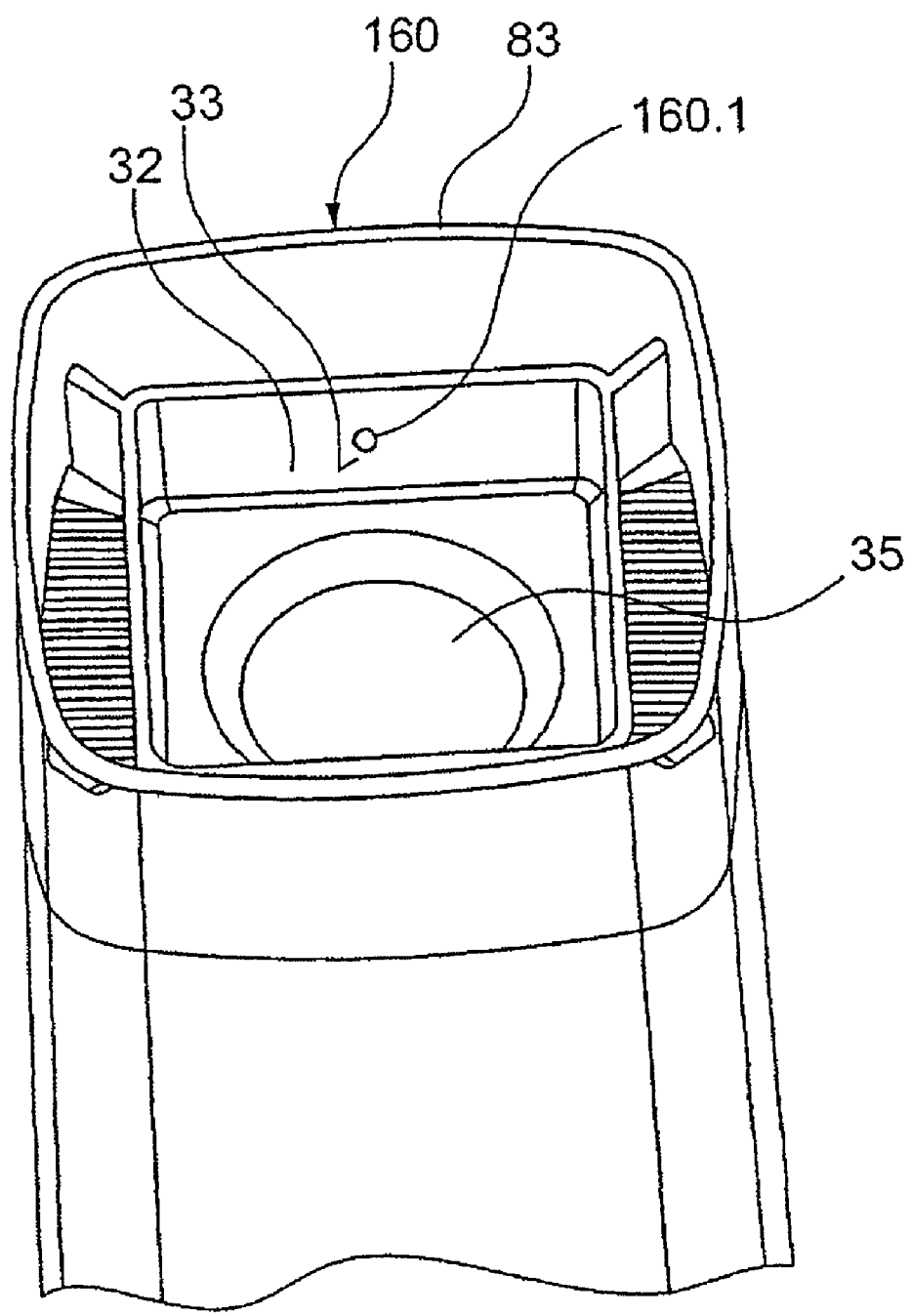

FIGS. 72 to 74 illustrate a further embodiment in which the filter 31 is inserted into the interior of the tank along a guide which is arranged on a tank wall, has two ribs R formed at an angle, and engages in two complementary slots S. In its bottom 29, the tank has a polygonal, in this case hexagonal, filter connecting element 23 and a tank outlet opening 35, which is passed to the outside through the tank wall from within this connecting element.

In order on the one hand to allow sufficient water to be passed out through this tank outlet opening 35, which is formed on the wall side, and on the other hand to allow the tank to be emptied as completely as possible, the polygonal connecting element 23 is formed on the tank bottom with a polygon inclined on its upper face. The filter-side tank connecting element 32 in the form of a conical, likewise polygonal, molded seal 32 has a correspondingly complementarily inclined connecting surface. The filter cartridge 31 can be passed through this and, fixed by the ribs R and complementary slots S, can be inserted vertically on the tank wall downwards into the interior of the tank and can be inserted in an interlocking and sealed manner through the coding structure formed in this way with the tank bottom for filtering of the water that is located in the tank.

In this embodiment as well, as in the case of all the other embodiments apart from this as well, a bypass structure, which is not illustrated here, can preferably be provided in order to allow blending of the filtered water. A supplementary structure R, which is in the form of ribs, and a complementary coding structure S, which is in the form of slots, are provided here by the end recess S in the filter wall and the complementary shape R of the outlet opening 35 in the bottom area of the tank wall. These can also be modified appropriately, for example with a structure which has a quadrilateral shape, a triangular shape or other structure having further recesses and/or projections, in order to distinguish between different permissible filter types.

A further embodiment of quadrilateral coding for a tank/filter connection is illustrated in FIGS. 75 to 78. In addition to the embodiments illustrated in FIGS. 20 to 31, this embodiment has a bypass structure. Based on the bypass structure illustrated in FIGS. 32 to 39, this bypass structure comprises an opening in the form of a hole 160 in the end housing extension of the filter cartridge 73, which opening is coincident with an opening 165 that is formed in a tank-side filter fitting/connecting element 77, allowing untreated water that is located in the tank to flow through to the tank-side appliance connection in the outlet area of the tank, for mixing with the water that has been filtered by the filter cartridge. In this case, on the filter side, the bypass opening 160 is formed in the end extension of the filter and provides a blending apparatus in conjunction with the tank-side filter connecting element 77.

A further possible way to provide a blending apparatus could be achieved by the arrangement of this bypass opening 160 opposite an opening 106 formed in the outer shell 84, in which case it may then be necessary to provide a corresponding channel guide in the interior of the filter cartridge and/or in the interior of the tank-side connecting element, in order to mix the blending water released in this way with the filtered water which is flowed through the filter cartridge and out of its outlet-flow opening 35.

A further blending structure can be provided by forming a bypass opening 160.1 in the polygonal, filter-side tank connecting element having a sealing surface 33, in this case in the form of a quadrilateral molded seal 32, which in turn corresponds to the opening 165 that is formed in the tank-side filter connection 77. The size of the opening 161.1 in this case once again governs the blending amount. In this embodiment, the blending apparatus is provided directly in the sealing area of the polygonal tank/filter connection.

Figure 79:
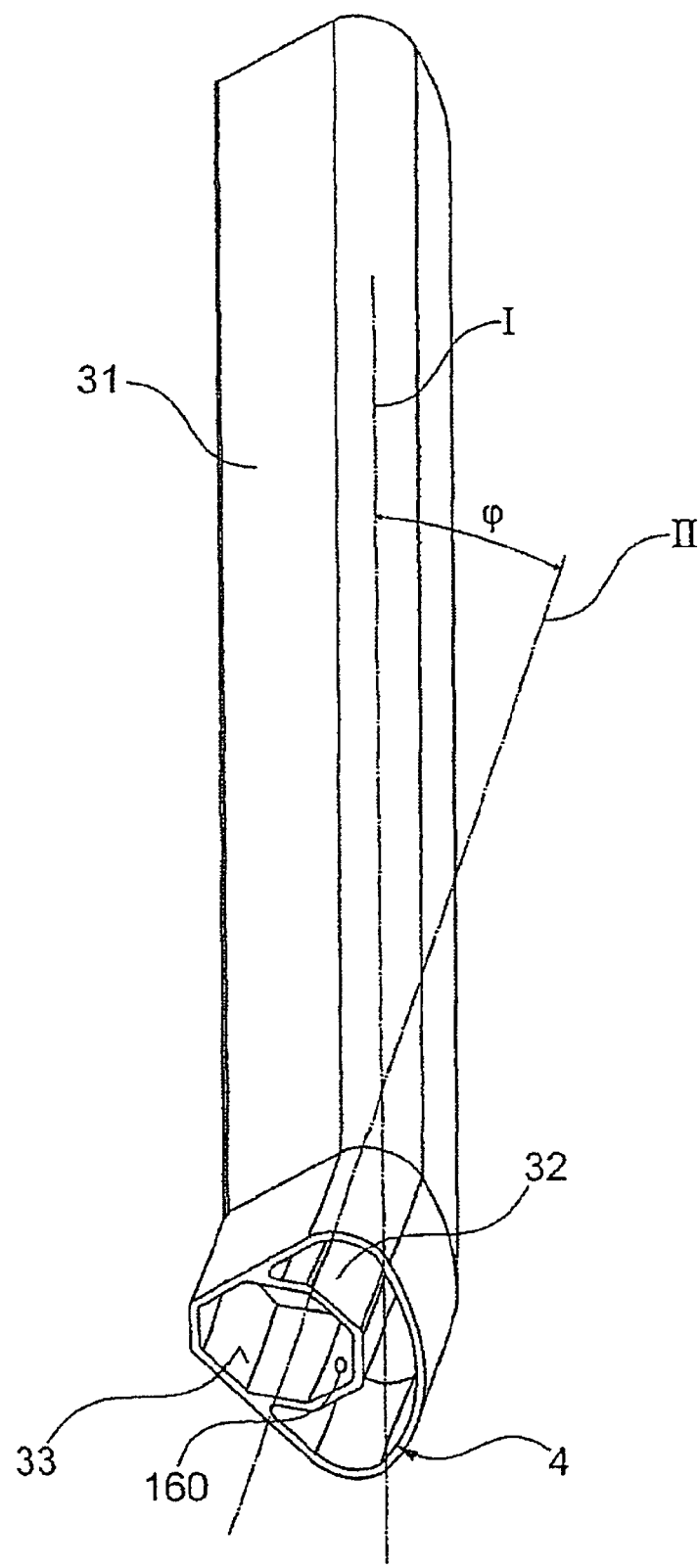
Figure 80:
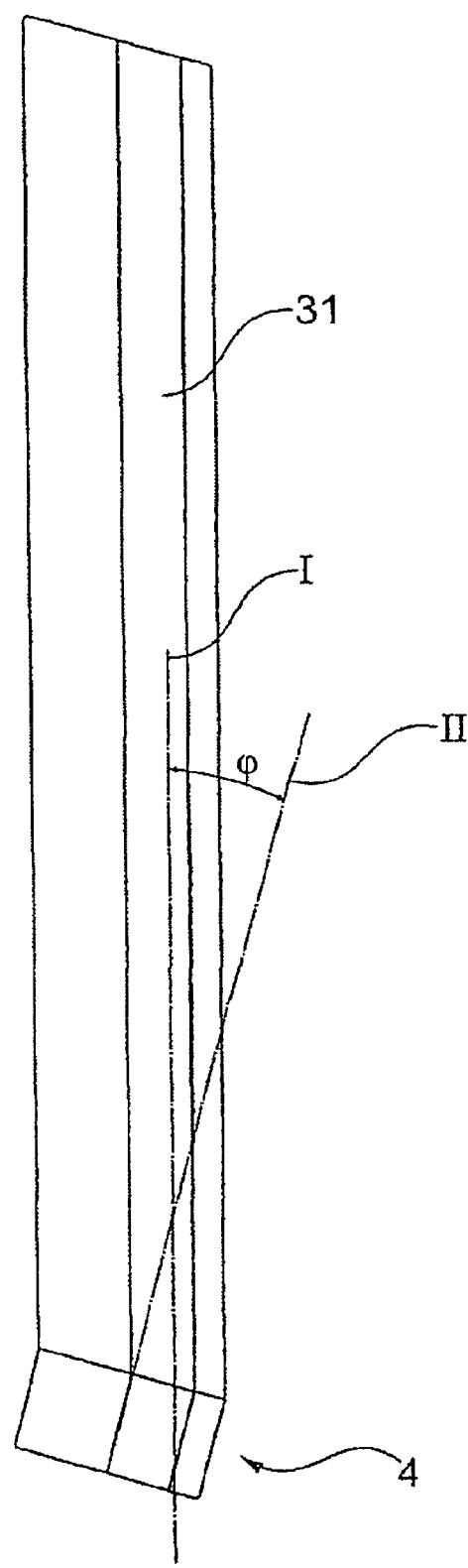

FIGS. 79 and 80 show an embodiment of a tank/filter connection in which a longitudinal axis II which runs through the filter-side tank connecting element 4 is aligned at an inclined angle with respect to a longitudinal axis I which runs through the housing of the filter cartridge 31, in this case preferably at an acute angle φ. This inclined-angle or else bent or else oblique alignment of the filter-side tank connecting element 4 with respect to the rest of the filter housing provides a further form of mechanical coding which can be combined with further coding forms as already described above, in particular with a polygonal connecting element as illustrated here, in the form of an octagon. This octagon can preferably likewise be in the form of a molded seal and, as illustrated here, may have a bypass or blending apparatus in the form of an opening 160 which, when a complementary element is present in the tank-side filtering connecting element, allows corresponding blending of the water to be filtered.

FIG. 79 shows the filter cartridge 31 in an oblique view from underneath, in which the filter-side connecting element 4 and its major features can be seen. In contrast, FIG. 80 shows a side view, in which the angle between the cartridge housing 31 and the filter-side tank connection 4 is shown for one angle, which is illustrated by way of example.

Figure 81:
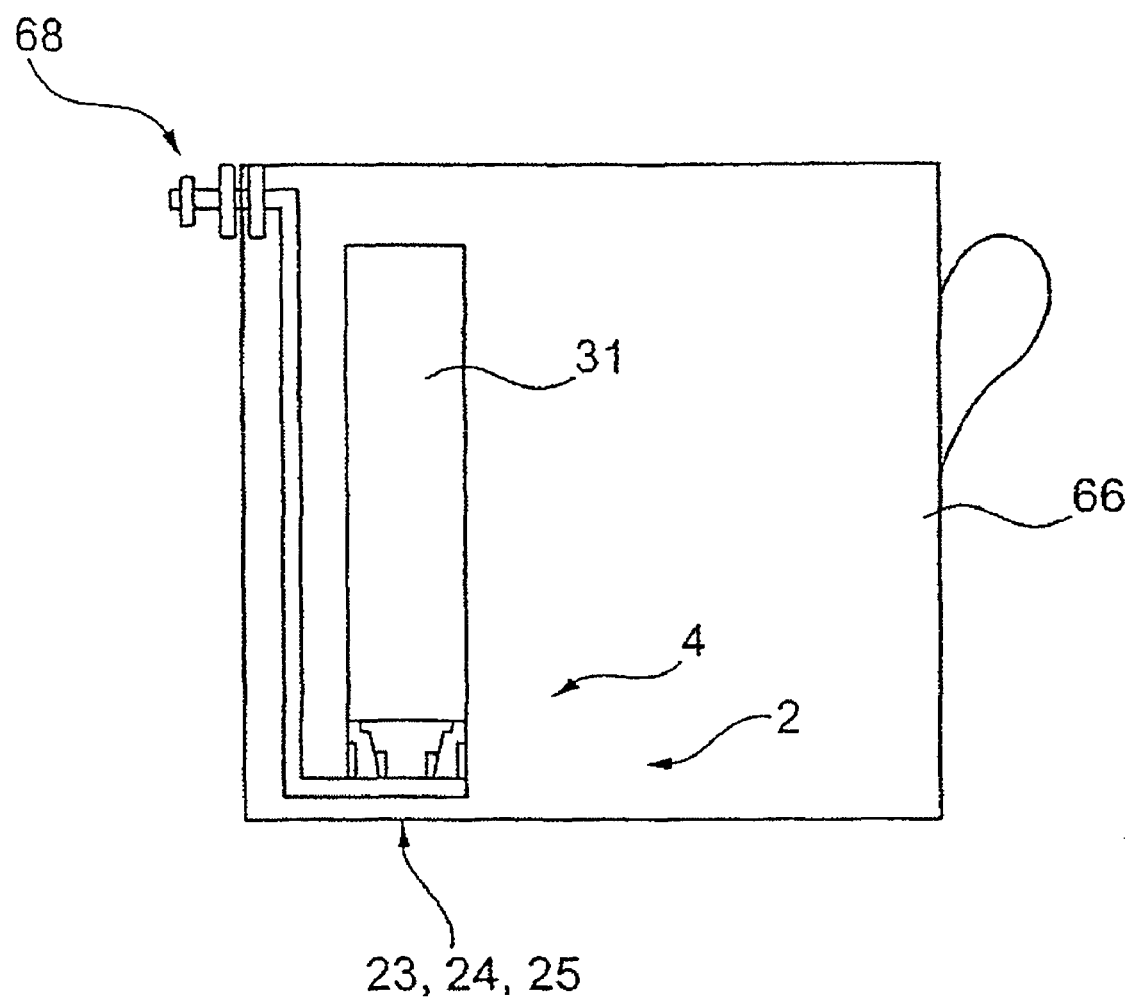

FIG. 81 shows a further embodiment in which the tank 66 is once again in the form of a push-in tank, in which a cartridge 31 for filtering the water contained therein is connected to a tank-side filter connecting element 2. This tank-side connecting element 2 is connected via a line, in this case preferably in the form of a robust tube, to the tank-side appliance connection 68. This tank-side appliance connection 68 is passed to the outside from the tank interior at a distance from the bottom area of the tank 66 during operation. In this embodiment, by way of example, the appliance connection 68 is fixed in a holder which is incorporated in the upper edge of a tank wall and may advantageously be in the form of a detachable connection, so as to allow simple removal and cleaning.

The tank can be operated simply by pushing it into a correspondingly designed holder in an appliance, and it can be filled with fresh water, which will then be filtered by the filter 31, by pulling it out. The tank-side filter connecting element 2 can in this case have all the coding and/or fixing and/or sealing features described above in such a way that, even in this drawer embodiment, the use of a filter cartridge which is not provided correctly can reliably be precluded, and, apart from this, this also applies to the embodiment shown in FIGS. 72 to 74.

Figure 82:
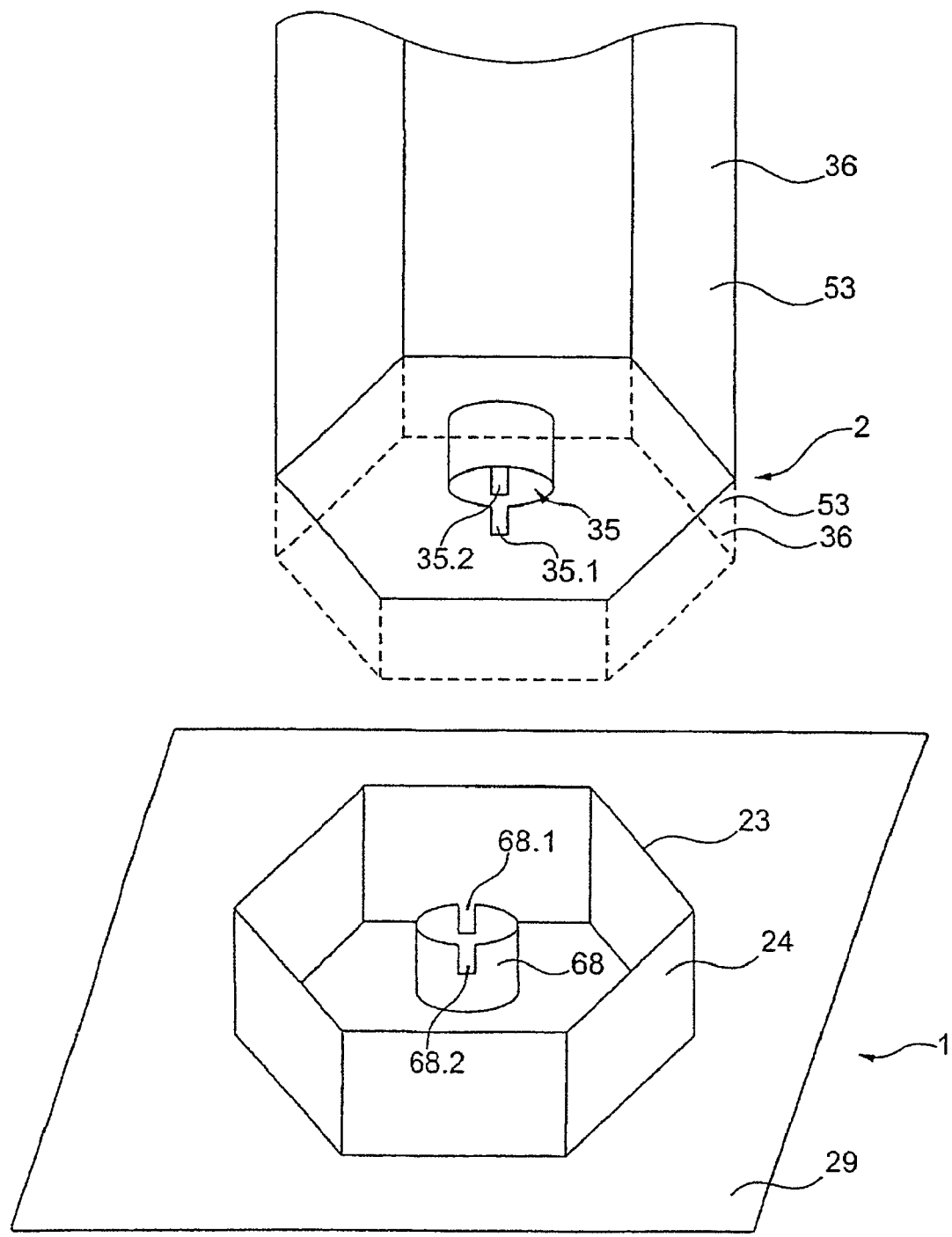

Two further possible embodiments of codings for the connection between the tank and filter are illustrated in and will be described with reference to FIGS. 82 and 83. In FIG. 82, the housing of the filter cartridge 53 itself has a polygonal external contour in the form of a hexagon, which can be inserted into a complementary, tank-side polygon coding and/or fixing structure 23. The bold solid lines indicate the filter cartridge 53 in a view obliquely from underneath with a base, which is flat at the bottom, at whose center the filter outlet 35 is formed for the filtered water, for example as a cylindrically projecting tube with two attachments 35.1 and 35.2 which project axially at the end. This cylindrically projecting outlet element 35 is coded by the two axially projecting vanes and, with its end face, forms an axial coding and/or sealing structure or contour with respect to the end face of a complementary outlet and holding element 68, which is formed in the tank-side filter connection, with its coding grooves 68.1 and 68.2. The filter cartridge 53 can be inserted into the tank-side filter connecting element 1, in such a way that it can operate, only if the end face of the filter outlet 35 matches and forms a seal with the end face of the tank-side appliance outlet 68.

The hexagonal external contour of the filter cartridge 53, which is illustrated by way of example here, can be inserted, in a fixing manner and possibly also in a sealing manner, into the connecting fitting 23 of the tank-side filter connecting element 1 in the embodiment represented by the solid lines. In this case, the internal circumference of the connecting fitting 23 is used for fixing and possibly for sealing with respect to the external circumference and with respect to its connection.

In order to indicate a further attachment option between the polygonal external contour, which is illustrated by way of example here as a hexagon, of the filter cartridge 53 and a correspondingly complementary tank-side connecting fitting 1, the housing 36 of the filter cartridge 53 is illustrated by the dashed lines as being extended with respect to the previously described filter base. This polygonal connecting ring, which projects with respect to the bottom of the filter cartridge, can be placed over or likewise plugged in in order to fix the filter cartridge via the tank-side filter connecting stub 23, once again for fixing and preferably for sealing depending on the embodiment, until the two internal codings, of the filter outlet 35 and of the tank outlet 68 rest on one another, forming a seal, and their vane-like and complementary slot-like coding structures, which are illustrated here by way of example, rest on one another or engage in one another, forming a seal. Corresponding openings and/or channels are provided in order to pass water from the tank into the interior of the filter cartridge, although these are not shown here. Corresponding bypass structures can likewise be provided, but are not shown, as have already been described in detail above. FIG. 82 therefore shows the filter cartridge being fixed both on the internal circumference of the tank-side filter connecting element 23 and on its external circumference 24.

Figure 83:
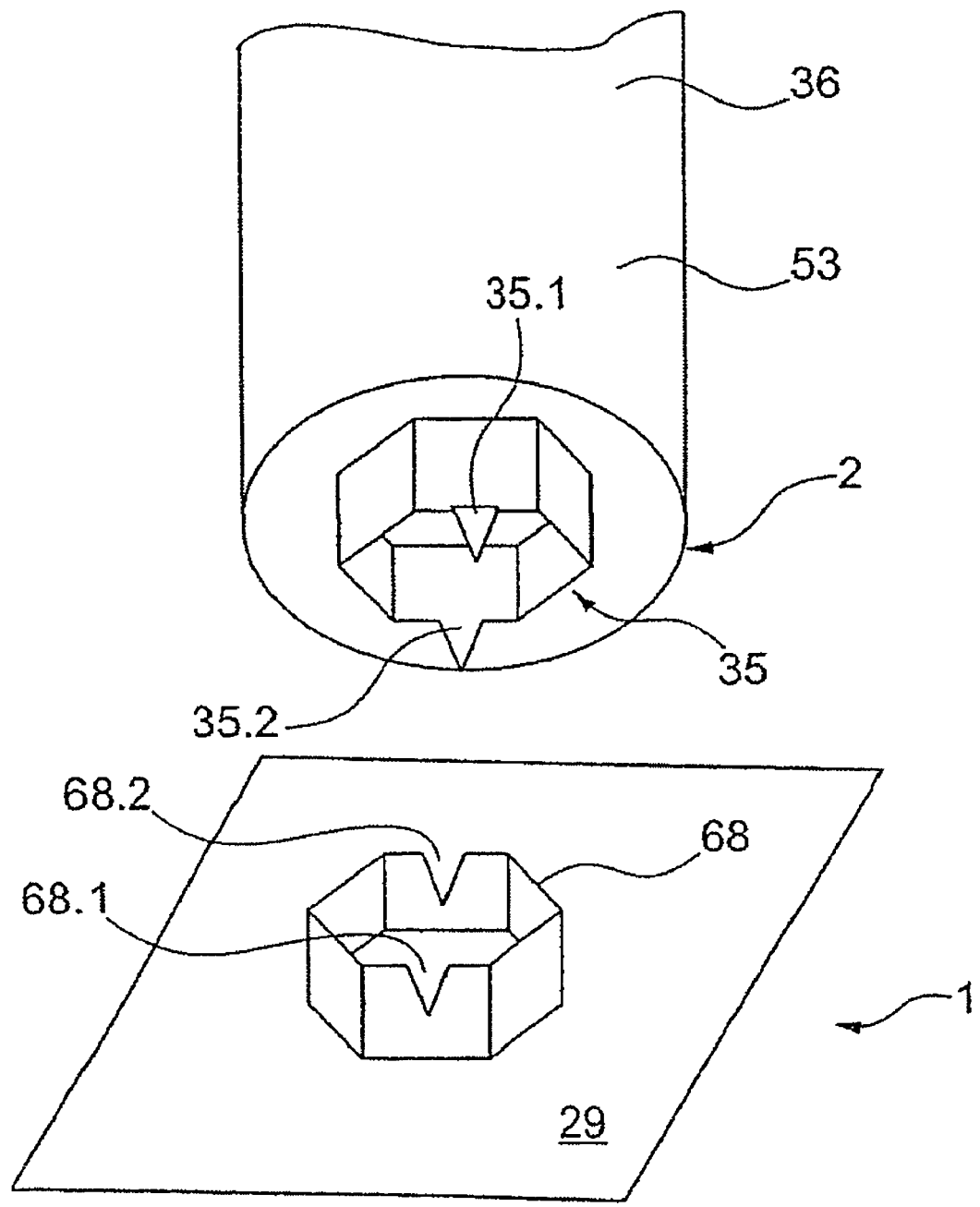

In contrast, FIG. 83 shows an embodiment which has been modified such that the housing 36 of the filter cartridge is illustrated, by way of example, as being round and the filter outlet 35 as a polygonal structure, in this case once again by way of example in the form of a hexagon, which additionally once again has end coding in the form of two axially projecting, coding, triangular points or vanes. In this case as well, the filter cartridge can be connected to the tank-side filter connecting element 1, in such a manner that they can operate, only if the two outlet structures 35 and 68 can be joined to one another at the end, axially, forming a seal. Further coding and/or fixing structures have not been illustrated, for clarity reasons. However, all of the structures which have already been described above can also be provided in a corresponding manner here. It can also be said for the two embodiments corresponding to FIGS. 82 and 83 that these coding structures can also be interchanged between the filter side and the tank side, and/or can be modified and/or can have further contours and/or structures added to them.

Figure 84:
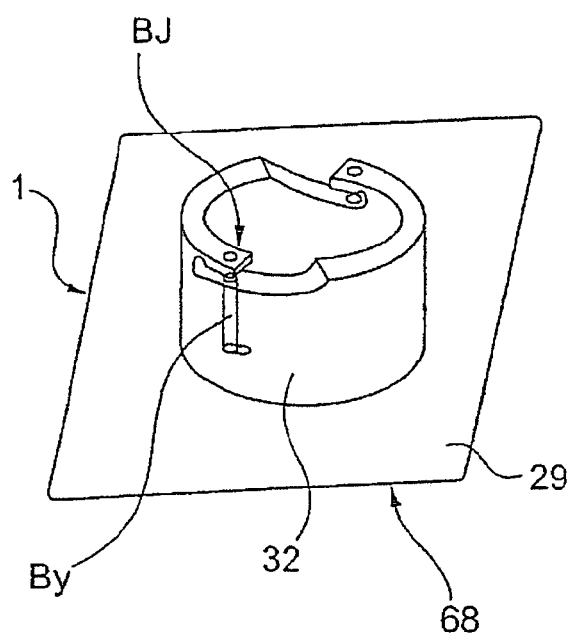
Figure 85:
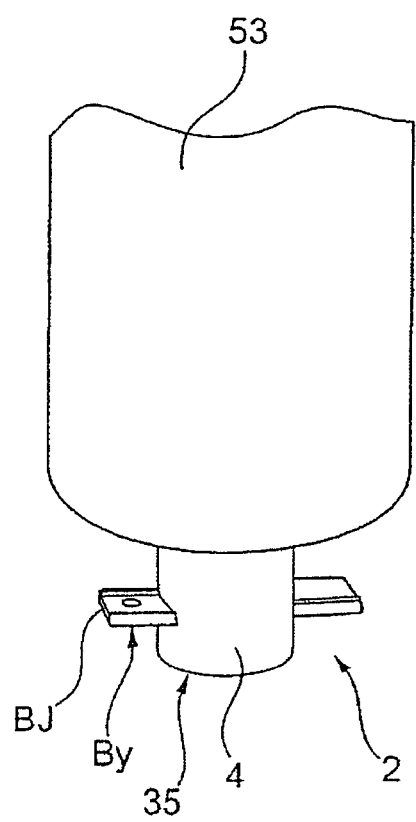

Two further embodiment options relating to a bypass configuration between a tank-side filter connecting element 1 and a filter-side tank connecting element 2 are illustrated in FIGS. 84 to 87. In this case, FIGS. 84 and 85 illustrate, by way of example and schematically, a bypass arrangement BY which allows blending between water that has been filtered by the filter cartridge 53 and water which has not been filtered or prepared, or has been filtered or prepared in some other way. The bypass or blending path BY is in this embodiment combined with a bayonet fitting BJ, such that an opening BY is provided in a bayonet vane BJ, which opening BY corresponds to a further bypass opening BY, which is arranged on a bayonet slot BJ that is complementary to the bayonet vane, such that, when a filter cartridge is inserted correctly, a corresponding bypass path is provided. In the embodiment illustrated here, the bypass opening BY which is shown in the tank-side filter connecting element 1 is passed from the end connecting area of the tank-side connecting fitting to below the point at which the filter-side tank connecting stub 4 ends at a position that is used during operation such that the bypass water which bypasses the filter bed in the filter cartridge 53 is mixed with the water that has been filtered by the filter bed in the filter cartridge 53, and is supplied to the tank-side appliance connection 68.

Figure 86:
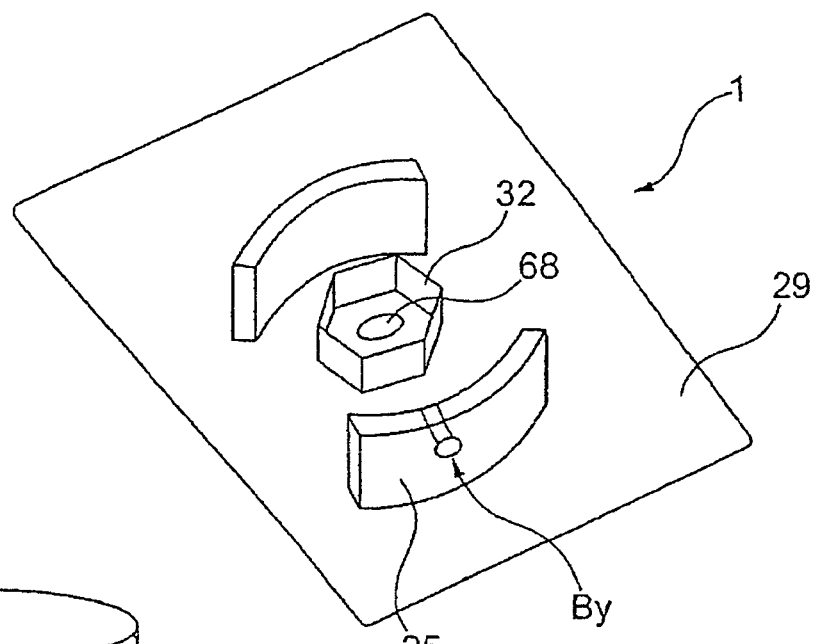
Figure 87:
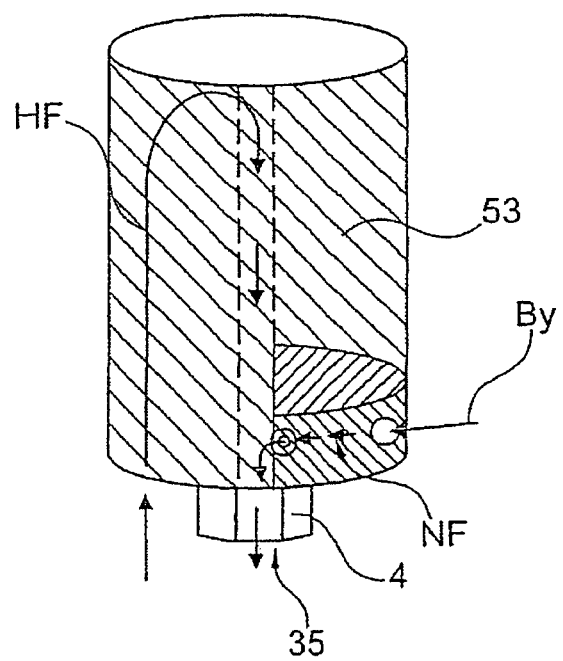

FIGS. 86 and 87 show an embodiment that is modified from this, in which the bypass path BY is passed via a preparation and/or filter path which is separate from a main filter bed HF of the filter cartridge 53 and is illustrated here, by way of example and symbolically, as a secondary filter path NF. This second preparation and/or filter path NF may contain, for example, an activated-charcoal filter path and/or other preparation mechanisms and/or media. After flowing through this secondary filter path NF, the water which has been passed via this bypass path BY is mixed with the water which has been filtered by the filter path HF of the filter cartridge 53, in such a way that it can likewise be drawn off through the tank-side appliance connection 68.

In the embodiment of the filter cartridge 53 as shown in FIG. 87, the combination of the two water paths, which have been passed and prepared separately via the main filter HF and via the secondary filter NF respectively, in the interior of the filter cartridge 53 is illustrated, by way of example and schematically, by an opening into the inner falling line of the filter cartridge 53. In a modified embodiment, however, a dedicated outlet opening from the filter cartridge in the direction of the tank-side appliance connection 68 can invariably also be provided, in addition or as an alternative, in which case it can possibly be said for all three embodiments that they all open within the tank-side filter connecting stub 32 such that, once again by way of example, sealing is possible by an interrupt between the two polygonal connecting elements of the tank and of the filter.

The bypass flow can be introduced into the secondary filter path only when the opening BY, which likewise acts as coding, on the coding element 25, which projects axially upwards from the tank bottom 29, with the corresponding filter-side bypass opening BY is inserted in the state intended for operation. If these two openings do not coincide, then no corresponding blending can take place. The tank-side filter connection 1 corresponding to FIG. 86 is likewise illustrated only schematically and by way of example and can be provided with widely different variants of the coding and connecting structure already described above such that, if required, only a single one of all six angular alignments that are possible here is allowed for a permissible filter termination. Such coding structures have not been illustrated at this point, for clarity reasons.

In principle, it can also be said for these embodiments in FIGS. 84 to 87 that they can also be combined with all of the coding and/or fixing and/or sealing structures described above.

Figure 88:
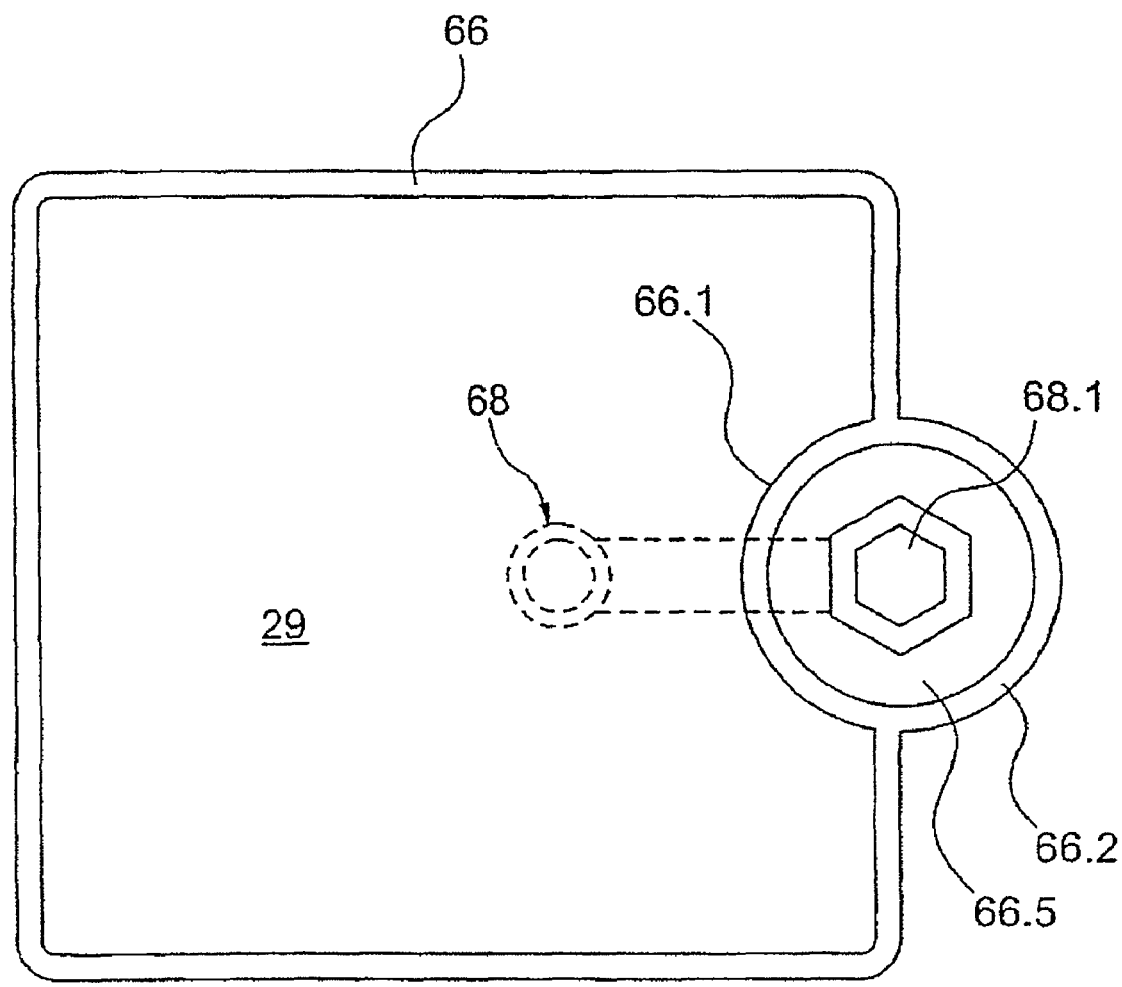
Figure 89:
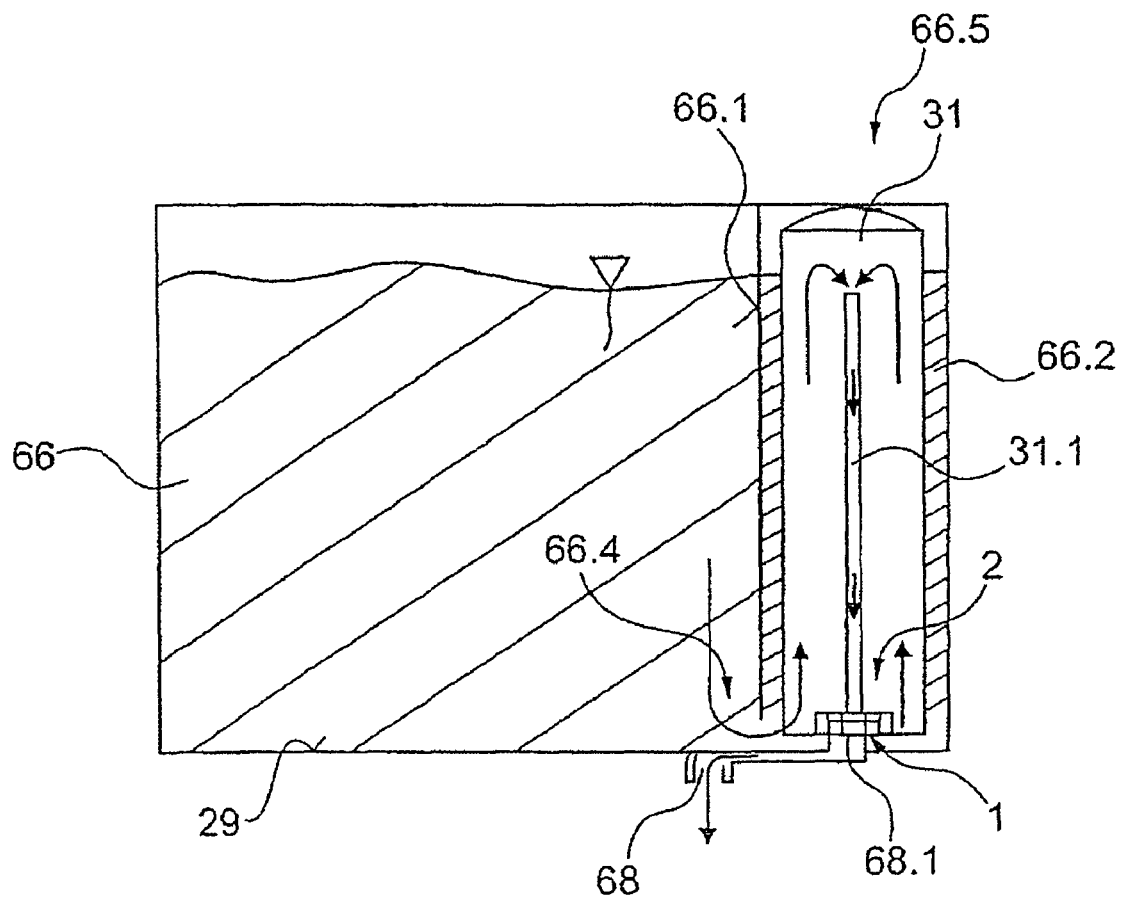
Figure 90:
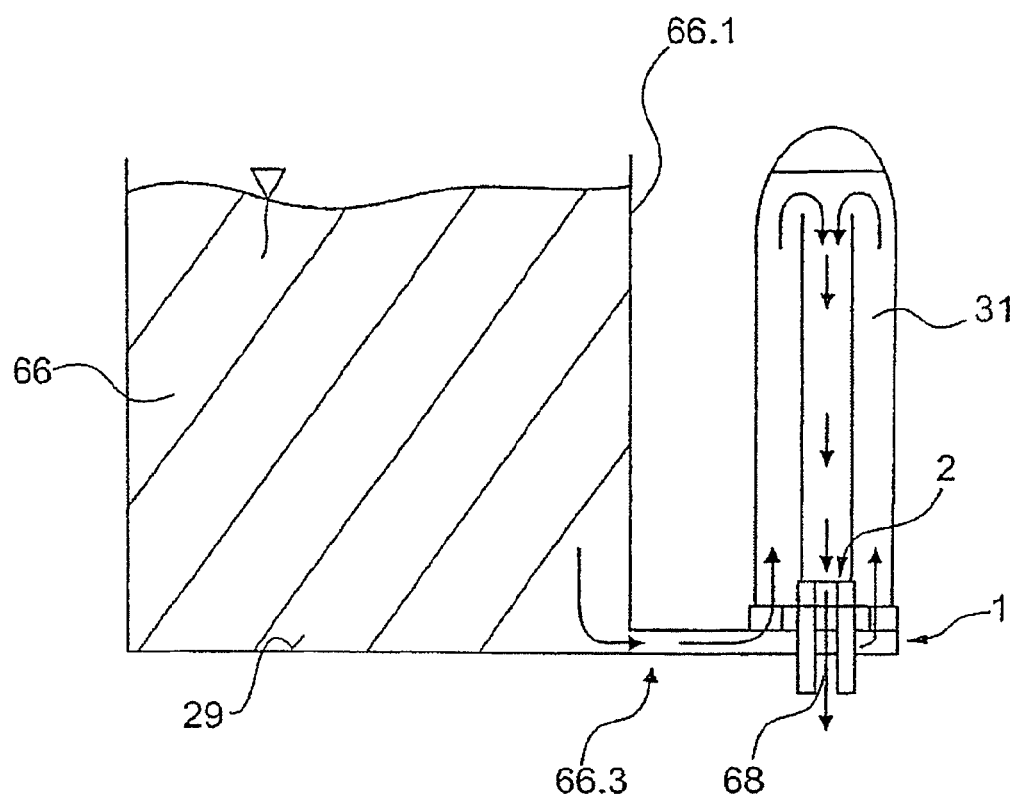

FIGS. 88 to 90 show two further embodiments of a tank in which the filter cartridge is arranged outside the main vessel of the tank 66 but is still, as already described, between the tank-side filter connecting element 1 and a tank-side appliance connection 68, in order to filter untreated water that is stored in the tank before being supplied to an extraction point or to a correspondingly connected appliance with or else without blending.

In this case, FIG. 88 shows a plan view of a tank 66 whose tank wall 66.1 together with a further tank wall 66.2 forms a housing 66.5 for holding a correspondingly shaped filter cartridge 31, and which is connected, for the purposes of carrying liquid, to the interior of the tank. A tank-side filter connecting element 1 is shown in the bottom area of the housing 66.5, in this case by way of example as a coded connecting structure in the form of a polygonal contour. An outlet-flow opening 68.1 for connection to the tank-side appliance connecting element 68 is provided in the interior of this tank-side filter connecting element 1.

FIG. 89 shows this tank 66 in the form of a section illustration transversely through the filter cartridge accommodation housing 66.5 and the adjacent elements of the tank, as well as the connecting structure, formed underneath it, for the tank-side appliance connecting element 68. In this embodiment, the tank could, for example, be fitted as a plug-in tank into a correspondingly suitably designed appliance. The water with which the interior of the tank 66 is filled is supplied to the filter cartridge 31 through an opening 66.4 in the tank wall 66.2 which, for example, may be in the form of a tank wall 66.1 which does not extend all the way to the tank bottom 29. The untreated water to be filtered is thus in each case at the same height in the interior of the filter accommodation housing 66.5, which is formed by the two tank walls 66.1 and 66.2, as in the interior of the water tank 66. Flow arrows are shown in order to illustrate the filter flow through the filter cartridge from the interior of the tank 66 and from the bottom of the filter cartridge 31 rising to the upper edge of an outlet-flow line, which is shown here by way of example as a central outlet-flow tube, through this and finally out of the tank-side appliance connection 68. All the features which have been explained so far above in the description with regard to the coding and/or fixing and/or sealing and/or use of an adapter piece and/or other items of the like are also completely possible and applicable here.

FIG. 90 shows an embodiment in which the liquid-current connection between the tank-side filter connecting element 1 and the filter-side tank connecting element 2 is provided entirely outside the tank 66. For this purpose, the tank bottom 29 is developed, for example, by being drawn forward outwards at one point with respect to a tank wall 66.1 and is shaped to form a closed liquid line 66.3 through which the water which is located in the interior of the tank 66 flows to the tank-side filter connecting element 1 which, in this embodiment which is illustrated by way of example, is provided outside the tank 66. The filter cartridge 31 is connected by its filter-side tank connecting element 2 to this tank-side filter connecting element 1. It can be said that all of the features which have already been described above with regard to a coding and/or sealing and/or fixing and/or adapter structure in any embodiment variant can be provided for and are applicable to this embodiment as well.

Figure 91:
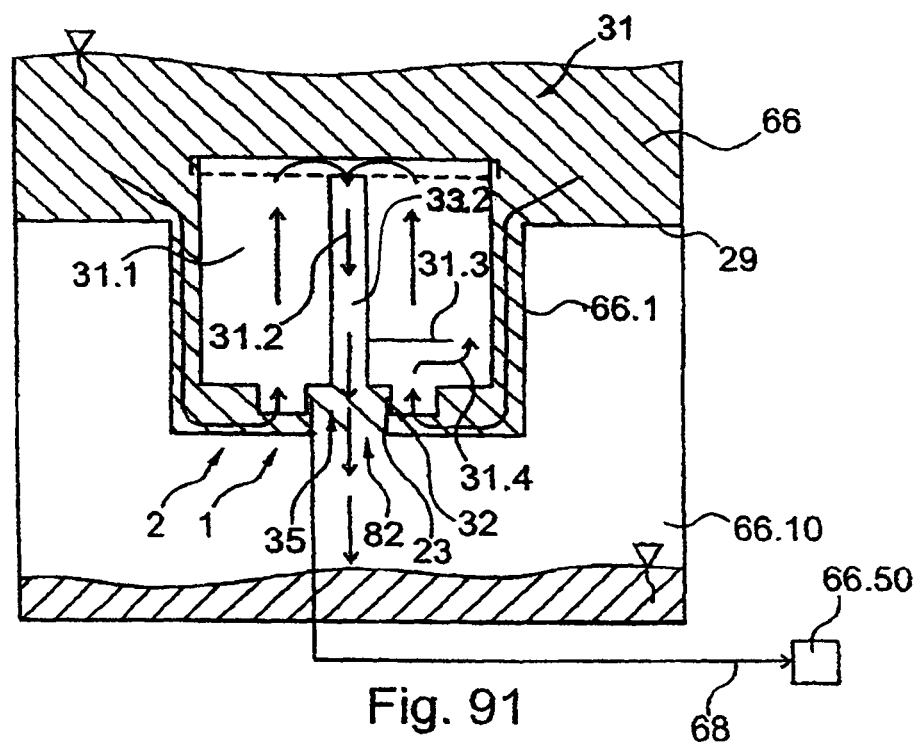
Figure 92:
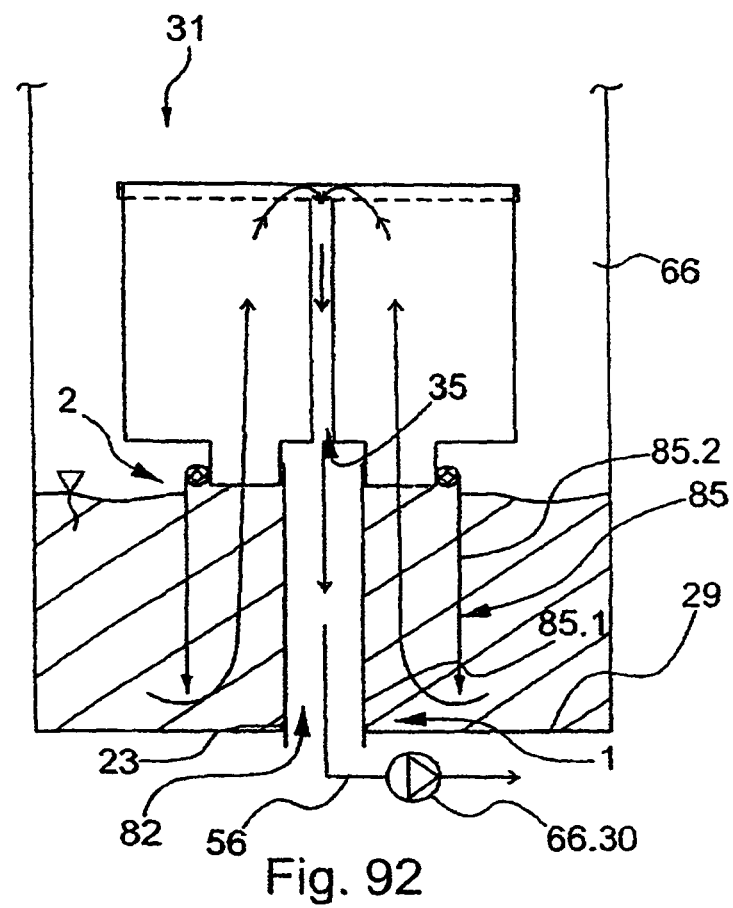

Further embodiments relating to the connection of a tank-side filter connecting element to a filter-side tank connecting element of a gravimetrically operated filter cartridge are illustrated in FIGS. 91 to 93 and will be described in the following text here. As recognized by those skilled in the art the tank 66 here contains water to be filtered or processed which after filtering or processing is transferred to a reservoir or storage vessel 66.10 to provide a source of water for immediate use which is further described with reference to FIG. 91.

FIG. 91 shows, schematically and by way of example, a section through a water tank 66 with a depression 66.1 formed in the bottom for holding a gravimetrically operated filter cartridge 31. This arrangement, recessed in the base in the bottom tank, of the gravimetrically operated filter cartridge 31 in the tank 66 allows the majority of the water which is located in the tank to be made available, filtered, to a reservoir or storage vessel 66.10, which is illustrated by way of example here and is connected to the tank via the outlet 82 and/or to an appliance 66.50, which is connected symbolically via the appliance connection 68. The illustrated section runs both through the tank-side filter connecting element 1 and through the filter-side tank connecting element 2, which corresponds to a connecting structure with a polygonal contour, as has already been described above. In this embodiment as well, bypass elements can be provided, as have already been described above, although these are not illustrated here, for reasons of clarity.

In this embodiment which is illustrated by way of example, the water which is located in the tank interior can flow outwards past the housing of the cartridge into a lower inlet area of the filter cartridge 31, in its interior. The inlet openings into the filter 31 are represented by dashed lines. After passing through these inlet openings, the water rises through the filter bed 31.1, which is likewise not illustrated, flowing upwards, and after passing through a suitable restraint apparatus for the filtrate, flows into an outlet-flow line, which is likewise illustrated centrally here by way of example and can possibly be provided with a filter bed 33.2 which operates using the downwards-flow method. A filter bed 31.4 which operates using the lateral-flow method is illustrated symbolically by way of example, produced by a lateral web 31.3. In this case, once again by way of example, a dashed line, for example in order to symbolize a mesh, of a sieve or of some other appropriate filter media restraint apparatus, is illustrated as a restraint apparatus for the filter medium.

By way of example, a tank 66 such as this may be used in an appliance 66.50 which uses and/or prepares water and, for example, draws an appropriate inlet amount of water from the tank for a specific application. Possible applications would be, for example, drinks preparation machines which can be operated cold and/or hot, such as water dispensers, tea makers, automatic coffee machines or others of the like.

FIG. 92 shows an embodiment modified from that shown in FIG. 91, in that, although the same filter cartridge is used, the tank does not, however, have a corresponding depression 66.1. The connecting structure of the tank-side filter connecting element 1 and of the filter-side tank connecting element 2 may correspond to the embodiment shown in FIG. 91.

In the case of a modified embodiment, for example, the tank-side filter connection could likewise be in the form of a hexagonal polygonal train, by way of example, and the filter-side tank connection 2 could be in the form of a quadrilateral polygonal train. In order nevertheless to allow these two coding structures, which do not match one another, to be joined together to form a tank/filter connection which operates correctly, the illustration in this case shows, by way of example, an adapter 85 inserted between the tank-side filter connecting element 1 and the filter-side connecting element 2. The adapter 85 comprises a line which connects the tank-side filter connecting fitting 1 to the filter-side tank connecting element 2, in this case by way of example in the form of an inner tube and a further line which extends from the external circumference of the filter-side tank connecting element preferably to a point as close as possible to the tank bottom 29, in this case in the form of an outer tube 85.2, in such a way that the suction point for the extraction of the filtered water is located at as low a level as possible in the tank. By way of example, this tank may be a very narrow but high water tank 66 such that, once again, the amount of dead water which cannot be extracted from the tank through the filter and remains in the tank is as small as possible. The geometric dimensions in this illustration are only by way of example, such that, for example, the adapter 85 may be considerably shorter in relationship, as a result of which the filter cartridge 31 will then also be located at a correspondingly lower level in the tank.

A seal, for example, which may be in the form of a molded seal or else, as illustrated, in the form of an O-ring or others of the like, can preferably be provided for sealing between the outer adapter tube 85.2 and the filter-side tank connecting element 2, in order to ensure that the suction point for the water is located in the bottom area of the tank 66.

If required and in addition to gravimetric operation, an apparatus which produces a reduced pressure, for example a pump 66.30, can additionally be connected as assistance in this embodiment. This can be switched on or off selectively, or else can also be switched on for a specific application, in order to provide a sufficient flow rate of filtered water which might otherwise not be sufficient.

Finally, FIG. 93 shows a third tank/filter connection embodiment, for example with the same components as in FIG. 92 but without an intermediate adapter 85. The design and method of operation of the tank-side filter connecting element 1 and of the filter-side tank connecting element 2 may otherwise be completely the same as those described with respect to FIG. 92.

As illustrated in FIG. 91, the output 35 of the filter cartridge can either be connected directly to a reservoir and/or storage vessel 66.10 or, corresponding to the supplementary symbolic illustration, may be connected to a machine that has to be supplied with the filtered water. Corresponding to the illustration in FIG. 93, a direct connection such as this is illustrated with a preparation unit 66.20 in the form of a heater or a vaporizer, as can be provided, for example, in an automatic tea maker and/or automatic coffee machine.

For fundamental explanatory purposes, the following text also states that the outlet 35 on the filter cartridge 31 for the filtered water is connected to the tank outlet opening 56 which leads from the interior of the tank 66 to the tank-side appliance connection 68 and is formed on the tank-internal end of the tank-side connecting stub 23.

All of the untreated water with which the tank 66 is filled therefore flows around the filter cartridge, to be precise to such an extent that the tank-side filter connecting stub 23, 54 and/or the filter-side tank connecting stub 4, 10 with seal 32, 57 are/is in the form of a separating element between the outlet 35 for the filtered water and the water to be filtered by the filter cartridge. This tank/filter connection therefore at the same time represents the separation point between the untreated water and the filtered water. In preferred embodiments, a blending apparatus for blending, which may be provided, of the water which has been filtered by the filter cartridge may be provided in this area and, in one particularly preferred embodiment, is also adjustable.

The tank/filter connection is therefore used at the same time for firmly holding and fixing and for sealing of the filter cartridge 31 to the tank 66.

In order to provide sealing between the filter 31 and the tank 66, it is either possible to provide an interlocking seal or else a separate seal, which is axially and/or radially coded, but is not illustrated here, for clarity reasons.

For all of the embodiments corresponding to FIGS. 91 to 93, these embodiments can likewise be combined with all of the coding and/or sealing and/or fixing structures which have already been described above in order to prevent the insertion of a filter cartridge which is not intended for this purpose into a corresponding equipped tank.

LIST OF REFERENCE SYMBOLS

1 Connecting fitting
2 Tank connecting element
3 Radial seal
4 Connecting stub
5 Cartridge housing
6 Side slot
7 Outlet-flow tube
8 Connecting fitting
9 Tank connecting element
10 Connecting stub
11 Cartridge housing
12 Axial seal
13 Intermediate area
14 Outlet-flow tube
15 Holding and guide web
16 Projection
17 Latching element
18 Latching element
19 Connecting fitting
20 Opening
21 Coding projection
22 Coding spring
23 Connecting fitting
24 Sealing surface
25 Outer shell
26 Blocking element
27 Bottom rib
28 Bottom rib
29 Tank bottom
30 Inner rib
31 Filter cartridge
32 Molded seal
33 Sealing surface
34 Inlet slot
35 Outlet-flow opening
36 Filter cartridge housing.
37 Snap-action element
38 Holder
39 Lower edge
40 Stop
41 Bottom opening
42 Grooves
43 Key element
44 Tank connecting area 45 Bottom
46 Axial seal
47 Separating line
48 Disk
49 Annular shoulder
50 Valve body
51 Spring
52 Tank bottom
53 Filter cartridge
54 Connecting fitting
55 Outer surface
56 Outlet-flow line
57 Seal
58 Wall
59 Wall
60 Cutout
61 Opening
62 Fitting wall
63 Fitting wall
64 Fitting wall
65 Bypass opening
66 Tank
67 Appliance connection
68 Appliance connection
69 Longitudinal axis
70 Intermediate space
71 Rim
72 Connecting element
73 Cartridge
74 Foot
75 Inlet opening
76 Inlet opening
77 Connecting fitting
78 Baseplate
79 Sealing surface
80 Sealing surface
81 Molded seal
82 Outlet
83 Outer wall
84 Outer shell
85 Adapter
86 Adapter
87 Axial projection
88 Axial projection
89 Axial projection
90 Axial projection
91 Axial projection
92 Axial projection
93 Axial projection
94 Axial projection
95 Axial projection
96 Axial recess
97 Axial recess
98 Axial recess
99 Axial projection

The invention claimed is:

1. In a tank for appliances which use filtered water with a seal for, for connection of a filter cartridge or a gravimetrically operated filter cartridge wherein the improvement comprises a tank mating connection on the tank outlet for mating with a filter mating connection on the filter cartridge, the tank mating connection having a combined polygonal coding and angular sealing surface disposed on the outlet inside the tank to form a polygonal coding and angular sealing filter connection to match a complementary combined polygonal coding and angular sealing surface disposed on the filter cartridge wherein a seal having a polygonal angular shaped circumference is formed by the interlocking of the combined polygonal coding and angular sealing surface on the tank mating connection and the complementary combined polygonal coding and angular sealing surface disposed on the filter cartridge, in order to preclude operation of the seal and use of a filter cartridge which does not correspond with said combined polygonal coding and angular sealing surfaces on said tank mating connection.

2. The tank as claimed in claim 1 wherein the combined polygonal coding and angular sealing surface on the tank outlet has at least one projection and/or at least one recess for matching the complementary combined polygonal coding and angular sealing surface disposed on the filter cartridge by employing a key/lock structure.

3. The tank as claimed in claim 1 wherein the combined polygonal coding and angular sealing surface extends in the axial and/or radial direction with respect to the axis of a connecting stub of the filter cartridge.

4. The tank as claimed in claim 1 wherein a coding is provided by the number or spatial distribution or shape of individual coding elements of the polygonal coding and angular sealing surface disposed on the tank outlet or on the filter connection.

5. The tank as claimed in claim 1 wherein the combined polygonal coding and angular sealing surface on the tank outlet is provided on the internal and/or external circumference of the tank outlet.

6. The tank as claimed in claim 1 or 2 wherein an external and/or internal surface of the combined polygonal coding and angular sealing surface is a sealing and fixing surface (24).

7. The tank as claimed in claim 1 or 3 wherein an external and/or internal circumferential surface of the tank mating connection on the tank outlet is the combined polygonal coding and angular sealing surface.

8. The tank as claimed in claim 1 or 2 wherein an external and/or internal circumferential surface of the tank outlet has a rotationally symmetrical cross section.

9. The tank as claimed in claim 1 wherein the mating connection on the filter cartridge is a molded seal (32) disposed on the filter cartridge.

10. The tank as claimed in claim 1 further comprising a blending device on the tank outlet.

11. The tank as claimed in claim 10 wherein the blending device has a blending setting for blending filtered liquid with unfiltered liquid.

12. The tank as claimed in claim 10 wherein said blending device has an angle-dependent blending setting.

13. The tank as claimed in claim 10 or 11 or 12 wherein the blending device on the tank outlet is operated by at least one driver element on the filter cartridge.

14. The tank as claimed in claim 1 or 3 or 10 wherein the seal (32) has an additional coding structure disposed between the combined polygonal coding and angular sealing surface on the tank and the complementary combined polygonal coding and angular sealing surface on the filter cartridge.

15. The tank as claimed in claim 10, 11 or 12 wherein the blending device controls two or more filter paths.

16. The tank as claimed in claim 1 wherein an inlet (34) and an outlet (35) of the filter cartridge (29) are disposed in a lower area of the filter cartridge when installed in the tank.

17. The tank as claimed in claim 16 wherein the outlet (35) for filtered water on the filter cartridge (29) is connected to the tank outlet (56), which communicates from an interior of the tank (66) to an appliance connection (68).

18. The tank as claimed in claim 1 wherein the tank outlet or the filter cartridge has a connecting stub (23, 54) and said connecting stub is a separating element separating the tank outlet for the filtered water from an inlet for water to be filtered by the filter cartridge.

19. The tank as claimed in claim 18 wherein the seal (32) formed between the tank outlet and filter cartridge is a separating element separating the tank outlet (35) for the filtered water from an inlet for water to be filtered by the filter cartridge.

20. The tank as claimed in claim 1 wherein an outlet (35) of the filter cartridge is connected directly to a preparation unit (66.20) or a tank of a machine supplied with the filtered water.

21. An appliance which uses filtered water having a water filter comprising a tank having a tank outlet with a mating connection for mating with a corresponding filter cartridge connection, said tank outlet having a polygonal coding and sealing surface on said tank outlet for mating with a corresponding filter cartridge polygonal coding and sealing surface establishing the mating connection to provide a polygonal seal disposed between said tank outlet and the water filter and to preclude operation of the polygonal seal and use of a filter which does not correspond with said polygonal coding and sealing surface on said tank outlet and on said filter cartridge to provide said mating connection.

22. In a tank for appliances which use filtered water, having an untreated water tank (66) with an outlet on the untreated water tank including a gravimetrically operated filter cartridge disposed in the untreated water tank having a connection on the untreated water tank for supplying water from the untreated water tank to a reservoir and/or storage vessel (66.10) and/or an appliance (66.50) disposed at a level lower than the untreated water tank wherein the improvement comprises an untreated water tank outlet having a tank mating structure for mating with a corresponding filter mating structure on the filter cartridge, said untreated water tank outlet also having a combined mechanical coding, sealing and fixing surface with a circumferential angular sealing surface having a plurality of angles that interlock and mate with a corresponding combined mechanical coding, sealing and fixing surface having a plurality of angles on the filter cartridge to interlock and form a seal with the combined mechanical coding, sealing and fixing surface of the untreated water tank outlet and to preclude use of a filter cartridge which does not have a corresponding mating structure.

23. A filter cartridge for a tank comprising:
(a) a filter housing having a filter connection for mating with a tank outlet having a corresponding connection for a filter cartridge to provide a mating connection;
(b) the filter connection having a polygonal coding and sealing surface disposed on the filter housing for mating with the tank outlet connection for the filter cartridge said tank outlet having a corresponding polygonal coding and sealing surface; and;
(c) a polygonal seal formed by the mating of said polygonal coding and sealing surface of said tank outlet and said polygonal coding and sealing surface of said filter and which prevents operation of a seal unless the polygonal coding and sealing surfaces of said tank outlet and said filter match.

* * * * *

UNITED STATES PATENT AND TRADEMARK OFFICE
CERTIFICATE OF CORRECTION

PATENT NO. : 8,202,419 B2  
APPLICATION NO. : 12/310072  
DATED : June 19, 2012  
INVENTOR(S) : Kurt Wallerstorfer et al.

Page 1 of 1

It is certified that error appears in the above-identified patent and that said Letters Patent is hereby corrected as shown below:

On the Title Page, Item (75) the address of one of the joint inventors, Mr. Roland Scholz should be:

Roland Scholz, Balgach (CH)

Signed and Sealed this
Sixth Day of January, 2015

Michelle K. Lee
*Deputy Director of the United States Patent and Trademark Office*